US012262355B2

(12) United States Patent
Kakinuma et al.

(10) Patent No.: US 12,262,355 B2
(45) Date of Patent: Mar. 25, 2025

(54) COMMUNICATION DEVICE AND COMMUNICATION METHOD

(71) Applicant: SONY GROUP CORPORATION, Tokyo (JP)

(72) Inventors: Koji Kakinuma, Tokyo (JP); Sawako Kiriyama, Tokyo (JP); Masanori Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 343 days.

(21) Appl. No.: 17/620,083

(22) PCT Filed: May 11, 2020

(86) PCT No.: PCT/JP2020/018884
§ 371 (c)(1),
(2) Date: Dec. 16, 2021

(87) PCT Pub. No.: WO2020/261782
PCT Pub. Date: Dec. 30, 2020

(65) Prior Publication Data
US 2022/0369294 A1    Nov. 17, 2022

(30) Foreign Application Priority Data
Jun. 26, 2019  (JP) ................................ 2019-119150

(51) Int. Cl.
*H04W 72/04*     (2023.01)
(52) U.S. Cl.
CPC .................................. *H04W 72/04* (2013.01)
(58) Field of Classification Search
CPC . H04W 72/04; H04W 76/28; H04W 52/0216; H04W 72/044; H04L 5/0005; H04L 5/0044; Y02D 30/70
See application file for complete search history.

(56) References Cited

U.S. PATENT DOCUMENTS

| 2014/0071936 A1* | 3/2014 | Zhang | ................... H04L 5/0016 370/330 |
| 2016/0174227 A1 | 6/2016 | Martin et al. | |

(Continued)

FOREIGN PATENT DOCUMENTS

| CN | 105453476 A | 3/2016 |
| JP | 2016-532378 A | 10/2016 |

(Continued)

OTHER PUBLICATIONS

International Search Report and Written Opinion of PCT Application No. PCT/JP2020/018884, issued on Jul. 28, 2020, 08 pages of ISRWO.

*Primary Examiner* — Edan Orgad
*Assistant Examiner* — Malick A Sohrab
(74) *Attorney, Agent, or Firm* — CHIP LAW GROUP

(57) ABSTRACT

There is provided a communication device that determines a wireless resource for a downlink without performing signaling between a base station and a terminal. A communication device includes a communication unit that transmits and receives a wireless signal, and a wireless resource determination unit that determines a wireless resource used for transmission and reception. The wireless resource determination unit determines, in a communication system including a base station and a terminal, on the basis of a common rule between the base station and the terminal, a plurality of candidates for the wireless resource to be used for downlink communication in the slot for each terminal, and then selects the plurality of candidates for each terminal one by one in such a manner that wireless resources do not overlap between the terminals.

10 Claims, 42 Drawing Sheets

(56) References Cited

U.S. PATENT DOCUMENTS

| | | | |
|---|---|---|---|
| 2018/0132264 A1* | 5/2018 | Jung | H04L 1/1854 |
| 2018/0191398 A1* | 7/2018 | Kobayashi | H04B 1/69 |
| 2019/0075468 A1* | 3/2019 | Fujii | H04W 16/04 |
| 2019/0268923 A1* | 8/2019 | Sundararajan | H04W 72/1268 |
| 2019/0327716 A1* | 10/2019 | Wang | H04B 17/364 |
| 2021/0058940 A1* | 2/2021 | Choi | H04L 5/001 |

FOREIGN PATENT DOCUMENTS

| | | | |
|---|---|---|---|
| JP | 6259550 B1 | 1/2018 | |
| KR | 10-2016-0043961 A | 4/2016 | |
| WO | 2015/022091 A1 | 2/2015 | |
| WO | 2016/009639 A1 | 1/2016 | |
| WO | WO-2017212810 A1 * | 12/2017 | H04B 1/04 |

* cited by examiner

*FIG. 10*

| TERMINAL ID | REFERENCE TIME | INTERMITTENT CYCLE | OFFSET TIME | FREQUENCY |
|---|---|---|---|---|
| A | $T_1$ | T | | |
| B | $T_2$ | T | DETERMINED ON BASIS OF RANDOM NUMBER GENERATED FROM TERMINAL ID AND TRANSMISSION TIME FOR EACH TRANSMISSION | |
| C | $T_1$ | 2T | | |
| D | $T_1$ | 3T | | |
| E | $T_1$ | 2T | | |
| F | $T_2$ | T | | |

| ID | TEMPORARILY ALLOCATED RB NUMBER | | | $R_x$ | MAINLY ALLOCATED RB NUMBER |
|---|---|---|---|---|---|
| | 1st | 2nd | 3rd | | |
| A | 1 | 5 | 9 | | |
| B | 2 | 4 | 7 | | |
| C | 1 | 5 | 9 | | |
| D | 2 | 6 | 8 | | |
| E | 3 | 5 | 7 | | |
| F | 3 | 4 | 8 | | |

| ID | TEMPORARILY ALLOCATED RB NUMBER | | | $R_x$ | MAINLY ALLOCATED RB NUMBER |
|---|---|---|---|---|---|
| | 1st | 2nd | 3rd | | |
| A | 1 | 5 | 9 | 4 | |
| B | 2 | 4 | 7 | 4 | |
| C | 1 | 5 | 9 | 4 | |
| D | 2 | 6 | 0 | 2 | |
| E | 3 | 5 | 7 | 4 | |
| F | 3 | 4 | 8 | 3 | |

| ID | TEMPORARILY ALLOCATED RB NUMBER | | | $R_x$ | MAINLY ALLOCATED RB NUMBER |
|---|---|---|---|---|---|
| | 1st | 2nd | 3rd | | |
| A | 1 | 0 | 0 | 1 | 1 |
| B | 2 | 4 | 7 | 4 | |
| C | 0 | 5 | 9 | 4 | |
| D | 2 | 6 | 0 | 2 | |
| E | 3 | 5 | 7 | 4 | |
| F | 3 | 4 | 8 | 3 | |

| ID | TEMPORARILY ALLOCATED RB NUMBER | | | $R_x$ | MAINLY ALLOCATED RB NUMBER |
|---|---|---|---|---|---|
| | 1st | 2nd | 3rd | | |
| A | 1 | 0 | 0 | 1 | 1 |
| B | 2 | 0 | 0 | 1 | 2 |
| C | 0 | 5 | 9 | 4 | |
| D | 0 | 6 | 0 | 2 | |
| E | 3 | 5 | 7 | 4 | |
| F | 3 | 4 | 8 | 3 | |

| ID | TEMPORARILY ALLOCATED RB NUMBER | | | $R_x$ | MAINLY ALLOCATED RB NUMBER |
|---|---|---|---|---|---|
| | 1st | 2nd | 3rd | | |
| A | 1 | 0 | 0 | 1 | 1 |
| B | 2 | 0 | 0 | 1 | 2 |
| C | 0 | 5 | 9 | 4 | |
| D | 0 | 6 | 0 | 2 | |
| E | 3 | 0 | 0 | 1 | 3 |
| F | 0 | 4 | 8 | 2 | |

| ID | TEMPORARILY ALLOCATED RB NUMBER | | | $R_x$ | MAINLY ALLOCATED RB NUMBER |
| --- | --- | --- | --- | --- | --- |
| | 1st | 2nd | 3rd | | |
| A | 1 | 0 | 0 | 1 | 1 |
| B | 2 | 0 | 0 | 1 | 2 |
| C | 0 | 5 | 0 | 2 | 5 |
| D | 0 | 6 | 0 | 2 | 6 |
| E | 3 | 0 | 0 | 1 | 3 |
| F | 0 | 4 | 0 | 2 | 4 |

| ID | TEMPORARILY ALLOCATED RB NUMBER | | $R_x$ | MAINLY ALLOCATED RB NUMBER |
|---|---|---|---|---|
| | 1st | 2nd | | |
| A | 1 | 5 | 3 | |
| B | 2 | 6 | 3 | |
| C | 3 | 7 | 3 | |
| D | 4 | 8 | 3 | |
| E | 1 | 6 | 3 | |
| F | 2 | 7 | 3 | |
| G | 3 | 8 | 3 | |
| H | 4 | 5 | 3 | |

| RB NUMBER | $N_{STA}$ |
|---|---|
| 1 | 0 |
| 2 | 0 |
| 3 | 0 |
| 4 | 0 |
| 5 | 0 |
| 6 | 0 |
| 7 | 0 |
| 8 | 0 |

| ID | TEMPORARILY ALLOCATED RB NUMBER | | $R_x$ | MAINLY ALLOCATED RB NUMBER |
|---|---|---|---|---|
| | 1st | 2nd | | |
| A | 1 | 0 | 1 | 1 |
| B | 2 | 6 | 3 | |
| C | 3 | 7 | 3 | |
| D | 4 | 8 | 3 | |
| E | 0 | 6 | 3 | |
| F | 2 | 7 | 3 | |
| G | 3 | 8 | 3 | |
| H | 4 | 5 | 3 | |

| RB NUMBER | $N_{STA}$ |
|---|---|
| 1 | 0 |
| 2 | 0 |
| 3 | 0 |
| 4 | 0 |
| 5 | 0 |
| 6 | 1 |
| 7 | 0 |
| 8 | 0 |

| ID | TEMPORARILY ALLOCATED RB NUMBER | | $R_x$ | MAINLY ALLOCATED RB NUMBER |
|---|---|---|---|---|
| | 1st | 2nd | | |
| A | 1 | 0 | 1 | 1 |
| B | 2 | 0 | 1 | 2 |
| C | 3 | 7 | 3 | |
| D | 4 | 8 | 3 | |
| E | 0 | 6 | 3 | |
| F | 0 | 7 | 3 | |
| G | 3 | 8 | 3 | |
| H | 4 | 5 | 3 | |

| RB NUMBER | $N_{STA}$ |
|---|---|
| 1 | 0 |
| 2 | 0 |
| 3 | 0 |
| 4 | 0 |
| 5 | 0 |
| 6 | 1 |
| 7 | 1 |
| 8 | 0 |

| ID | TEMPORARILY ALLOCATED RB NUMBER | | $R_x$ | MAINLY ALLOCATED RB NUMBER |
|---|---|---|---|---|
| | 1st | 2nd | | |
| A | 1 | 0 | 1 | 1 |
| B | 2 | 0 | 1 | 2 |
| C | 3 | 0 | 1 | 3 |
| D | 4 | 8 | 3 | |
| E | 0 | 6 | 3 | |
| F | 0 | 7 | 3 | |
| G | 0 | 8 | 3 | |
| H | 4 | 5 | 3 | |

| RB NUMBER | $N_{STA}$ |
|---|---|
| 1 | 0 |
| 2 | 0 |
| 3 | 0 |
| 4 | 0 |
| 5 | 0 |
| 6 | 1 |
| 7 | 1 |
| 8 | 1 |

| ID | TEMPORARILY ALLOCATED RB NUMBER | | $R_x$ | MAINLY ALLOCATED RB NUMBER |
|---|---|---|---|---|
| | 1st | 2nd | | |
| A | 1 | 0 | 1 | 1 |
| B | 2 | 0 | 1 | 2 |
| C | 3 | 0 | 1 | 3 |
| D | 4 | 0 | 1 | 4 |
| E | 0 | 6 | 3 | |
| F | 0 | 7 | 3 | |
| G | 0 | 8 | 3 | |
| H | 0 | 5 | 3 | |

| RB NUMBER | $N_{STA}$ |
|---|---|
| 1 | 0 |
| 2 | 0 |
| 3 | 0 |
| 4 | 0 |
| 5 | 1 |
| 6 | 1 |
| 7 | 1 |
| 8 | 1 |

| ID | TEMPORARILY ALLOCATED RB NUMBER | | $R_x$ | MAINLY ALLOCATED RB NUMBER |
|---|---|---|---|---|
| | 1st | 2nd | | |
| A | 1 | 0 | 1 | 1 |
| B | 2 | 0 | 1 | 2 |
| C | 3 | 0 | 1 | 3 |
| D | 4 | 0 | 1 | 4 |
| E | 0 | 6 | 2 | 6 |
| F | 0 | 7 | 2 | 7 |
| G | 0 | 8 | 2 | 8 |
| H | 0 | 5 | 2 | 5 |

| RB NUMBER | $N_{STA}$ |
|---|---|
| 1 | 0 |
| 2 | 0 |
| 3 | 0 |
| 4 | 0 |
| 5 | 1 |
| 6 | 1 |
| 7 | 1 |
| 8 | 1 |

| ID | $N_{req}$ | TEMPORARILY ALLOCATED RB NUMBER | | | $R_x$ | MAINLY ALLOCATED RB NUMBER |
|---|---|---|---|---|---|---|
| | | 1st | 2nd | 3rd | | |
| A | | 1 | 5 | 9 | | |
| B | | 2 | 4 | 7 | | |
| C | | 1 | 5 | 9 | | |
| D | | 2 | 6 | 8 | | |
| E | | 3 | 5 | 7 | | |
| F | | 3 | 4 | 8 | | |

| RB NUMBER | $N_{STA}$ |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |

| ID | $N_{req}$ | TEMPORARILY ALLOCATED RB NUMBER | | | $R_x$ | MAINLY ALLOCATED RB NUMBER |
|---|---|---|---|---|---|---|
| | | 1st | 2nd | 3rd | | |
| A | 0 | 1 | 5 | 9 | 4 | |
| B | 3 | 2 | 4 | 7 | 4 | |
| C | 2 | 1 | 5 | 9 | 4 | |
| D | 1 | 2 | 6 | 0 | 2 | |
| E | 1 | 3 | 5 | 7 | 4 | |
| F | 1 | 3 | 4 | 8 | 3 | |

| RB NUMBER | $N_{STA}$ |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |

| ID | $N_{req}$ | TEMPORARILY ALLOCATED RB NUMBER | | | $R_x$ | MAINLY ALLOCATED RB NUMBER |
|---|---|---|---|---|---|---|
| | | 1st | 2nd | 3rd | | |
| A | 0 | 0 | 5 | 9 | 4 | |
| B | 3 | 2 | 4 | 7 | 4 | |
| C | 2 | 1 | 0 | 0 | 1 | 1 |
| D | 1 | 2 | 6 | 0 | 2 | |
| E | 1 | 3 | 5 | 7 | 4 | |
| F | 1 | 3 | 4 | 8 | 3 | |

| RB NUMBER | $N_{STA}$ |
|---|---|
| 1 | 0 |
| 2 | 0 |
| 3 | 0 |
| 4 | 0 |
| 5 | 1 |
| 6 | 0 |
| 7 | 0 |
| 8 | 0 |
| 9 | 0 |

| ID | $N_{req}$ | TEMPORARILY ALLOCATED RB NUMBER | | | $R_x$ | MAINLY ALLOCATED RB NUMBER |
|---|---|---|---|---|---|---|
| | | 1st | 2nd | 3rd | | |
| A | 0 | 0 | 5 | 9 | 4 | |
| B | 3 | 2 | 0 | 0 | 1 | 2 |
| C | 2 | 1 | 0 | 0 | 1 | 1 |
| D | 1 | 0 | 6 | 0 | 2 | |
| E | 1 | 3 | 5 | 7 | 4 | |
| F | 1 | 3 | 4 | 8 | 3 | |

| RB NUMBER | $N_{STA}$ |
|---|---|
| 1 | 0 |
| 2 | 0 |
| 3 | 0 |
| 4 | 0 |
| 5 | 1 |
| 6 | 1 |
| 7 | 0 |
| 8 | 0 |
| 9 | 0 |

| ID | $N_{req}$ | TEMPORARILY ALLOCATED RB NUMBER | | | $R_x$ | MAINLY ALLOCATED RB NUMBER |
|---|---|---|---|---|---|---|
| | | 1st | 2nd | 3rd | | |
| A | 0 | 0 | 5 | 9 | 4 | |
| B | 3 | 2 | 0 | 0 | 1 | 2 |
| C | 2 | 1 | 0 | 0 | 1 | 1 |
| D | 1 | 0 | 6 | 0 | 2 | |
| E | 1 | 3 | 0 | 0 | 1 | 3 |
| F | 1 | 0 | 4 | 8 | 2 | |

| RB NUMBER | $N_{STA}$ |
|---|---|
| 1 | 0 |
| 2 | 0 |
| 3 | 0 |
| 4 | 1 |
| 5 | 1 |
| 6 | 1 |
| 7 | 0 |
| 8 | 0 |
| 9 | 0 |

| ID | $N_{req}$ | TEMPORARILY ALLOCATED RB NUMBER | | | $R_x$ | MAINLY ALLOCATED RB NUMBER |
|---|---|---|---|---|---|---|
| | | 1st | 2nd | 3rd | | |
| A | 0 | 0 | 5 | 0 | 2 | 5 |
| B | 3 | 2 | 0 | 0 | 1 | 2 |
| C | 2 | 1 | 0 | 0 | 1 | 1 |
| D | 1 | 0 | 6 | 0 | 2 | 6 |
| E | 1 | 3 | 0 | 0 | 1 | 3 |
| F | 1 | 0 | 4 | 0 | 2 | 4 |

| RB NUMBER | $N_{STA}$ |
|---|---|
| 1 | 0 |
| 2 | 0 |
| 3 | 0 |
| 4 | 1 |
| 5 | 1 |
| 6 | 1 |
| 7 | 0 |
| 8 | 0 |
| 9 | 0 |

COMMUNICATION DEVICE AND COMMUNICATION METHOD

CROSS REFERENCE TO RELATED APPLICATIONS

This application is a U.S. National Phase of International Patent Application No. PCT/JP2020/018884 filed May 11, 2020, which claims priority benefit of Japanese Patent Application No. JP 2019-119150, filed in the Japan Patent Office on Jun. 26, 2019. Each of the above-referenced applications is hereby incorporated herein by reference in its entirety.

TECHNICAL FIELD

The technology disclosed herein relates to a communication device and a communication method for performing processing related to a wireless resource for downlink frame transmission from a base station to a terminal.

BACKGROUND ART

In a wireless system in which communication is performed with time synchronization between a base station and a terminal (see, for example, Patent Document 1), it is assumed that it is difficult to maintain a long-time reception state due to battery life of the terminal. As an approach to such a problem, power saving by intermittent operation of terminals has been studied. The terminal is expected to be capable of reducing power consumption by an intermittent operation of cyclically switching between a reception state and a sleep state at a predetermined timing.

In the method described above, it is necessary for the base station to transmit, to each terminal in advance, a control frame that stores information regarding the intermittent operation (for example, "intermittent parameters" such as a cycle and a timing of performing the intermittent operation). Thus, it is necessary to allocate wireless resources for signaling related to control information including the intermittent parameter, and resources available for downlink transmission of data frames are reduced.

For example, a system is considered in which the intermittent parameters are stored in advance in an internal storage area of the terminal, and the intermittent parameters corresponding to the ID of each terminal are registered in a database. In such a system, even in a state where no exchange is performed between the base station and the terminal, the base station can transmit the intermittent parameters while grasping the intermittent parameters of the terminal in advance by using the database, and the terminal can receive the downlink frame from the base station while reducing the power consumption by the intermittent operation.

Here, the intermittent parameters include a reference time as a start point of transmission of the downlink frame, an intermittent cycle, and an offset value added to a transmission start time calculated from the reference time and the intermittent cycle, and are fixed values for each terminal. Furthermore, the frequency to be used is also a fixed value for each terminal. However, there is a possibility that there will be many situations where wireless resources to be used overlap between terminals having similar cycles and offset value parameters, and the base station cannot transmit to a specific terminal. In addition, in a case where the frequency used by each terminal is fixed, there is a possibility that the terminal is largely affected by interference from other systems using the same frequency.

CITATION LIST

Patent Document

Patent Document 1: Japanese Patent No. 6259550

SUMMARY OF THE INVENTION

Problems to be Solved by the Invention

An object of the technology disclosed herein is to provide a communication device and a communication method for determining a wireless resource for downlink without performing signaling between a base station and a terminal.

Furthermore, another object of the technology disclosed herein is to provide a communication device and a communication method that flexibly determine a wireless resource used for transmission.

Solutions to Problems

The technology disclosed herein has been made in view of the problems described above, and a first aspect thereof is a communication device including a communication unit that transmits and receives a wireless signal, and a wireless resource determination unit that determines a wireless resource to be used for transmission and reception, in which the wireless resource determination unit determines, in a communication system including a base station and a terminal, a wireless resource to be used for downlink communication on the basis of a common rule between the base station and the terminal.

The wireless resource determination unit determines the wireless resource to be used for downlink communication from a random number sequence generated by a pseudo random number generator shared between the base station and the terminal by using information of the terminal as a downlink destination and time information as initial values.

The wireless resource determination unit uses a start time of a slot as the time information as an initial value, and determines the wireless resource to be used for downlink communication, one by each terminal, in the slot as a transmission cycle.

Alternatively, the wireless resource determination unit uses a start time of subslots obtained by dividing the slot into a plurality as the time information as an initial value, determines, one by each terminal, a candidate for the wireless resource to be used for downlink communication in each of the subslots, and then selects a plurality of candidates for each terminal one by one in such a manner that wireless resources do not overlap between the terminals.

Furthermore, a second aspect of the technology disclosed herein is a communication method including:

determining, in a communication system including a base station and a terminal, a wireless resource to be used for downlink communication on the basis of a common rule between the base station and the terminal; and performing processing related to downlink communication using the determined wireless resource.

Effects of the Invention

According to the technology disclosed herein, it is possible to provide a communication device and a communication method for determining a wireless resource for downlink without performing signaling between a base station and a terminal.

According to the technology disclosed herein, it is possible to provide a communication device and a communication method that flexibly determine a wireless resource used for transmission.

Note that the effects described herein are merely examples, and the effects brought by the technology disclosed herein are not limited thereto. Furthermore, the technology disclosed herein may further exhibit additional effects in addition to the effects described above.

Other objects, features, and advantages of the technology disclosed herein will become apparent from a detailed description based on embodiments described below and the accompanying drawings.

BRIEF DESCRIPTION OF DRAWINGS

FIG. 10 is a diagram illustrating an example (the first embodiment) of calculation results of the wireless resources of terminals A to F.

MODE FOR CARRYING OUT THE INVENTION

Hereinafter, embodiments of the technology disclosed herein will be described in detail with reference to the drawings. However, communication performed from the base station to the terminal is also referred to as downlink (DL), and communication performed from the terminal to the base station is also referred to as uplink (UL).

First Embodiment

Figure 1:
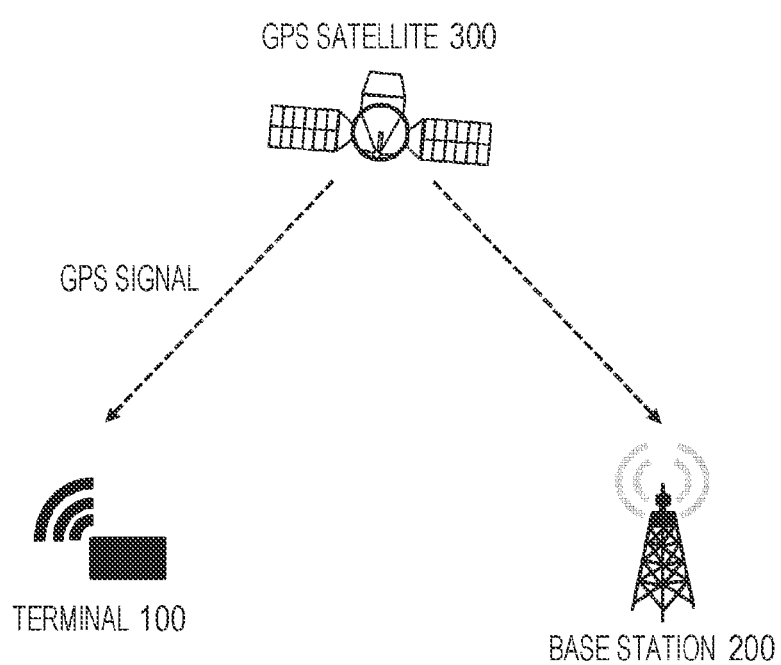
FIG. 1 is a diagram illustrating a configuration example of a communication system according to a first embodiment.

FIG. 1 schematically illustrates a configuration example of a communication system according to a first embodiment. The illustrated communication system includes a terminal 100 and a base station 200. Although it is assumed that a plurality of terminals is connected to the base station 200, only one terminal 100 is illustrated for simplification of the diagram.

The terminal 100 is mounted with a global positioning system (GPS) receiver that receives a GPS signal from a GPS satellite 300, acquires time information on the basis of the GPS signal, and performs synchronization with the base station 200. Furthermore, the terminal 100 retains in advance a cycle of intermittently performing a reception operation and a reference time to be a start point. Then, the terminal 100 receives a DL frame transmitted by the base station 200, performs demodulation processing, and periodically transmits a UL frame to the base station 200. The terminal 100 is, for example, an Internet of Things (IoT) device that transmits sensor information.

The base station 200 is equipped with a GPS receiver, acquires time information by receiving the GPS signal, and performs synchronization with the terminal 100. Furthermore, the base station 200 retains the ID of each terminal (including the terminal 100), and the intermittent cycle and the reference time described above. Then, the base station 200 receives the UL frame transmitted by the terminal 100, performs demodulation processing, and periodically transmits the DL frame to the terminal 100.

Figure 2:
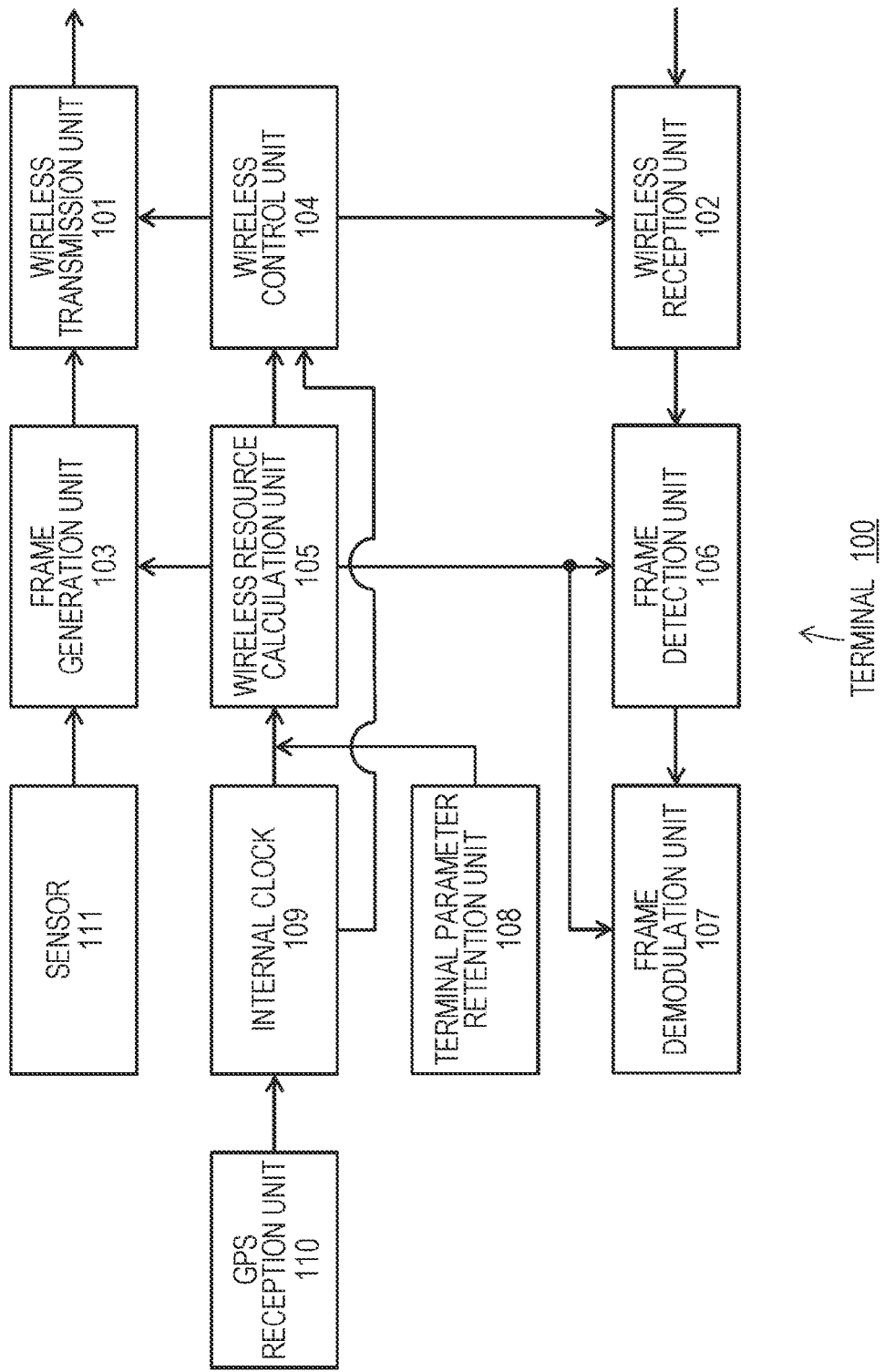
FIG. 2 is a diagram illustrating an internal configuration example of a communication device that operates as a terminal 100.

FIG. 2 illustrates an internal configuration example of a communication device that operates as the terminal 100. The terminal 100 includes a wireless transmission unit 101, a wireless reception unit 102, a frame generation unit 103, a wireless control unit 104, a wireless resource calculation unit 105, a frame detection unit 106, a frame demodulation unit 107, a terminal parameter retention unit 108, an internal clock 109, a GPS reception unit 110, and a sensor 111.

The wireless transmission unit 101 transmits a wireless signal. Specifically, under control of the wireless control unit 104, the wireless transmission unit 101 converts the UL frame generated by the frame generation unit 103 into a wireless signal and transmits the wireless signal as radio waves.

The wireless reception unit 102 receives a wireless signal. Specifically, under the control of the wireless control unit 104, the wireless reception unit 102 receives radio waves, converts the radio waves into a wireless signal, and passes the wireless signal to the frame detection unit 106.

The frame generation unit 103 generates the UL frame to be transmitted to the base station 200 on the basis of a code obtained from the wireless resource calculation unit 105. In the frame to be transmitted to the base station 200, for example, sensor information acquired by the sensor 111 is stored.

The wireless control unit 104 acquires a current time from the internal clock 109, and causes the wireless transmission unit 101 to transmit the UL frame at a transmission time and a transmission frequency obtained from the wireless resource calculation unit 105. Furthermore, the wireless control unit 104 acquires, from the wireless resource calculation unit 105, a time and a frequency at which the DL frame from the base station 200 is to be received, and causes the wireless reception unit 102 to perform reception processing at the corresponding time and frequency.

The wireless resource calculation unit 105 determines a time, a frequency, and codes (a SYNC code and a scramble code) at and with which the UL frame is transmitted to base station 200 on the basis of information obtained from the internal clock 109 and the terminal parameter retention unit 108. Furthermore, the wireless resource calculation unit 105 determines a time, a frequency, and codes at and with which the DL frame is received from the base station 200. The wireless resource calculation unit 105 supplies information of the determined time, frequency, and codes to the frame generation unit 103, the wireless control unit 104, the frame detection unit 106, and the frame demodulation unit 107.

The frame detection unit 106 detects a frame from a received signal received by the wireless reception unit 102. Specifically, the frame detection unit 106 extracts a signal of a target frequency from a broadband signal, generates a known sequence from the SYNC code and the scramble code determined by the wireless resource calculation unit 105, calculates a correlation value between the known sequence and the received signal, and determines that the frame is detected in a case where the correlation value is a certain value or more.

The frame demodulation unit 107 demodulates the frame from the received signal. Specifically, the frame demodulation unit 107 descrambles the received signal using the scramble code calculated by the wireless resource calculation unit 105 on the basis of the time when the frame detection unit 106 detects the frame. Thereafter, the frame demodulation unit 107 extracts a payload portion of the frame from the received signal, and performs error correction code decoding processing and error correction using a cyclic redundancy code (CRC).

The terminal parameter retention unit 108 retains a terminal ID of the terminal 100 itself and the intermittent parameters of the terminal 100 (the cycle of the intermittent operation and the reference time). The terminal parameter retention unit 108 supplies the retained terminal ID and intermittent parameters to the wireless resource calculation unit 105.

The internal clock 109 acquires the time information from the GPS reception unit 110, and calculates the current time by measuring the elapsed time from the acquired time point. The internal clock 109 supplies the current time to the wireless control unit 104 and the wireless resource calculation unit 105.

The GPS reception unit 110 receives the GPS signal from the GPS satellite 300, and acquires position information and time information of the terminal 100.

The sensor 111 includes a sensor element that acquires information of outside or inside of the terminal 100. The sensor information acquired by the sensor 111 is stored in a transmission frame to the base station 200. For example, a temperature sensor or an acceleration sensor corresponds to the sensor 111. In a case where it is desired to acquire the position information as the sensor information, the GPS reception unit 110 may also serve as the sensor 111.

Note that in a case where the terminal 100 receives only the DL frame from the base station 200 and does not transmit the UL frame to the base station 200, the frame generation unit 103 and the wireless transmission unit 101 are unnecessary (in some cases, the sensor 111 is also unnecessary.). Furthermore, in a case where the terminal 100 transmits only the UL frame to the base station 200 and does not receive the DL frame from the base station 200, the wireless reception unit 102, the frame detection unit 106, and the frame demodulation unit 107 are unnecessary.

Figure 3:
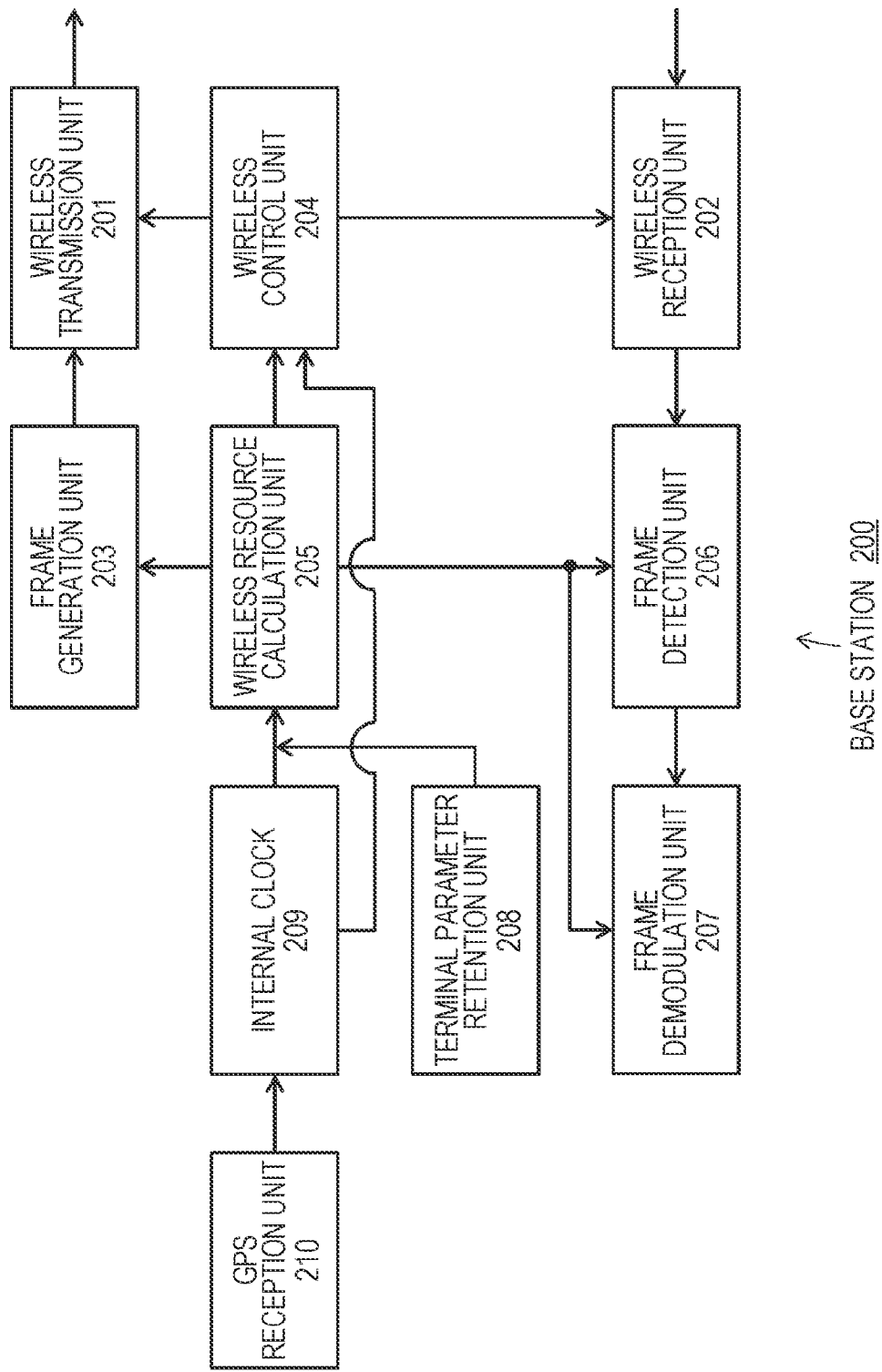
FIG. 3 is a diagram illustrating an internal configuration example of a communication device that operates as a base station 200.

FIG. 3 illustrates an internal configuration example of a communication device that operates as the base station 200. The base station 200 includes a wireless transmission unit 201, a wireless reception unit 202, a frame generation unit 203, a wireless control unit 204, a wireless resource calculation unit 205, a frame detection unit 206, a frame demodulation unit 207, a terminal parameter retention unit 208, an internal clock 209, and a GPS reception unit 210.

The wireless transmission unit 201 transmits a wireless signal. Specifically, under control of the wireless control unit 204, the wireless transmission unit 201 converts the DL frame generated by the frame generation unit 203 into a wireless signal and transmits the wireless signal as radio waves.

The wireless reception unit 202 receives a wireless signal. Specifically, under the control of the wireless control unit 204, the wireless reception unit 202 receives radio waves, converts the radio waves into a wireless signal, and passes the wireless signal to the frame detection unit 206.

The frame generation unit 203 generates the DL frame to be transmitted to the terminal 100 on the basis of the code obtained from the wireless resource calculation unit 205.

The wireless control unit 204 acquires a current time from the internal clock 209, and causes the wireless transmission unit 201 to transmit the DL frame at a transmission time and a transmission frequency obtained from the wireless resource calculation unit 205. Furthermore, the wireless control unit 204 acquires a time and a frequency at which the UL frame from the terminal 100 is received from the wireless resource calculation unit 205, and causes the wireless reception unit 202 to perform the reception processing at the corresponding time and frequency.

The wireless resource calculation unit 205 determines a time, a frequency, and codes (a SYNC code and a scramble code) at and with which the DL frame is transmitted to the terminal 100 one each by each slot on the basis of information obtained from the internal clock 209 and the terminal parameter retention unit 208. Furthermore, the wireless resource calculation unit 205 determines a time, a frequency, and codes at and with which the UL frame is received from the terminal 100. The wireless resource calculation unit 205 supplies information of the determined time, frequency, and codes to the frame generation unit 203, the wireless control unit 204, the frame detection unit 206, and the frame demodulation unit 207.

The frame detection unit 206 detects a frame from a reception signal from the wireless reception unit 202. Specifically, the frame detection unit 206 extracts a signal of a target frequency from a broadband signal, generates a known sequence from the SYNC code and the scramble code determined by the wireless resource calculation unit 205, calculates a correlation value between the known sequence and the received signal, and determines that the frame is detected in a case where the correlation value is a certain value or more.

The frame demodulation unit 207 demodulates a frame from the received signal. Specifically, the frame demodulation unit 207 descrambles the received signal using the scramble code calculated by the wireless resource calculation unit 205 on the basis of the time when the frame detection unit 206 detects the frame. Thereafter, the frame demodulation unit 207 extracts the payload portion of the frame from the received signal, and performs error correction code decoding processing and error correction using the CRC.

The terminal parameter retention unit 208 retains a terminal ID of each terminal (including the terminal 100) connected to the base station 200 and intermittent parameters (a cycle of performing an intermittent operation and a reference time) for each terminal.

The internal clock 209 acquires the time information from the GPS reception unit 210, and calculates the current time by measuring the elapsed time from the acquired time point. The internal clock 209 supplies the current time to the wireless control unit 204 and the wireless resource calculation unit 205.

The GPS reception unit 210 receives the GPS signal from the GPS satellite 300 and acquires the time information.

Note that in a case where the base station 200 only receives the UL frame from the terminal 100 and does not transmit the frame to the terminal 100, the frame generation unit 203 and the wireless transmission unit 201 are unnecessary. In addition, in a case where the base station 200 transmits only the DL frame to the terminal 100 and does not receive the frame from the terminal 100, the wireless reception unit 202, the frame detection unit 206, and the frame demodulation unit 207 are unnecessary.

Figure 4:
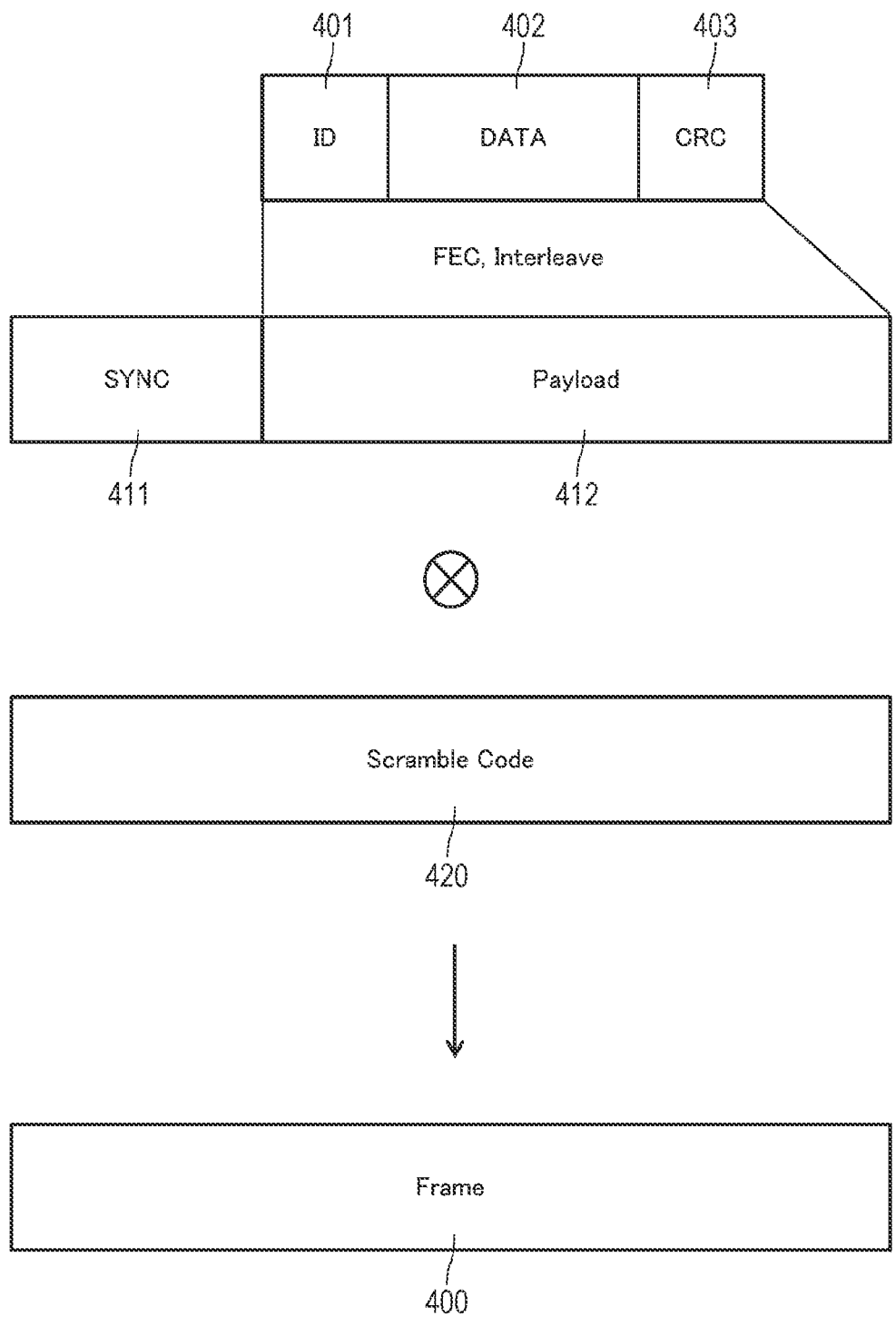
FIG. 4 is a diagram illustrating a configuration example of a frame.

FIG. 4 illustrates a configuration example of a frame transmitted and received between the terminal 100 and the base station 200 in the communication system illustrated in FIG. 1. Here, configurations of the UL frame and the DL frame are identical.

The illustrated frame 400 includes fields of ID, DATA, and CRC indicated by reference numerals 401, 402, and 403, respectively. The ID field 401 stores a terminal-specific identifier of the transmission source of the frame 400. The DATA field 402 stores transmission data. In a case where the frame 400 is a UL frame, the sensor information acquired by the sensor 111 is stored in the DATA field 402. The CRC field 403 stores a CRC value calculated for data stored in the ID field 401 and the DATA field 402. The reception side of the frame 400 uses the CRC value for determination of successful reception.

A payload 412 of a frame is generated by performing processing of foeward error correction (FEC) or processing of order rearrangement (interleaving) on a sequence in which ID, DATA, and CRC are concatenated. The error correction is a process of improving error correction by adding redundant bits to an input bit sequence. An error tolerance capability increases according to a length of the redundant bits. Therefore, by the signal processing described above, the length of the payload 412 becomes longer than a sum of original data (ID, DATA, CRC).

Thereafter, a SYNC code 411 used for frame detection on the reception side is concatenated to a head of the payload 412, and then an exclusive OR (XOR) is calculated for each bit by a scramble code 420 to complete the frame 400.

The SYCN code and the scramble code used in the frame 400 are codes calculated by the wireless resource calculation unit 105 on the terminal 100 side or the wireless resource calculation unit 205 on the base station 200 side.

Next, a method of calculating wireless resources used in DL communication will be described.

Figure 5:
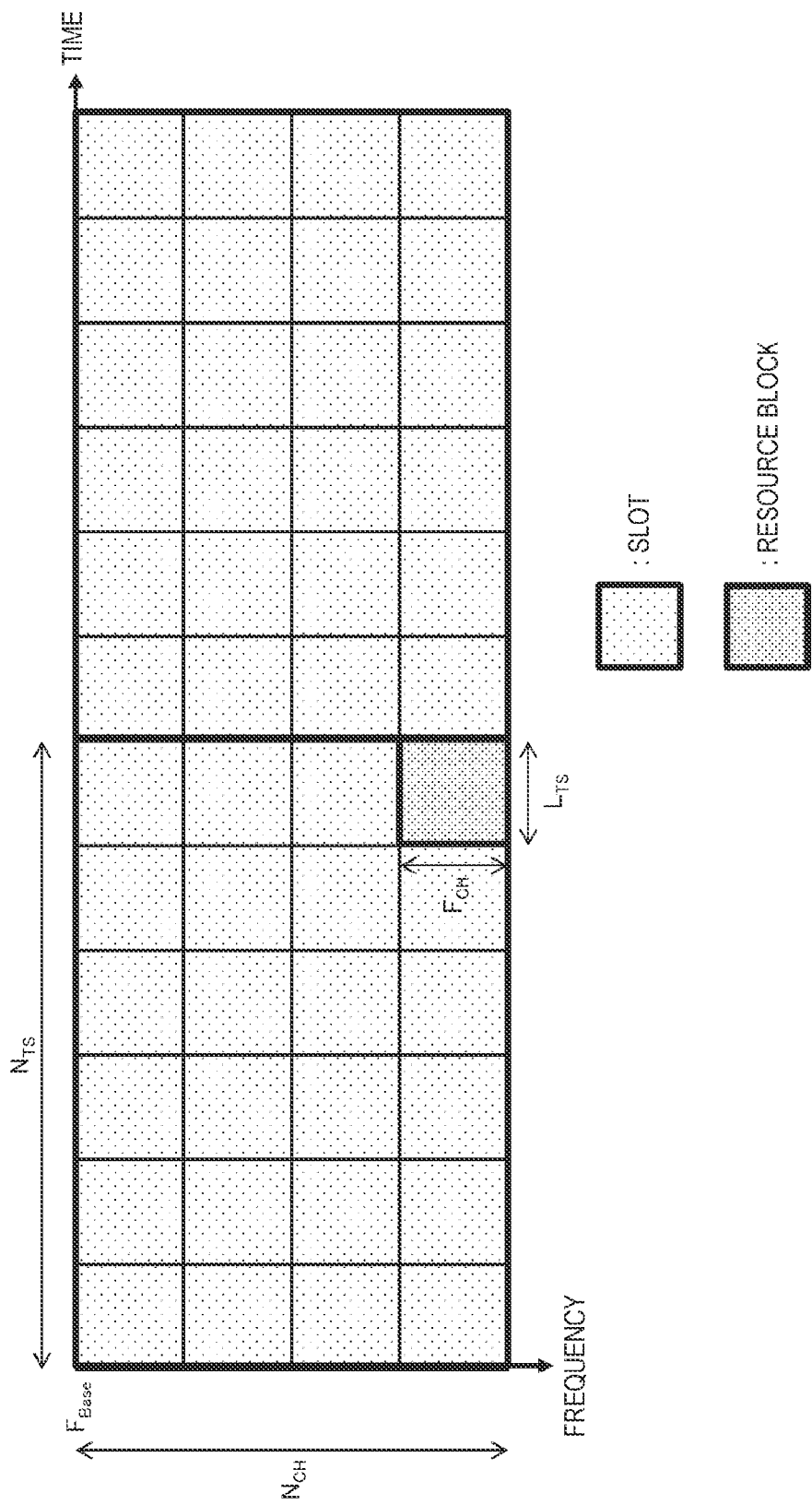
FIG. 5 is a diagram illustrating an outline (the first embodiment) of wireless resources.

FIG. 5 illustrates an outline of wireless resources in the communication system illustrated in FIG. 1. In the drawing, a horizontal axis is a time axis, and a vertical axis is a frequency axis. The minimum unit on the time axis is treated as a time slot, and the minimum unit on the frequency axis is treated as a channel. Hereinafter, the bandwidth of a channel is $F_{CH}$ (MHz), and a time slot length is $L_{TS}$ (microseconds). Then, one time slot×one channel is a "resource block" which is a minimum unit of the wireless resources. Furthermore, a lump of resource blocks including consecutive $N_{TS}$ time slots and consecutive $N_{CH}$ channels is treated as a "slot". In the example illustrated in FIG. 5, $N_{TS}=6$ and $N_{CH}=4$. The communication system operates using slots, that is, $N_{TS}$ time slots, as a transmission cycle.

In the first embodiment, it is assumed that one resource block is allocated and used in each slot as a wireless resource for the DL frame.

Next, respective methods for calculating the time, the frequency, and the codes among the wireless resources to be used for transmission of the DL frame will be sequentially described.

Figure 6:
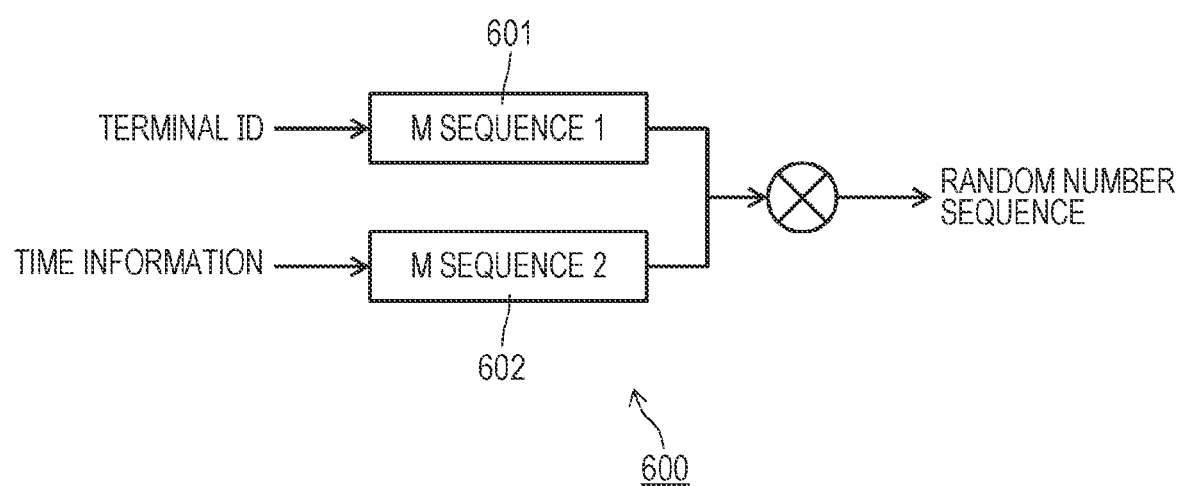
FIG. 6 is a diagram illustrating a pseudo random number generator used to determine a transmission time.

Time:

FIG. 6 illustrates a pseudo random number generator used to determine the transmission time of the DL frame. The illustrated pseudo random number generator 600 is a gold code generator using two M sequences 601 and 602. A terminal ID and time information are set as initial values of the M sequences 601 and 602, respectively. In the first embodiment, since the resource block is allocated for each slot, a start time of the slot is used as the time information of an initial value. Then, the transmission time is determined according to the following Equation (1) using a random number sequence generated by the pseudo random number generator 600.

[Equation 1]

$$T_R = t + L_{TS} \times \mathrm{mod}\left(\frac{x}{N_{TS}}\right) \quad (1)$$

$T_R$: Frame transmission start time
t: Start time of slot
$T_{TS}$: length
x: Random number sequence generated by pseudo random number generator
$N_{TS}$: Number of time slots in each slot Frequency:

Similarly to the time, the transmission frequency is also determined using the pseudo random number generator. A combination of M sequence generator polynomials of the pseudo random number generator used to determine the transmission frequency may be the same as or different from that used to determine the transmission time. The terminal ID and the start time of the slot are set as initial values of each M sequence. The transmission frequency (transmission channel) is determined according to the following equation (2) using the random number sequence generated by the pseudo random number generator.

[Equation 2]

$$F_R = F_{BASE} + F_{CB} \times \mathrm{mod}\left(\frac{x}{N_{CH}}\right) \quad (2)$$

$F_R$: Frame transmission frequency
x: Random number sequence generated by pseudo random number generator
$N_{CH}$: Number of channels in each slot
$F_{BASE}$: Lowest center frequency among channels in each slot
$F_{CH}$: Channel interval
Sign:

The SYNC code and the scramble code are generated using the pseudo random number generator similarly to the time and the frequency. A combination of M sequence generator polynomials of the pseudo random number generator used for generation may be the same as or different from that used for the transmission time and the transmission frequency. The terminal ID and the start time of the slot are set as initial values of each M sequence. It is assumed that a length matching a SYNC length of the frame and a length matching a frame length are obtained for the SYNC code and the scramble code, respectively, by the pseudo random number generator.

Figure 7:
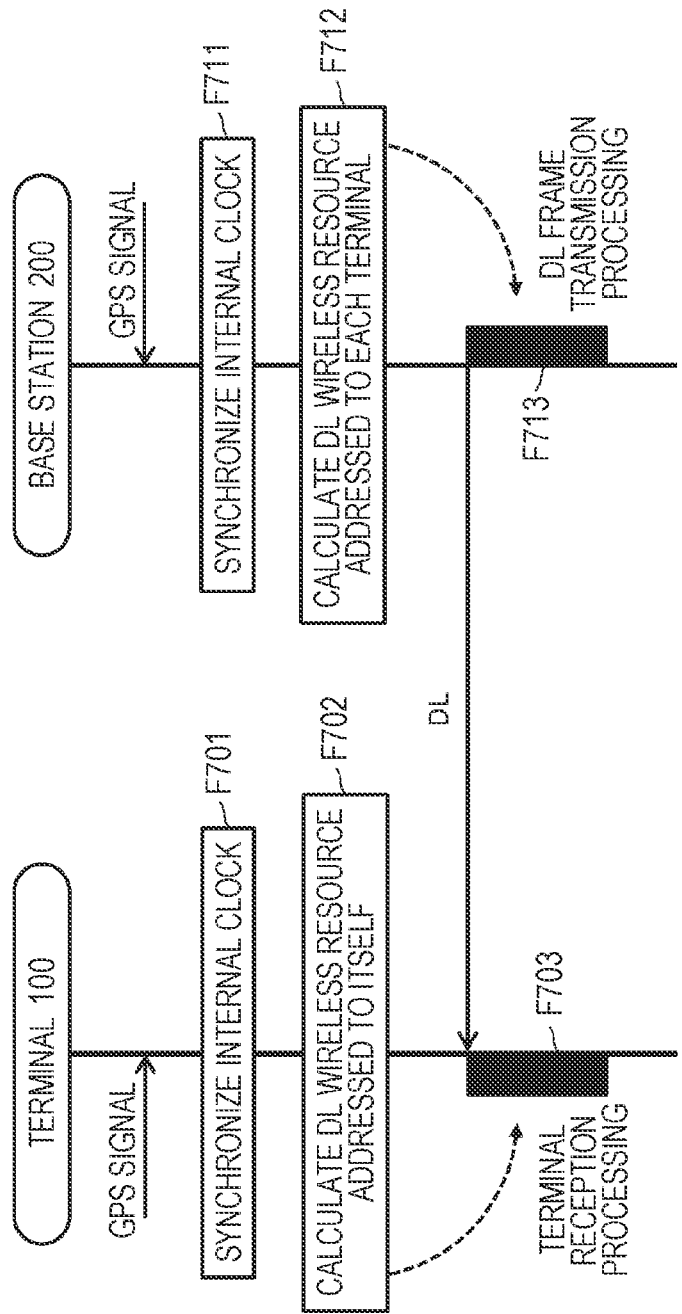
FIG. 7 is a diagram illustrating a processing flow (the first embodiment) of the entire communication system at a time of DL communication.

FIG. 7 illustrates a processing flow of the entire communication system at the time of DL communication.

First, after receiving the GPS signal, the terminal 100 and the base station 200 synchronize the internal clocks 109 and 209 on the basis of the acquired time information (F701, F711). However, it is not always necessary to perform the processing of time synchronization, and the terminal 100 and the base station 200 do not need to perform the processing of time synchronization for a certain period of time once the time synchronization is completed.

Next, the terminal 100 calculates the wireless resources to be used for reception of the DL frame addressed to the terminal 100 itself using the pseudo random number generator (see FIG. 6) from the terminal ID of itself and a start time of a reception slot (F702). Similarly, the base station 200 calculates the wireless resources to be used for transmission of the DL frame to each terminal (including the terminal 100) from the ID of each terminal connected to the own station and a start time of each reception slot (F712).

Thereafter, the base station 200 generates a DL frame on the basis of the calculated code, and converts the generated DL frame into a wireless signal. Then, when the time of the wireless resource for DL transmission to the terminal 100 comes, transmission of the DL frame is performed at the calculated frequency (F713).

On the other hand, when the reception time of the calculated DL frame comes, the terminal 100 receives the wireless signal of the calculated frequency, and detects and demodulates the DL frame using the calculated code (F703).

Figure 8:
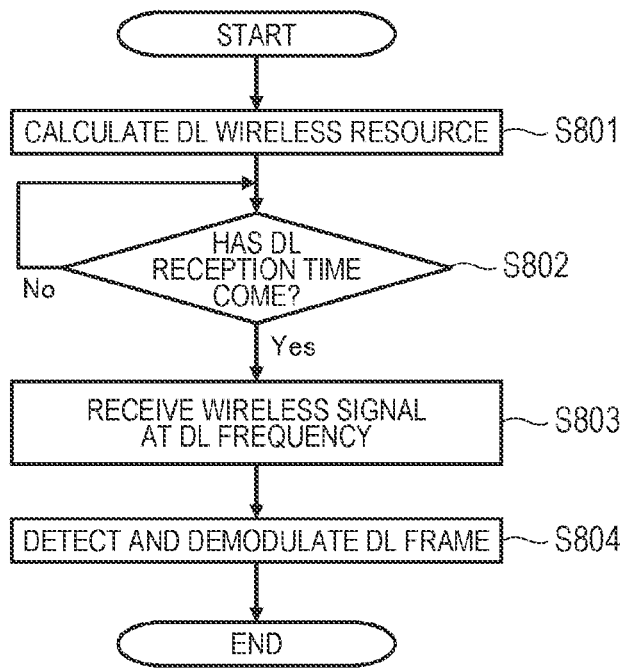
FIG. 8 is a flowchart illustrating a processing procedure (the first embodiment) for the terminal 100 to receive a DL frame during the DL communication.

FIG. 8 illustrates a processing procedure for the terminal 100 to receive the DL frame during DL communication in the form of a flowchart.

The terminal 100 calculates the wireless resources to be used for transmission of the DL frame from the terminal ID of itself and the start time of the transmission slot by using the pseudo random number generator (see FIG. 6) on the basis of the above-described method (step S801).

Then, the terminal 100 waits until the reception time of the DL frame calculated in step S801 (No in step S802). When the reception time of the DL frame comes (Yes in step S802), the terminal 100 receives the wireless signal of the reception frequency of the DL frame calculated in step S801 (step S803), and performs detection and demodulation processing of the DL frame using the code calculated in step S801 (step S804).

Figure 9:
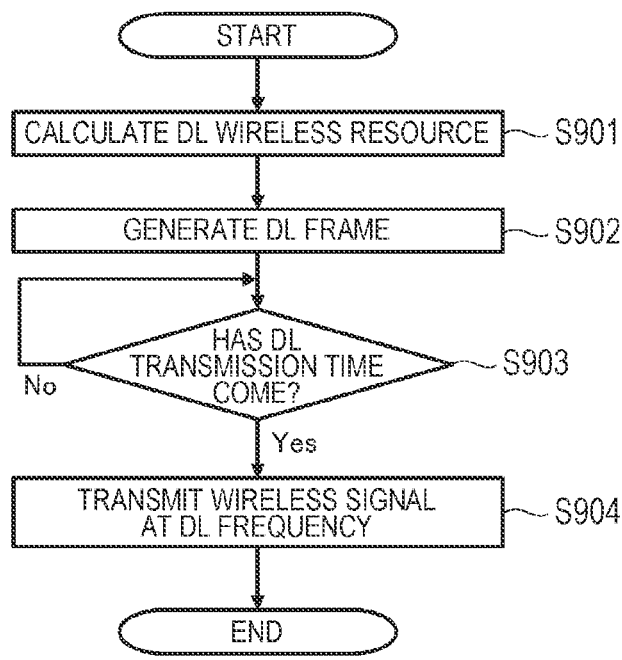
FIG. 9 is a flowchart illustrating a processing procedure (the first embodiment) for the base station 200 to transmit the DL frame during the DL communication.

FIG. 9 illustrates a processing procedure for the base station 200 to transmit the DL frame during the DL communication in the form of a flowchart.

The base station 200 calculates the wireless resource to be used for transmission of the DL frame addressed to each terminal by using the pseudo random number generator (see FIG. 6) on the basis of the above-described method from the terminal ID of each terminal connected to the own station and the start time of the transmission slot (step S901).

Then, when generating the DL frame addressed to each terminal using the code calculated in step S901 (step S902), the base station 200 waits until the DL transmission time calculated in step S901 (No in step S903).

When the DL transmission time comes (Yes in step S903), the base station 200 converts the DL frame generated in step S902 into a wireless signal, and transmits this DL frame to the corresponding terminal using the frequency calculated in step S901 (step S904).

According to the first embodiment, the base station 200 and the terminal 100 can calculate the wireless resources for transmission of the DL frame in advance without signaling control information between the base station 200 and the terminal 100. Furthermore, it is possible to perform communication in which power consumption is suppressed by the intermittent operation of the terminal 100.

Figure 11:
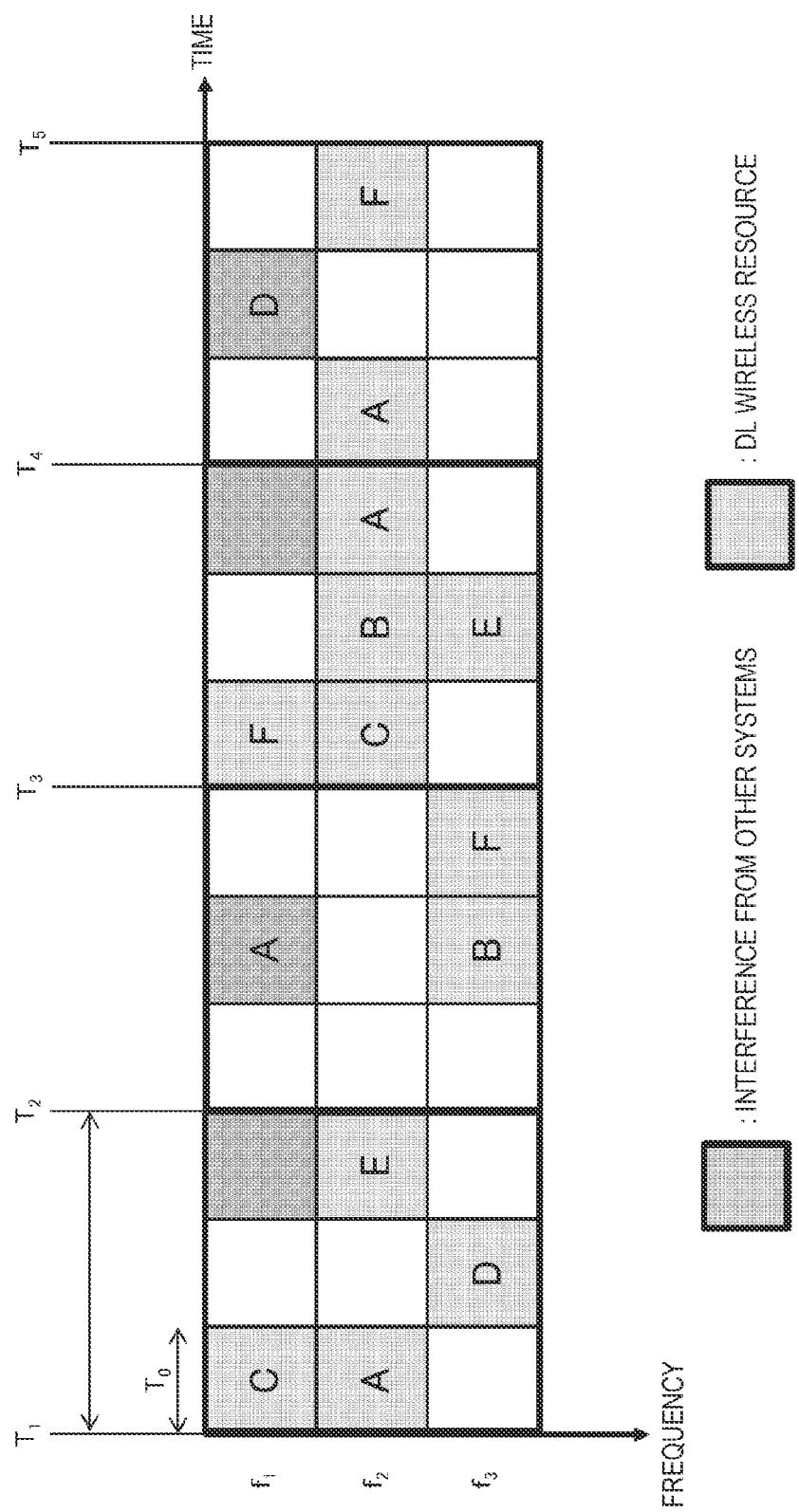
FIG. 11 is a diagram illustrating an example (the first embodiment) of calculation results of the wireless resources of the terminals A to F.

FIG. 10 illustrates an example of calculation results of the wireless resources of the terminals A to F in the first embodiment in a table form. Furthermore, FIG. 11 illustrates the wireless resources determined for reception of the DL frame by the terminals A to F on a plane in which a horizontal axis is a time axis and a vertical axis is a frequency axis. In FIG. 11, the wireless resources are represented in units of resource blocks, and terminal IDs are described in resource blocks determined by the terminals A to F for the DL frame. However, here, $N_{TS}=3$ and $N_{CH}=3$ are set for convenience. Furthermore, in FIG. 11, resource blocks that can be used by the terminals A to F without interference of other systems are colored in light gray, and resource blocks that are largely affected by interference from other systems are colored in dark gray. In the example illustrated in FIG. 11, the frequency channel $f_1$ is easily affected by interference from other systems.

In the first embodiment, each of the terminals A to F allocates and uses one resource block for the DL frame in each slot. As described above, the wireless resources are calculated using the terminal ID and the start time of the slot as the initial values of the pseudo random number generator (see FIG. 6). Thus, the resource block calculated by each terminal in each slot differs accompanying a change in the transmission time (start time of the slot). Therefore, the wireless resources for the DL frame can be flexibly allocated. Consequently, the possibility that the wireless resources used between the terminals overlap and the influence of interference from other systems in a specific terminal can be reduced.

In the examples illustrated in FIGS. 10 and 11, it can be seen that the resource block for the DL frame is determined without overlap between the terminals A to F. Furthermore, in the terminal A, the resource block allocated for the DL frame in the slot of a section of $T_2$ to $T_3$ is affected by interference from other systems, but the resource blocks allocated in other slots are not affected by interference from other systems. Also in the terminal D, the resource block allocated for the DL frame in the slot of a section of $T_4$ to $T_5$ is affected by interference from other systems, but the resource blocks allocated in other slots are not affected by interference from other systems.

Second Embodiment

In the first embodiment described above, the wireless resources are uniquely determined according to the terminal ID and the slot start time of each terminal. Thus, there is a possibility that a deviation occurs in calculation results, and as the number of terminals increases, a possibility that a plurality of terminals is allocated to the same wireless resource increases. Accordingly, in the second embodiment, a method is employed in which a plurality of candidates for the wireless resource is calculated in one slot on the basis of the terminal ID and the subslot start time, and the base station determines one wireless resource to be actually used for DL transmission from the plurality of candidates for the wireless resource. By applying this method, it is possible to perform adjustment so that the wireless resources do not overlap between terminals, and it is possible to avoid a situation in which DL transmission to some terminals becomes impossible, which occurs when the same wireless resources are allocated between a plurality of terminals. Also in the second embodiment, since the wireless resources for the DL frame are flexibly allocated, it is possible to reduce the possibility that the wireless resources used between the terminals overlap.

Also in the second embodiment, a communication system as illustrated in FIG. 1 is assumed. Furthermore, it is sufficient if the configuration of the terminal 100 is similar to that in FIG. 2, and thus description thereof will be omitted here.

Figure 12:
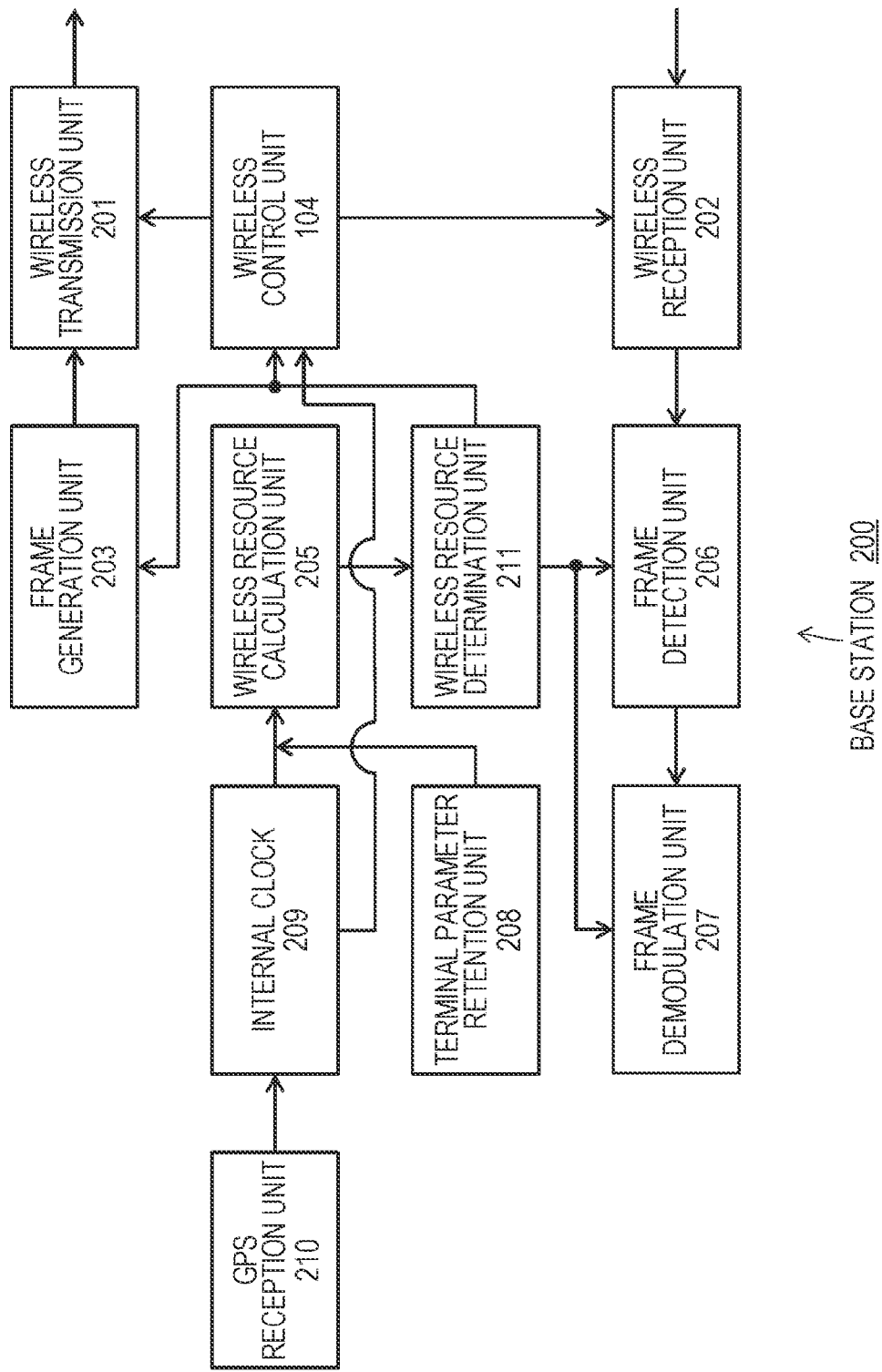
FIG. 12 is a diagram illustrating an internal configuration example (second embodiment) of a communication device that operates as the base station 200.

FIG. 12 illustrates an internal configuration example of a communication device that operates as the base station 200 in the second embodiment. A wireless transmission unit 201, a wireless reception unit 202, a frame generation unit 203, a wireless control unit 204, a wireless resource calculation unit 205, a wireless resource determination unit 211, a frame detection unit 206, a frame demodulation unit 207, a terminal parameter retention unit 208, an internal clock 209, and a GPS reception unit 210 are provided. Differences from the first embodiment are that the wireless resource calculation unit 205 calculates a plurality of wireless resources and that a wireless resource determination unit 211 is added as a component of the base station 200.

The wireless resource calculation unit 205 determines pluralities of times, frequencies, and codes (SYNC codes and scramble codes) at and with which the DL frame is transmitted to the terminal 100 in each slot on the basis of the information obtained from the internal clock 209 and the terminal parameter retention unit 208. Furthermore, the wireless resource calculation unit 205 determines a time, a frequency, and codes at and with which the UL frame is received from the terminal 100. The wireless resource calculation unit 205 supplies information of the determined time, frequency, and codes to the wireless resource determination unit 211.

The wireless resource determination unit 211 determines one resource to be used for DL transmission in each slot from the plurality of wireless resources calculated by the wireless resource calculation unit 205. Then, the wireless resource determination unit 211 supplies information of the determined time, frequency, and codes to the frame generation unit 203, the wireless control unit 204, the frame detection unit 206, and the frame demodulation unit 207.

It is sufficient if the frame configuration used in the communication system according to the second embodiment is the same as that of the first embodiment (refer to FIG. 6), and thus description thereof will be omitted here. Furthermore, configurations of the UL frame and the DL frame are the same.

Next, in the second embodiment, a method of calculating the wireless resources used for DL communication will be described.

Figure 13:
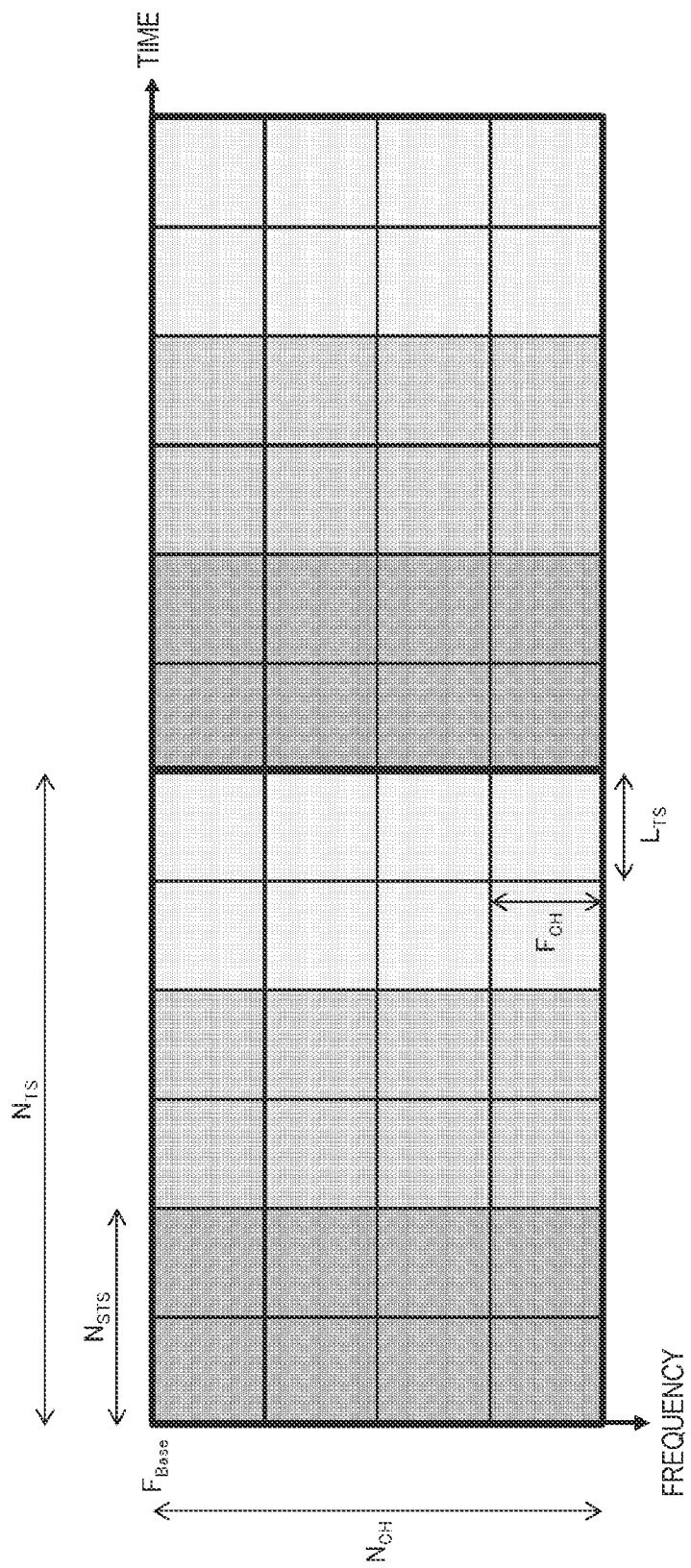
FIG. 13 is a diagram illustrating an outline (the second embodiment) of the wireless resources.

FIG. 13 illustrates an outline of wireless resources in the second embodiment. Similarly to as described above, the horizontal axis is the time axis, and the vertical axis is the frequency axis. The minimum unit on the time axis is treated as a time slot, and the minimum unit on the frequency axis is treated as a channel. Furthermore, a bandwidth of a channel is $F_{CH}$ (MHz), a time slot length is $L_{TS}$ (microseconds), one time slot×one channel is a resource block, and a lump of resource blocks including consecutive $N_{TS}$ time slots and consecutive $N_{CH}$ channels is a slot.

A difference from the first embodiment (see FIG. 5) is that a concept of "subslots" obtained by dividing one slot into a plurality of slots in the time axis direction is added in the second embodiment. In the second embodiment, it is assumed that one candidate for the wireless resource for DL transmission of each terminal is calculated in each subslot (that is, by the number of subslots in one slot), and the base station determines one wireless resource to be used for actual transmission in one slot for each terminal from among a plurality of candidates. Furthermore, the number of subslots is equal to the number of wireless resource candidates for DL transmission calculated for each terminal. Then, when the number of time slots in one slot is $N_{TS}$, the number of time slots in one subslot is $N_{STS}$, and the number of wireless resources for DL transmission calculated in one slot for each terminal is $N_R$, $N_{TS}=N_{STS}\times N_R$ is satisfied. In the example illustrated in FIG. 13, one slot is divided into three subslots in the time direction. In the example illustrated in FIG. 5, $N_{TS}=6$, $N_{CH}=4$, $N_{STS}=2$, and $N_R=3$. In FIG. 13, shades of the gray filling the resource blocks are changed for each subslot in one slot.

Hereinafter, each calculation method of the time, the frequency, and the codes in the second embodiment will be sequentially described.

Time:

The pseudo random number generator used to set the transmission time is the same as that in the first embodiment, and is a gold code generator using two M sequences 601 and 602 (see FIG. 6). A terminal ID and time information are set as initial values of each of the M sequences. In the second embodiment, the resource block is allocated in each subslot, and thus the start time of the subslot is used as the time information of the initial value. Then, using the random number sequence generated by the pseudo random number generator, the transmission time in each subslot is determined according to the following Equation (3).

[Equation 3]

$$T_R = t + L_{TS} \times (i-1) \times N_{STS} + L_{TS} \times \mathrm{mod}\left(\frac{x_i}{N_{STS}}\right) \qquad (3)$$

(1≤i≤N, N: number of subslots)
$T_R$: Frame transmission start time
t: Start time of slot
$L_{TS}$: Time slot length $x_i$: Random number sequence generated by pseudo random number generator $N_{STS}$: Number of time slots in each subslot Frequency:

Similarly to the time, the transmission frequency is also determined using the pseudo random number generator. A combination of M sequence generator polynomials of the pseudo random number generator used to determine the transmission frequency may be the same as or different from that used to determine the transmission time. The ID of the terminal and the start time of each subslot are set as initial values of each M sequence. The transmission frequency (transmission channel) is determined according to the following equation (4) using the random number sequence generated by the pseudo random number generator.

[Equation 4]

$$F_R = F_{BASE} + F_{CH} \times \mod\left(\frac{x_i}{N_{CH}}\right) \quad (4)$$

($1 \leq i \leq N$, N: number of subslots)

$F_R$: Frame transmission frequency $x_i$: Random number sequence generated by pseudo random number generator $N_{CH}$: Number of channels in each slot $F_{BASE}$: Lowest center frequency among channels in each slot $F_{CH}$: Channel interval Sign:

The SYNC code and the scramble code are generated using the pseudo random number generator similarly to the time and the frequency. A combination of M sequence generator polynomials of the pseudo random number generator used for generation may be the same as or different from that used for the transmission time and the transmission frequency. The ID of the terminal and the start time of the slot are set as the initial values of each M sequence. It is assumed that a length matching the SYNC length of the frame and a length matching the frame length are obtained for the SYNC code and the scramble code, respectively, by the pseudo random number generator.

Figure 14:
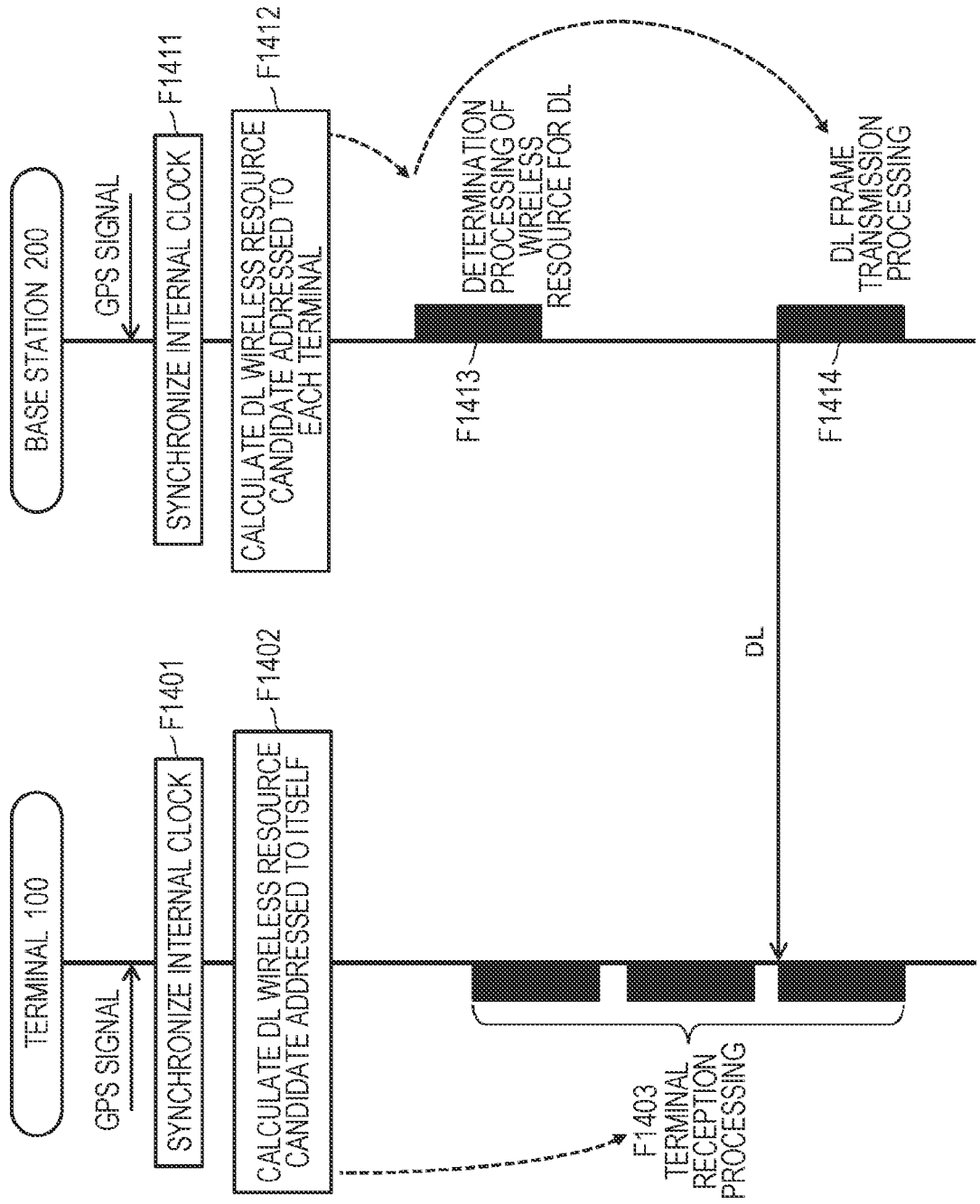
FIG. 14 is a diagram illustrating a processing flow (the second embodiment) of the entire communication system during the DL communication.

FIG. 14 illustrates a processing flow of the entire communication system at the time of DL communication in the second embodiment.

First, after receiving the GPS signal, the terminal 100 and the base station 200 synchronize the internal clocks 109 and 209 on the basis of the acquired time information (F1401, F1411). However, it is not always necessary to perform the processing of time synchronization, and the terminal 100 and the base station 200 do not need to perform the processing of time synchronization for a certain period of time once the time synchronization is completed.

Next, the terminal 100 calculates a plurality of candidates for the wireless resource for DL transmission in each subslot in one slot from the terminal ID of itself and the start time of the reception subslot (F1402). Similarly, the base station 200 calculates the candidates for the wireless resource for DL transmission related to each terminal for each subslot in one slot from the ID of each terminal connected to the own station and the start time of each transmission subslot, and performs temporary allocation (F1412).

Moreover, the base station 200 determines one wireless resource to be mainly allocated in one slot for each terminal from the candidates for the wireless resource for DL transmission temporarily allocated in each subslot (F1413).

Thereafter, the base station 200 generates a frame on the basis of the calculated code and converts the generated frame into a wireless signal. Then, when the time of the wireless resource for DL transmission of the terminal 100 comes, frame transmission is performed at the calculated frequency (F1414).

On the other hand, when the time of the calculated wireless resource for DL transmission comes, the terminal 100 receives a wireless signal of the calculated frequency, and detects and demodulates the frame using the calculated code (F1403).

Here, the terminal 100 is unaware of which wireless resource the base station 200 has determined as the mainly allocated resource. Thus, the terminal 100 repeatedly performs the reception processing with each calculated candidate for the wireless resource in each subslot until the frame from the base station 200 can be correctly demodulated.

Figure 15:
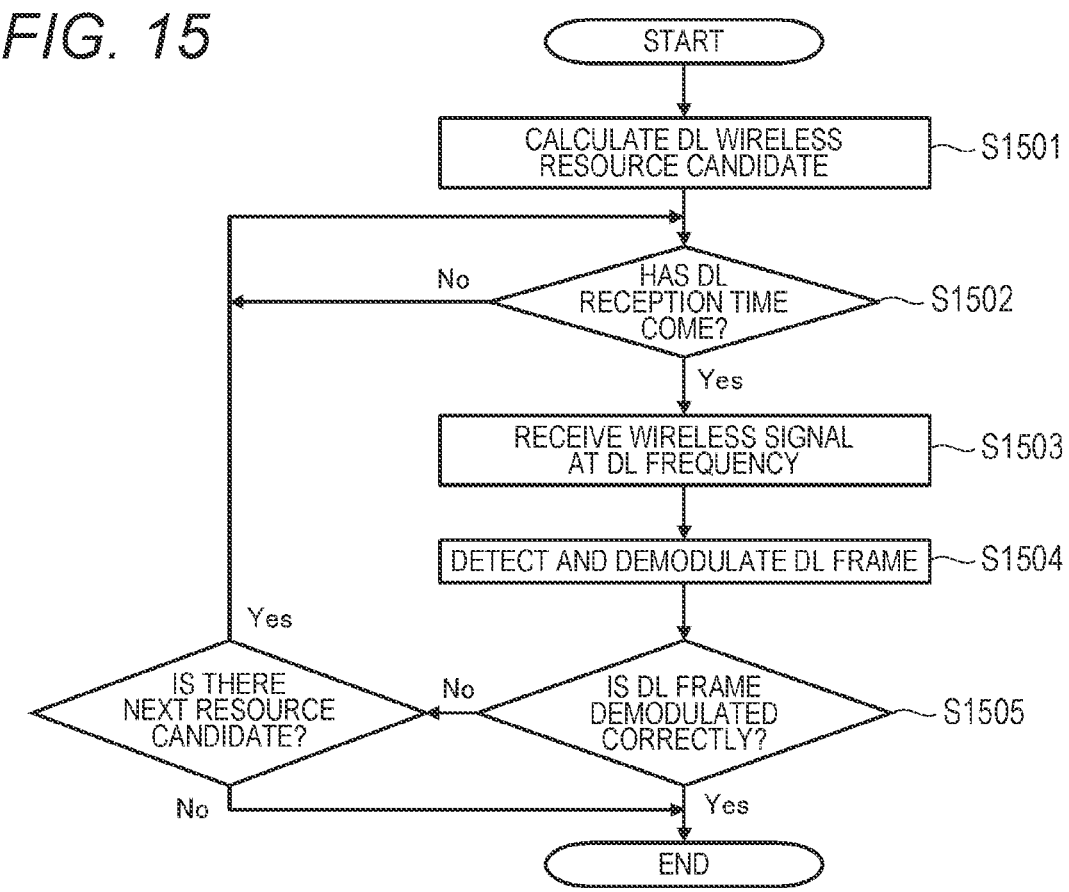
FIG. 15 is a flowchart illustrating a processing procedure (the second embodiment) for the terminal 100 to receive the DL frame during the DL communication.

FIG. 15 illustrates a processing procedure for the terminal 100 to receive a frame during DL communication in the form of a flowchart.

The terminal 100 calculates a plurality of candidates (in each subslot) for the wireless resource for DL transmission from the terminal ID of itself and the start time of each subslot in one slot on the basis of the method described above (step S1501).

Then, the terminal 100 waits until each reception time of the plurality for the candidates for the wireless resource calculated (No in step S1502). When any DL reception time comes (Yes in step S1502), the terminal 100 receives the wireless signal of the frequency calculated for the corresponding candidate (step S1503), and performs frame detection and demodulation processing using the code calculated for the corresponding candidate (step S1504).

Next, the terminal 100 checks whether the DL frame has been correctly detected and demodulated at the current reception time (step S1505). In a case where the DL frame has been correctly detected and demodulated (Yes in step S1505), the terminal 100 ends the reception processing.

On the other hand, in a case where the DL frame has not been correctly detected and demodulated (No in step S1505), the terminal 100 further checks whether there is still a candidate for the wireless resource for the next DL transmission in the slot (step S1506).

In a case where the wireless resource for the next DL transmission still exists (Yes in step S1506), the terminal 100 returns to step S1502, waits until the next DL reception time, and repeatedly executes the reception processing described above. Furthermore, in a case where there is no candidate for the wireless resource for the next DL transmission (No in step S1506), the terminal 100 ends the reception processing.

Next, a method of determining a wireless resource for DL transmission in the second embodiment will be described.

Figure 16:
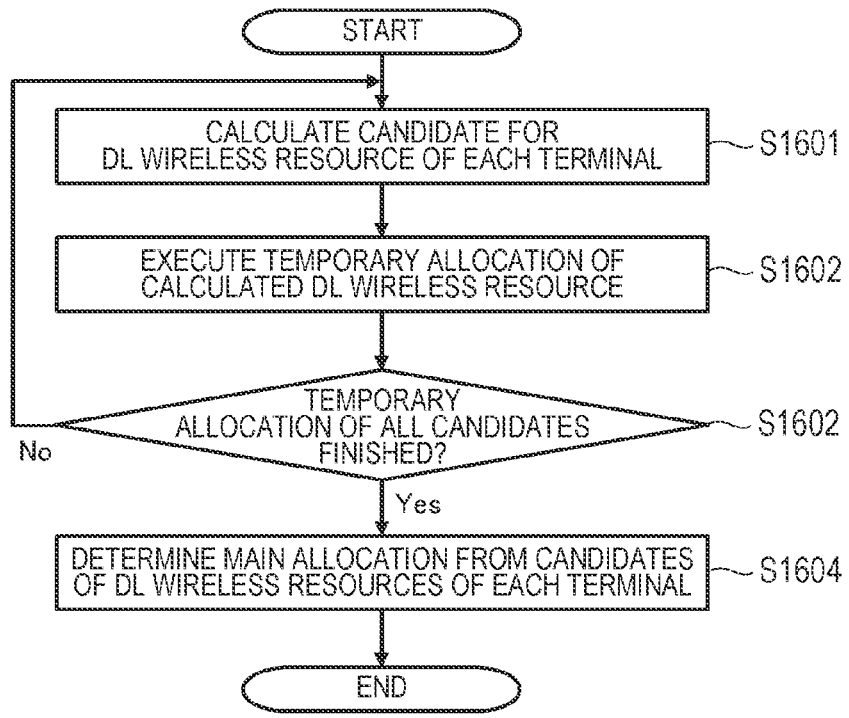
FIG. 16 is a flowchart illustrating a processing procedure for determining a wireless resource for the DL transmission in the base station 200.

FIG. 16 illustrates a processing procedure for determining wireless resources for DL transmission in the base station 200 in the form of a flowchart.

The base station 200 calculates, on the basis of the terminal ID of each terminal connected to the own station and the start time of the reception subslot, a plurality (in each subslot) of candidates for the wireless resource to be used for DL transmission on the basis of the above equations (3) and (4) (step S1601), and performs temporary allocation of the calculated wireless resource of each candidate (step S1602).

The base station 200 repeatedly performs the processing of steps 51601 and 51602 until the temporary allocation of all the candidates for the wireless resource calculated in each subslot in the slot is completed for all the terminals connected to the own station (No in step S1603).

Then, when the temporary allocation is completed for all the terminals in the slot (Yes in step S1603), the base station 200 determines one wireless resource for DL transmission to be mainly allocated in one slot from among the plurality of candidates for the wireless resource for DL transmission temporarily allocated in each subslot for each terminal (step S1604).

In a case where the candidates for the wireless resource for DL transmission are calculated in each subslot in one slot for each terminal, it is assumed that the candidates for the wireless resource overlap between the terminals. Accordingly, in step S1604, there is performed processing of determining one wireless resource for DL transmission to be mainly allocated in one slot from among the plurality of candidates for the wireless resource for DL transmission of each terminal so that the wireless resources do not overlap between the terminals.

Figure 17:
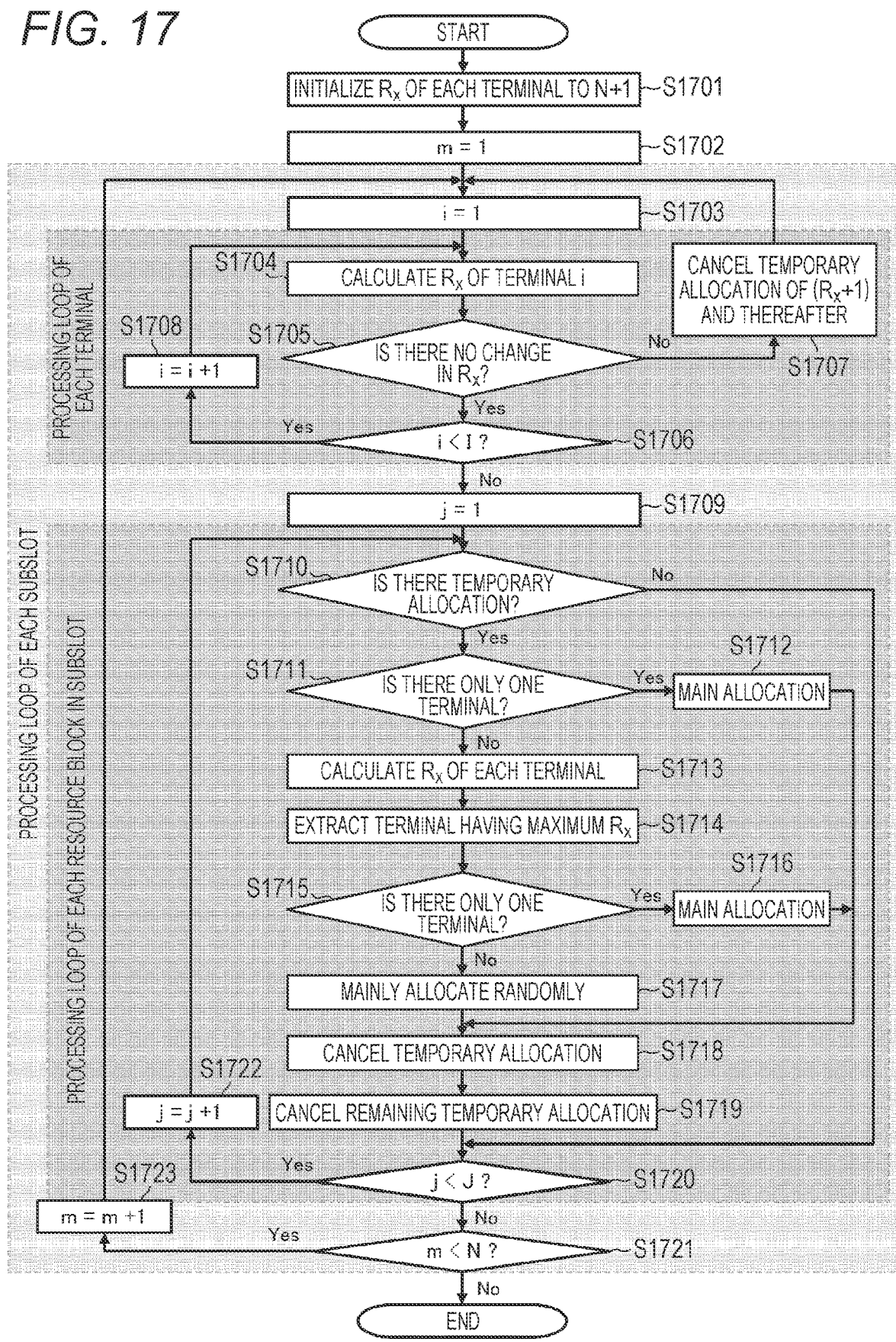
FIG. 17 is a flowchart illustrating a processing procedure (the second embodiment) in which the base station 200 determines the wireless resources for the DL transmission to be mainly allocated for each terminal.

FIG. 17 illustrates a processing procedure executed in step S1604 in the flowchart illustrated in FIG. 16 for the base station 200 to determine the wireless resources for DL transmission to be main allocation for each terminal in the form of a flowchart.

Here, $R_x$ (minimum exclusive subslot number) for each terminal is used as an index for determining the mainly allocated resources. Here, the subslot number is a number obtained by dividing a slot into a plurality of subslots and allocating the subslots in ascending order from a head subslot on the time axis. The $R_x$ of a certain terminal is a smallest subslot number until the candidate for the wireless resource for DL transmission that does not overlap (that is, can be exclusive) with other terminals is found. The $R_x$ is an integer satisfying $1 \leq R_x \leq N$ (N is the number of subslots in the slot). A method of calculating the $R_x$ of each terminal will be described later. In addition, a resource block number as a serial number is attached to each resource block in the slot, and a resource block temporarily allocated or mainly allocated to the terminal can be indicated by the resource block number.

First, the base station 200 initializes the $R_x$ of each terminal to N+1 (step S1701). Here, N is the number of subslots obtained by dividing one slot (as described above). Then, the base station 200 initializes a variable m for counting the number of subslots (or the subslot number) being processed to one (step S1702), and then starts a processing loop of the m-th subslot.

In the processing loop of each subslot, a variable i for counting the number of terminals processed in the processing loop is initialized to one (step S1703), and then the processing loop of an i-th terminal is started.

In the processing loop of each terminal, the base station 200 calculates the $R_x$ of the i-th terminal (step S1704), and checks whether the calculated $R_x$ is the same as the numerical value before calculation (step S1705). A processing procedure for calculating the $R_x$ of the terminal will be described later.

In a case where the calculated $R_x$ is not the same as the numerical value before calculation (No in step S1705), the temporary allocations of the wireless resources of the $(R_x+1)$-th and subsequent subslots of the i-th terminal are canceled (step S1707), the processing returns to step S1703, and the processing loop of the m-th subslot is started again.

Furthermore, in a case where the calculated $R_x$ is the same as the numerical value before the calculation (Yes in step S1705), the base station 200 checks whether the variable i is less than the number I of terminals for which wireless resource allocation is scheduled (that is, whether the processing is yet to be completed for all the target terminals) (step S1706). Then, in a case where the variable i is less than the scheduled number I of terminals for wireless resource allocation (No in step S1706), the base station 200 increments i by one (step S1708), returns to step S1704, and repeatedly performs the processing for each terminal for the next terminal.

In a case where the variable i has reached the scheduled number I of wireless resource allocations (Yes in step S1706), the base station 200 ends the processing loop of each terminal, initializes the variable j for counting resource blocks in the subslot to one (step S1709), and then starts the processing loop for the j-th resource block in the m-th subslot.

In the processing loop for the resource block, the base station 200 first checks whether any terminal has performed temporary allocation to the resource block (step S1710). The resource block number of the resource block being processed is j+J×(m−1) (where J is the number of resource blocks in the subslot). In step S1710, it is checked whether there is a terminal that has been temporarily allocated to the calculated resource block number.

Then, in a case where any terminal has performed temporary allocation to the resource block (Yes in step S1710), the base station 200 subsequently checks whether there is only one terminal that has performed temporary allocation (step S1711).

Then, in a case where there is only one terminal that has been temporarily allocated to the resource block (Yes in step S1711), the base station 200 performs main allocation of the resource block to the terminal (step S1712).

On the other hand, in a case where there are two or more terminals that have been temporarily allocated to the resource block (No in step S1711), the base station 200 calculates the $R_x$ of each of these terminals (step S1713). A processing procedure for calculating the $R_x$ of the terminal will be described later. Then, the terminal having the maximum $R_x$ is extracted (step S1714).

Here, the terminal having the maximum $R_x$ is a terminal having a large minimum subslot number until a candidate that does not overlap with other terminals is found, that is, a terminal in which it is difficult to find a subslot that can be exclusive, and the resource block should be preferentially allocated thereto.

The base station 200 checks whether there is only one terminal having the maximum $R_x$ (step S1715). Then, when there is only one terminal having the maximum $R_x$ (Yes in step S1715), the base station 200 performs main allocation of the resource block to the terminal (step S1716).

Furthermore, in a case where there are two or more terminals having the maximum $R_x$ (No in step S1715), the base station 200 randomly selects one terminal from these terminals and performs main allocation of the resource block to the terminal (step S1717).

Next, the base station 200 cancels the temporary allocation of the resource block in the m-th subslot of terminals other than the terminal to which the main allocation has been performed in this subslot in step S1716 or step S1717 (step S1718).

Next, the base station 200 cancels the temporary allocations of the wireless resources of the $(R_x+1)$-th and subsequent subslots of the terminal to which the main allocation of the resource block is determined in any one of step S1712, step S1716, or step S1717 and changes the $R_x$ to m, and sets the temporarily allocated resource block number of the m-th subslot as a mainly allocated resource block number (step S1719).

Then, the base station 200 checks whether the variable j is less than the number J of resource blocks in the subslot (that is, whether the processing is yet to be completed for all the resource blocks in the m-th subslot) (step S1720). Then, in a case where the variable j is less than the number J of resource blocks in the subslot (No in step S1720), the base station 200 increments j by one (step S1722), returns to step S1710, and repeatedly performs similar processing on the next resource block in the m-th subslot.

In a case where the variable j has reached the number J of resource blocks in the subslot (Yes in step S1720), the base station 200 checks whether the variable m is less than the number N of subslots in the slot (that is, whether the processing is yet to be completed for all the subslots in the slot) (step S1721). Then, in a case where the variable m is less than the number N of subslots (No in step S1721), the base station 200 increments m by one (step S1723), returns to step S1703, and repeatedly performs similar processing for the next subslot.

Furthermore, in a case where the variable m has reached the number N of subslots (Yes in step S1721), the base station 200 ends this processing.

Figure 18:
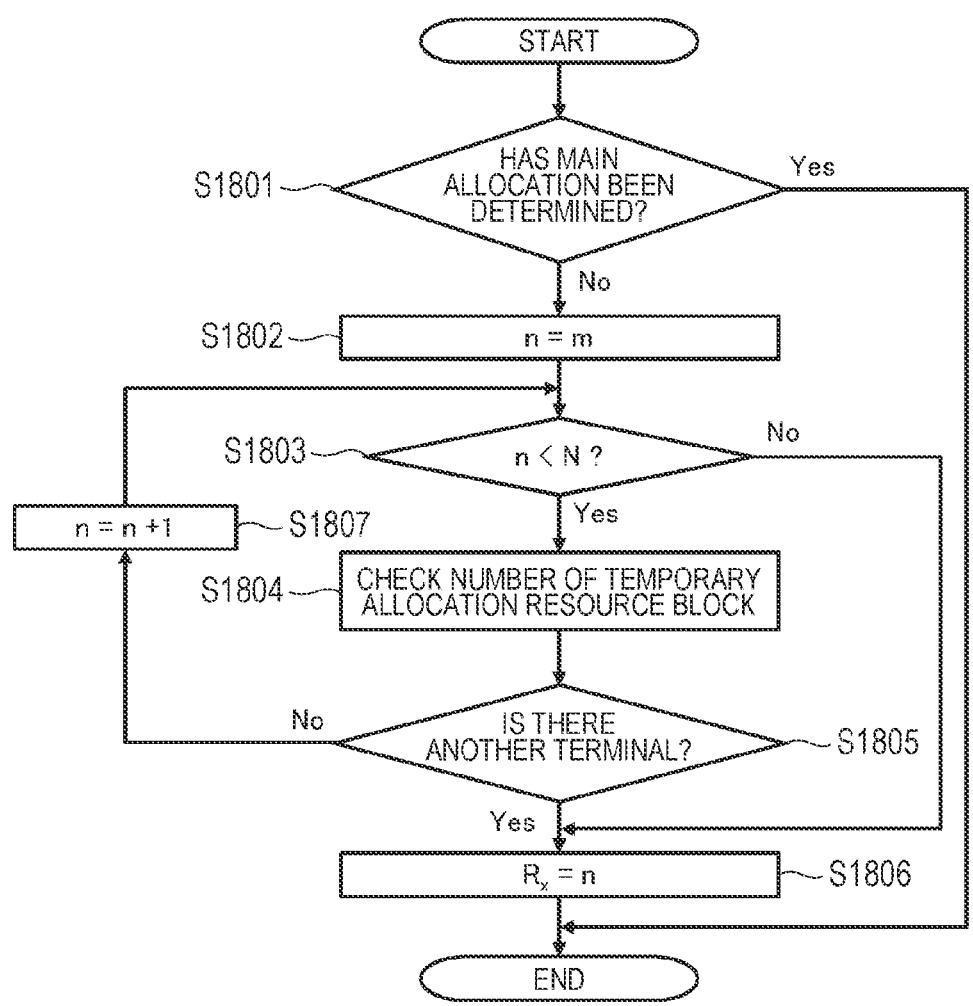
FIG. 18 is a flowchart illustrating a processing procedure for calculating $R_x$ (minimum exclusive subslot number) of a terminal.

FIG. 18 illustrates a processing procedure for calculating the $R_x$ (minimum exclusive subslot number) of the terminal in the base station 200 in the form of a flowchart. The $R_x$ of the terminal is the smallest subslot number until a candidate that does not overlap with other terminals (that is, can be exclusive) is found. This processing procedure is performed in step S1704 in the flowchart illustrated in FIG. 17.

First, the base station 200 checks whether the resource block number of the main allocation of the wireless resources for DL transmission has been determined for the processing target terminal (step S1801). When the resource block number of the main allocation of the wireless resources for DL transmission of the terminal has been determined (Yes in step S1801), the base station 200 ends this processing.

In a case where the resource block number of the main allocation of the wireless resources for DL transmission of the terminal is yet to be determined (No in step S1801), the base station 200 substitutes the subslot number m to be processed in the processing loop of each subslot for the variable n (step S1802).

Then, the base station 200 checks whether n is equal to or less than the number N of subslots in the slot (that is, whether the subslot being processed is not the last subslot in the slot) (step S1803).

In a case where n exceeds the number N of subslots in the slot, that is, in a case where the subslot being processed is the last subslot in the slot (No in step S1803), the base station 200 substitutes n for the $R_x$ (step S1806) and ends this processing.

On the other hand, if n is equal to or smaller than the number N of subslots in the slot (Yes in step S1803), the base station 200 checks the resource block number temporarily allocated to the n-th subslot for the terminal to be processed (step S1804). It is assumed that the base station 200 performs temporary allocation of resource blocks of each subslot of the terminal by using the above equations (3) and (4).

Then, the base station 200 checks whether there is another terminal to which the same resource block as that of the terminal is temporarily allocated (step S1805).

In a case where there is no other terminal to which the same resource block as that of the terminal is temporarily allocated (No in step S1805), the base station 200 substitutes n for the $R_x$ (step S1806) and ends this processing.

Furthermore, in a case where there is another terminal to which the same resource block as that of the terminal is temporarily allocated (Yes in step S1805), the base station 200 increments n by one (step S1807), returns to step S1803, and repeatedly performs similar processing in the next sub-block.

The $R_x$ of a certain terminal is the smallest subslot number that can reliably determine the wireless resource for DL transmission of the main allocation without causing the terminal to overlap with other terminals. In a case where all the resource blocks temporarily allocated to a certain terminal by the base station 200 overlap the resource blocks temporarily allocated to any other terminal, the $R_x$ of the terminal is N+1, which is the maximum value.

There is a high possibility that the base station 200 cannot allocate a resource block for DL transmission in the target slot to a terminal whose $R_x$ is N+1, and cannot perform DL transmission. Furthermore, as the $R_x$ increases, the number of times the terminal enters the reception state increases, and power consumption increases. Thus, in the processing procedure illustrated in FIG. 17, the second embodiment employs an algorithm in which the base station 200 first uses the above equations (3) and (4) to temporarily allocate one resource block in each subslot in the slot for each terminal, and then mainly allocates the resource blocks temporarily allocated to a plurality of terminals preferentially to the terminal having the maximum $R_x$ (see "processing loop of each resource block" in FIG. 18). Furthermore, in the processing procedure illustrated in FIG. 18, the $R_x$ of each terminal is calculated every time the target subslot changes (see the "processing loop of each terminal" in FIG. 18), and thereafter in the "processing loop of each resource block", the temporary allocation status in each resource block in the subslot is confirmed to determine the resource of the main allocation. Furthermore, in the "processing loop of each resource block", for the terminal determined by the resource block to be mainly allocated, the temporary allocations of the wireless resources of the ($R_x$+1)-th and subsequent subslots are canceled and the $R_x$ is changed to the subslot number under processing, and this terminal is excluded from the target of the main allocation in the processing of the subsequent subslots.

Figures 19, 20:
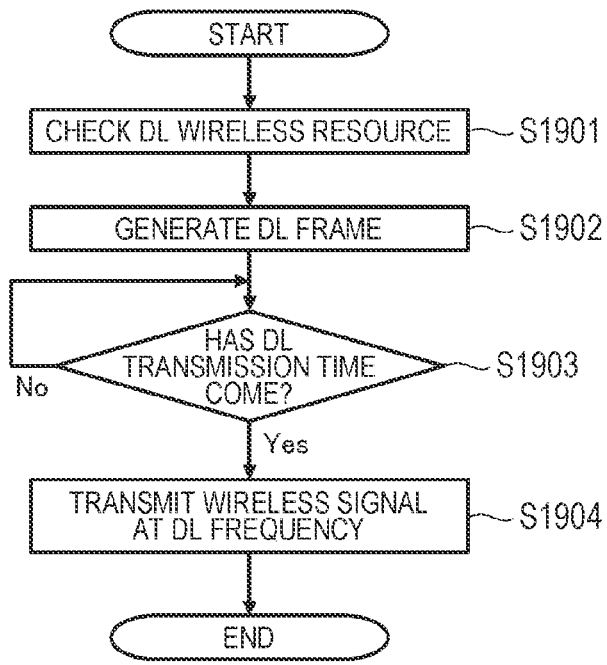
FIG. 19 is a flowchart illustrating a processing procedure (the second embodiment) for the base station 200 to transmit the DL frame during the DL communication.
FIG. 20 is a diagram illustrating a specific example of allocating the wireless resources to the terminals.

FIG. 19 illustrates a processing procedure for transmitting the DL frame by using the wireless resources for DL transmission for each terminal determined by the base station 200 according to the processing procedure illustrated in FIG. 16 in the form of a flowchart.

The base station 200 checks the DL transmission resource block determined according to the processing procedure illustrated in FIG. 16 (step S1901).

Next, when the DL frame addressed to each terminal is generated using the code calculated in step S1601 in the flowchart illustrated in FIG. 16 (step S1902), waiting is made until the DL transmission time of the determined DL transmission resource block (No in step S1903).

When the DL transmission time comes (Yes in step S1903), the base station 200 converts the DL frame generated in step S1902 into a wireless signal, and transmits the DL frame to the corresponding terminal using the transmission frequency of the DL transmission resource block determined according to the processing procedure illustrated in FIG. 16 (step S1604).

A specific example in which the base station 200 allocates the wireless resources for DL transmission to the terminals A to F according to the processing procedure illustrated in FIG. 17 will be described with reference to FIGS. 20 to 31. Here, it is assumed that one slot is divided into three subslots of first (1st), second (2nd), and third (3rd) in the time axis direction, and each subslot is divided into three resource blocks in the frequency axis direction. Furthermore, for convenience of description, resource block (RB) numbers of 1 to 9 are allocated to the respective resource blocks in one subslot.

Figures 21, 22:
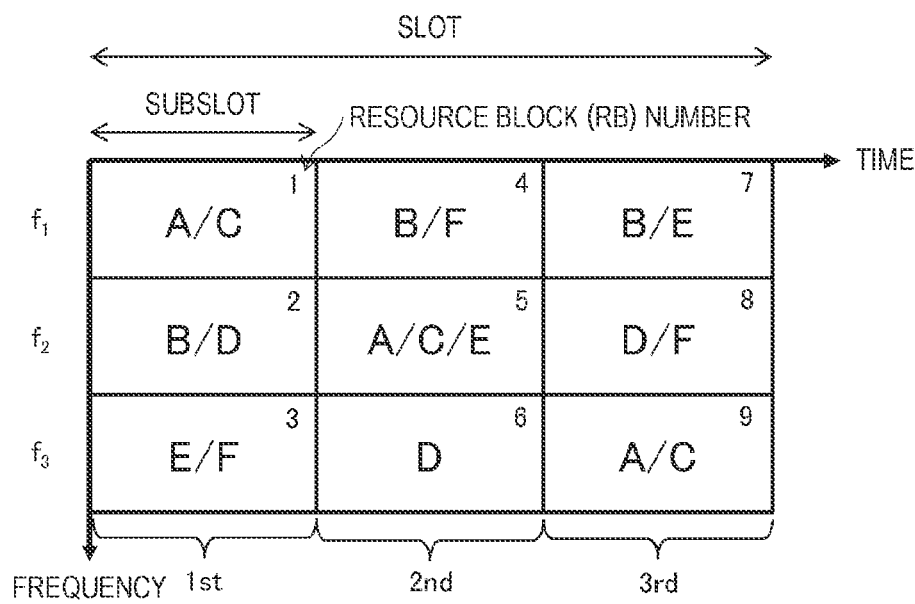
FIG. 21 is a diagram illustrating a specific example (the second embodiment) of allocating the wireless resources to the terminals.
FIG. 22 is a diagram illustrating a specific example (the second embodiment) of allocating the wireless resources to the terminals.

FIG. 20 illustrates temporary allocation results of the resource blocks of the terminals A to F calculated on the basis of the above equations (3) and (4) by the base station 200. In FIG. 20, the resource block numbers temporarily allocated to the terminals A to F in each subslot are described. Furthermore, in FIG. 21, the ID of the temporarily allocated terminal is written in the box of each resource block. In FIG. 21, all the temporarily allocated terminal IDs are written by being separated with slashes in the resource blocks in which the temporary allocations of the plurality of terminals overlap. Since one temporary allocation is performed by each subslot for each of the terminals A to F, if the number of terminals exceeds the number of resource blocks in the subslot, duplication of temporary allocation always occurs. At the stage of temporary allocation, temporary allocations of a plurality of terminals overlap in resource blocks other than the resource block number 6.

Figures 23, 24:
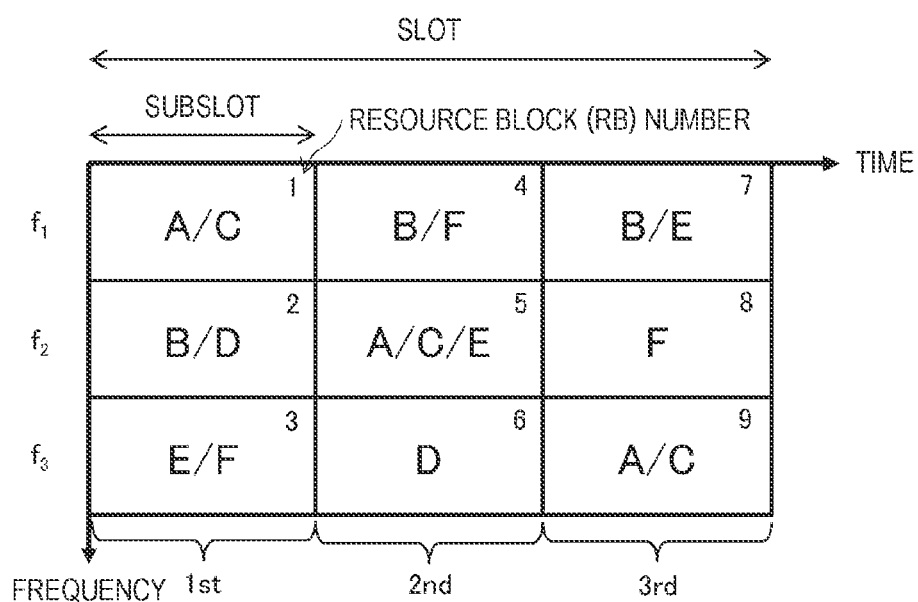
FIG. 23 is a diagram illustrating a specific example (the second embodiment) of allocating the wireless resources to the terminals.
FIG. 24 is a diagram illustrating a specific example (the second embodiment) of allocating the wireless resources to the terminals.

FIGS. 22 and 23 illustrate results of calculation of the $R_x$ of the terminals A to F by the base station 200 according to the processing procedure illustrated in FIG. 18.

An initial value of the $R_x$ of each of the terminals A to F is N (number of subslots)+1=4. Here, in the examples illustrated in FIGS. 20 and 21, the resource block number 6 in the second subslot is exclusive for the terminal D, and thus $R_x$=2 as illustrated in FIG. 22. Furthermore, the temporary allocations of the third and subsequent subslots of the terminal D are canceled (as illustrated in FIG. 22, the resource block number temporarily allocated to the terminal D in the third subslot is rewritten to zero. Consequently, the resource block number 8 can be exclusive for the terminal F in the third subslot as illustrated in FIG. 23, and thus $R_x$=3 as illustrated in FIG. 22.

Figures 25, 26:
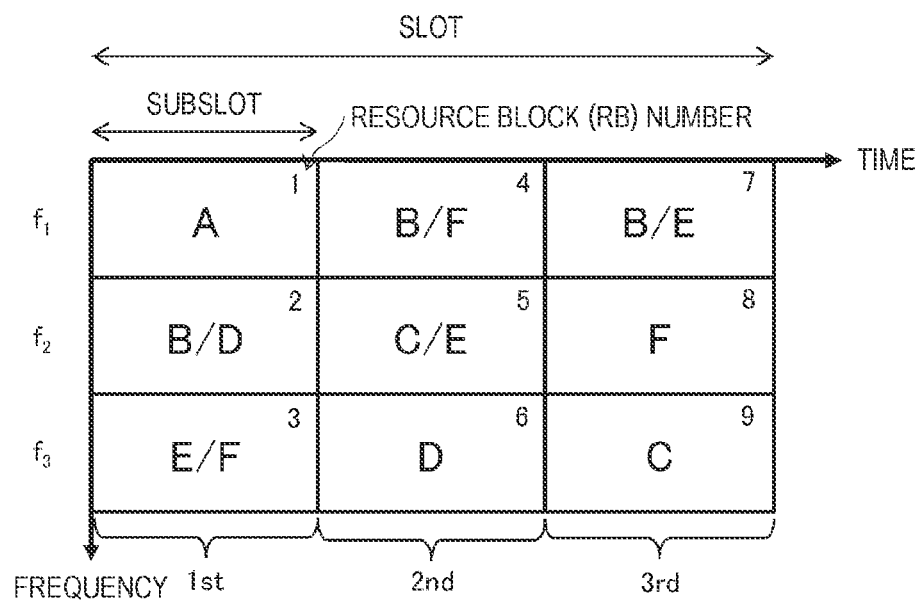
FIG. 25 is a diagram illustrating a specific example (the second embodiment) of allocating the wireless resources to the terminals.
FIG. 26 is a diagram illustrating a specific example (the second embodiment) of allocating the wireless resources to the terminals.

FIGS. 24 and 25 illustrate results of attempts by the base station 200 to perform main allocation to the terminals A to F in the order of the resource block number in the processing loop of each resource block in the subslot in the flowchart illustrated in FIG. 17.

Referring to FIG. 23, in the resource block number 1 of the first subslot, temporary allocations to the terminal A and the terminal C overlap. Further, referring to FIG. 22, both the terminal A and the terminal C have the $R_x$ of four, and thus the base station 200 randomly selects the terminal A as illustrated in FIG. 25, and performs main allocation of the resource block to the terminal A as illustrated in FIG. 24. Consequently, as illustrated in FIG. 24, the $R_x$ of the terminal A is changed to one, and all the temporary allocations of the second and subsequent subslots of the terminal A are canceled (the resource block number temporarily allocated to the terminal A in the second and subsequent subslots is rewritten to zero). Furthermore, the base station 200 cancels the temporary allocation of the first subslot to the terminal C (as illustrated in FIG. 24, the resource block number temporarily allocated to the terminal C in the first subslot is set to zero).

Figures 27, 28:
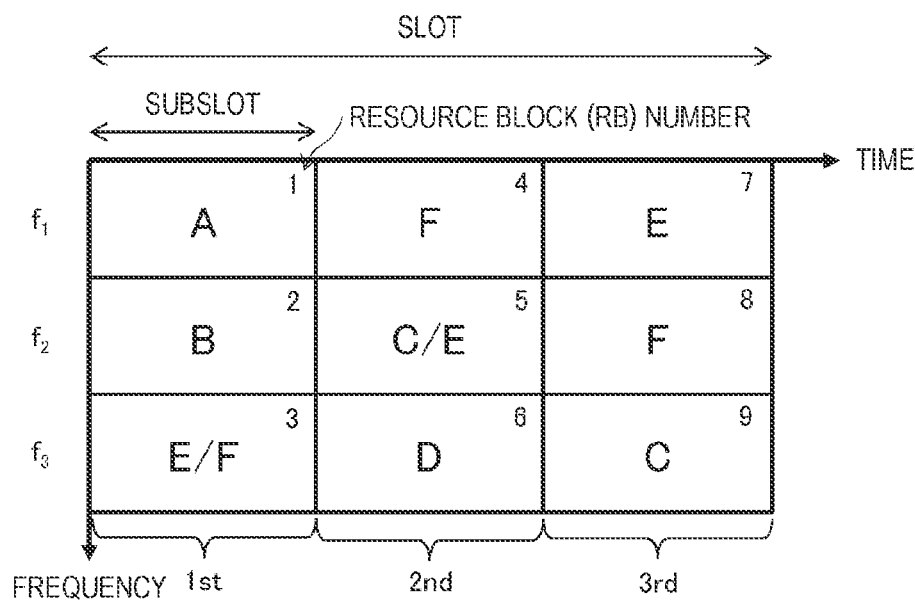
FIG. 27 is a diagram illustrating a specific example (the second embodiment) of allocating the wireless resources to the terminals.
FIG. 28 is a diagram illustrating a specific example (the second embodiment) of allocating the wireless resources to the terminals.

FIGS. 26 and 27 illustrate results of subsequent attempts by the base station 200 to perform main allocation of the resource block number 2.

Referring to FIG. 25, in the resource block number 2, temporary allocations to the terminal B and the terminal D overlap. Furthermore, referring to FIG. 24, because the $R_x$ of the terminal B is four and the $R_x$ of the terminal D is two, and the $R_x$ of the terminal B is the maximum, the terminal B is selected as illustrated in FIG. 27, and the resource block is mainly allocated to the terminal B as illustrated in FIG. 26. Consequently, as illustrated in FIG. 26, the $R_x$ of the terminal B is changed to one, and all the temporary allocations of the second and subsequent subslots of the terminal B are canceled (the resource block number temporarily allocated to the terminal B in the second and subsequent subslots is rewritten to zero). Furthermore, the temporary allocation of the first subslot to the terminal D is canceled (as illustrated in FIG. 26, the resource block number temporarily allocated to the terminal D in the first subslot is set to 0).

Figures 29, 30:
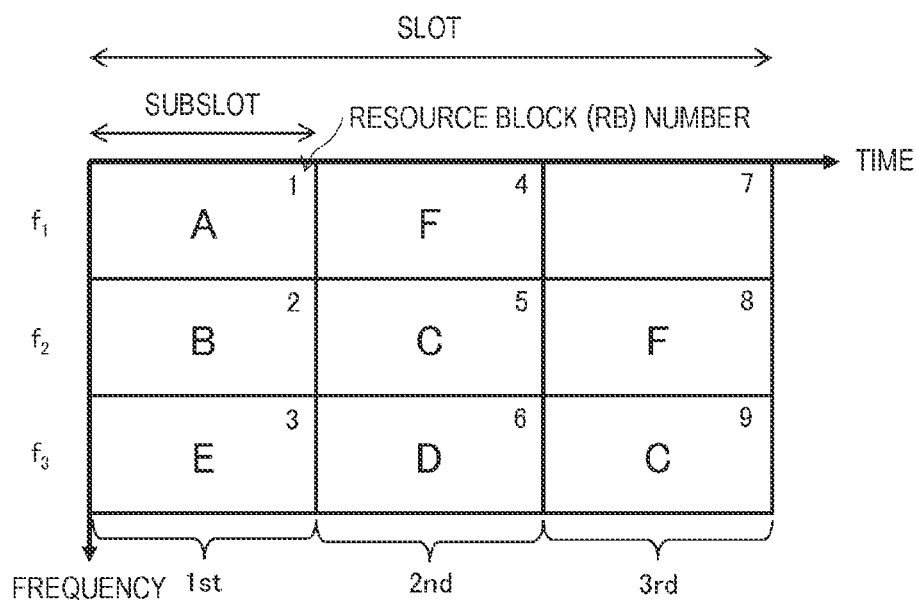
FIG. 29 is a diagram illustrating a specific example (the second embodiment) of allocating the wireless resources to the terminals.
FIG. 30 is a diagram illustrating a specific example (the second embodiment) of allocating the wireless resources to the terminals.

FIGS. 28 and 29 illustrate results of subsequent attempts by the base station 200 to perform main allocation of the resource block number 3.

Referring to FIG. 27, in the resource block number 3, temporary allocations to the terminal E and the terminal F overlap. Furthermore, referring to FIG. 26, because the $R_x$ of the terminal E is four and the $R_x$ of the terminal F is three, and the $R_x$ of the terminal E is maximum, the base station 200 selects the terminal E as illustrated in FIG. 29, and performs main allocation of the resource block to the terminal E as illustrated in FIG. 28. Consequently, as illustrated in FIG. 28, the $R_x$ of the terminal E is changed to one, and all the temporary allocations of the second and subsequent subslots of the terminal E are canceled (the resource block number temporarily allocated to the terminal B in the second and subsequent subslots is rewritten to zero). Furthermore, the temporary allocation of the first subslot to the terminal F is canceled (as illustrated in FIG. 28, the resource block number temporarily allocated to the terminal F in the first subslot is set to zero). Furthermore, the $R_x$ of the terminal F is recalculated according to the processing procedure illustrated in FIG. 18, and the $R_x$ of the terminal F is rewritten to two as illustrated in FIG. 28.

Figure 31:
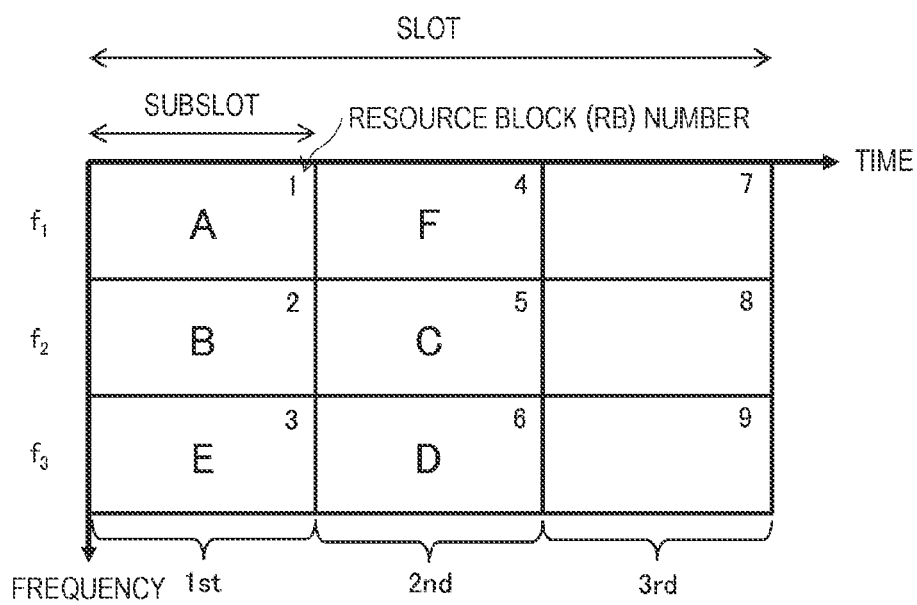
FIG. 31 is a diagram illustrating a specific example (the second embodiment) of allocating the wireless resources to the terminals.

FIGS. 30 and 31 illustrate results of subsequent attempts by the base station 200 to perform main allocation of each resource block of the second subslot.

Referring to FIG. 29, the resource block number 4 of the second subslot is exclusive for the terminal F, and thus, as illustrated in FIG. 30, the base station 200 performs main allocation of the resource block to the terminal F and cancels all temporary allocations of the third and subsequent subslots of the terminal F (the resource block number temporarily allocated to the terminal F in the third and subsequent subslots is rewritten to zero). Further, the resource block number 5 is temporarily allocated only to the terminal C, and thus the base station 200 performs main allocation. Furthermore, as illustrated in FIG. 30, the $R_x$ of the terminal C is rewritten to two, and all the temporary allocations of the third and subsequent subslots of the terminal C are canceled (the resource block number temporarily allocated to the terminal C in the third and subsequent subslots is rewritten to zero). Further, the resource block number 6 is temporarily allocated only to the terminal D as illustrated in FIG. 31, and thus the base station 200 performs main allocation of the resource block to the terminal D as illustrated in FIG. 30.

As can also be seen from FIGS. 20 to 31, after calculating a plurality of candidates for the wireless resource for each terminal in one slot, the base station 200 can determine the wireless resources so that DL transmission can be performed to all the terminals in the slot by adjusting the candidates for the wireless resource so as not to overlap between the terminals. Furthermore, by determining the wireless resources for DL transmission so as to suppress the number of times that the terminal enters the reception state, reduction of redundant power consumption can be expected.

Third Embodiment

In the second embodiment, the minimum exclusive subslot number $R_x$ is used as an index indicating priority in a case where the temporarily allocated resource block is overlapped among a plurality of terminals. However, in a case where the $R_x$ of the plurality of terminals is the same value, there is no choice but to perform random selection, and the priority cannot be determined in consideration of the mainly allocated resource determination processing situation in the subslot.

Figure 32:
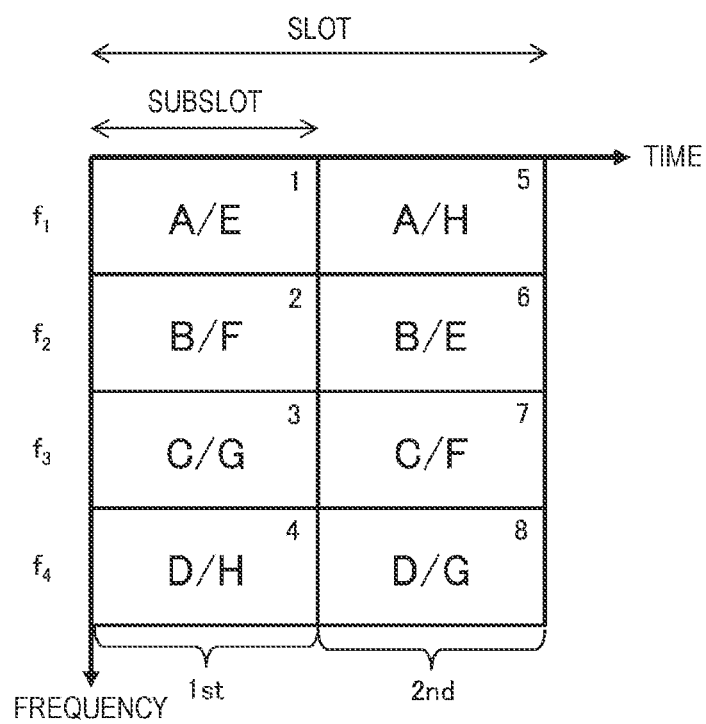
FIG. 32 is a diagram illustrating a result of temporary allocation according to the second embodiment.

Here, the main allocation in a case where temporary allocation results as illustrated in FIG. 32 are obtained for the terminals A to F will be considered. When the terminal A is selected by the resource block number 1, the terminal E is always selected by the resource block number 6. Furthermore, when the terminal F is selected by the resource block number 2, the terminal B is always selected by the resource block number 6. Consequently, as illustrated in FIG. 33, this allocation cannot be performed to either the terminal B or the terminal E, and transmission cannot be performed.

Figure 33:
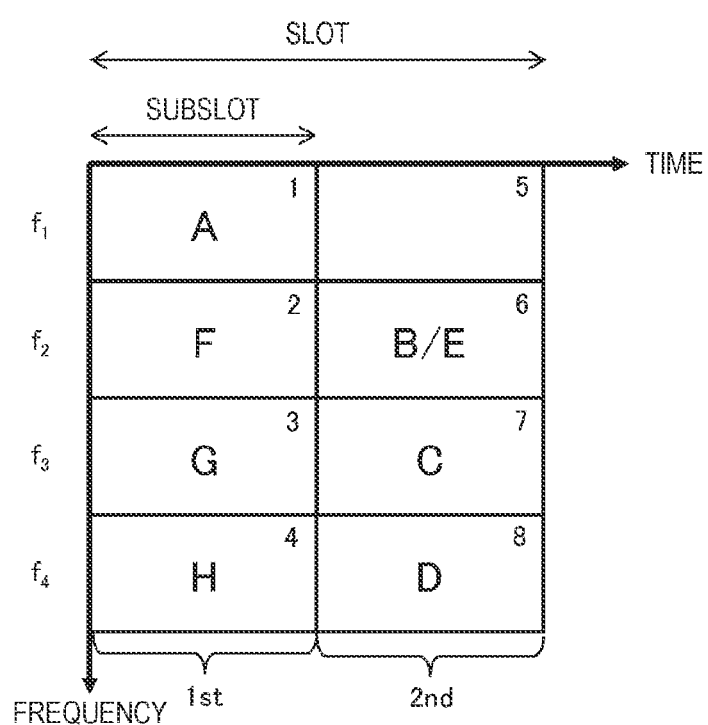
FIG. 33 is a diagram illustrating a result of main allocation according to the second embodiment.

In the example illustrated in FIG. 33, while the temporary allocations of the terminal B and the terminal E conflict with each other in the resource block number 6, the resource block number 5 remains unused. In the second embodiment, the wireless resource to be mainly allocated is searched only in the range of the candidates for the wireless resource temporarily allocated to each terminal, and it can also be said that the unused wireless resource cannot be sufficiently used.

Accordingly, in the third embodiment, a method is employed in which an index is added that is related to the number of terminals for which the mainly allocated resource determination processing has been completed in the previous subslot among the terminals temporarily allocated to each resource block, and the base station determines the wireless resource actually used for DL transmission from among the plurality of candidates for the wireless resource.

Figure 34:
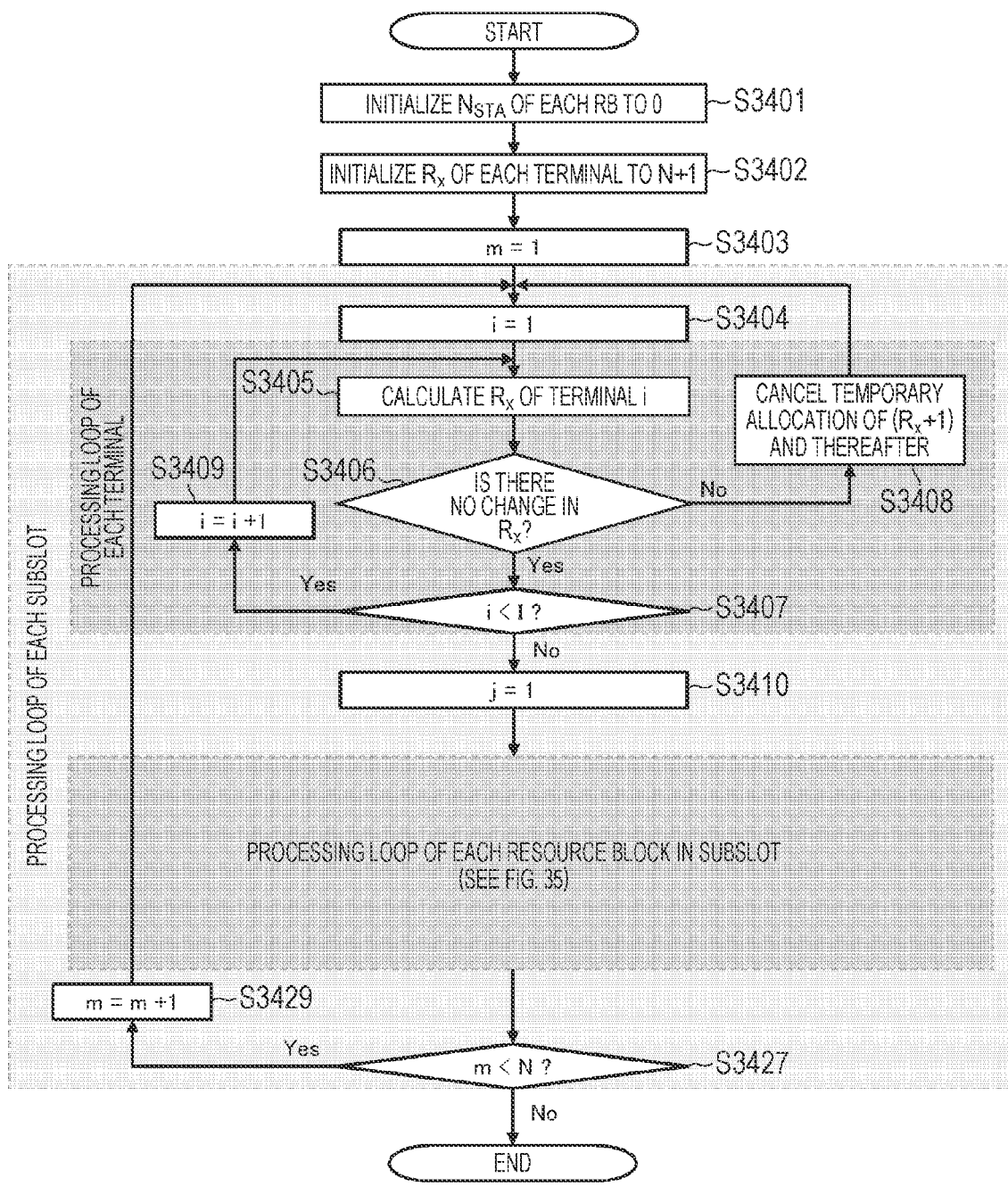
FIG. 34 is a flowchart illustrating a processing procedure (third embodiment) in which the base station 200 determines the wireless resources for DL transmission to be mainly allocated for each terminal.
Figure 35:
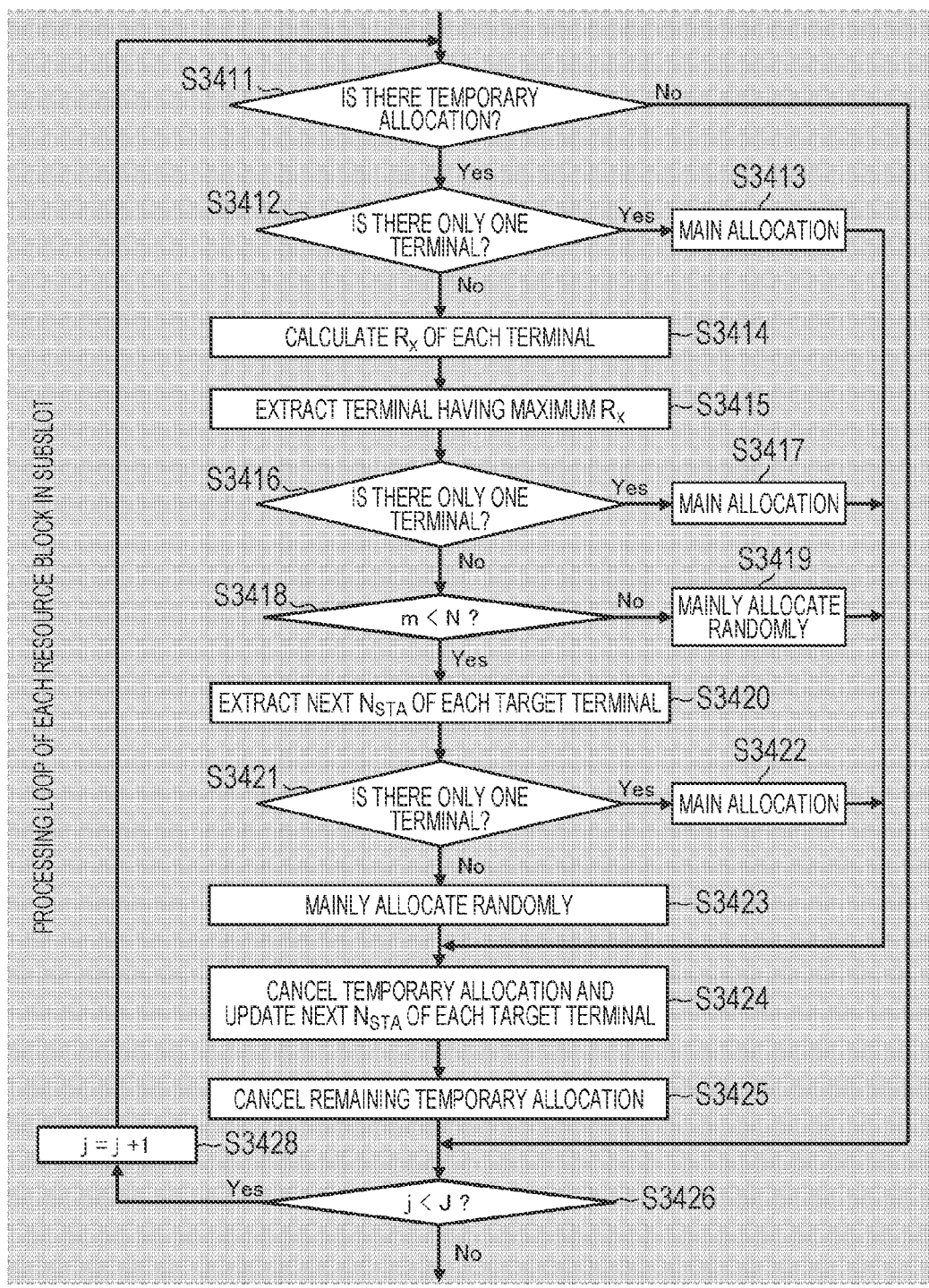
FIG. 35 is a flowchart illustrating a processing procedure (the third embodiment) in which the base station 200 determines the wireless resources for DL transmission to be mainly allocated for each terminal.

FIGS. 34 and 35 illustrate a processing procedure for the base station 200 to determine the wireless resources for DL transmission to be main allocation for each terminal in the third embodiment in the form of a flowchart. The processing procedure illustrated in FIGS. 34 and 35 is performed in step S1604 in the flowchart illustrated in FIG. 16 instead of the processing procedure illustrated in FIG. 17.

Here, as an index for determining the wireless resource for DL transmission, in addition to the minimum exclusive subslot number $R_x$ for each terminal, $N_{STA}$ that counts the number of terminals for which the mainly allocated resource block has been determined in the previous subslot for each resource block is newly defined. The $N_{STA}$ is synonymous with the number of terminals (the number of times a terminal to which a resource block is temporarily allocated misses the main allocation up to the previous subslot) that are always selected for the mainly allocated resource determination processing in the resource block, and it is considered that the possibility that the mainly allocated resource can be determined even in processing of the next subslot is lower as the $N_{STA}$ is larger. In the processing procedure illustrated in FIG. 17, in a case where the $R_x$ of the terminal whose temporary allocation overlaps is the same value, main allocation is selected randomly. On the other hand, the third embodiment has an algorithm in which, in a case where the $R_x$ of the terminal whose temporary allocation overlaps is the same value, comparison of the $N_{STA}$ is further performed to determine priority, and the mainly allocated resource is determined with priority for the terminal having the largest $N_{STA}$.

First, the base station 200 initializes the $N_{STA}$ of each resource block to zero (step S3401) and initializes the $R_x$ of each terminal to N+1 (step S3402). Then, the base station 200 initializes a variable m for counting the number of subslots being processed (or the subslot number) to one (step S3403), and then starts the processing loop of the m-th subslot.

In the processing loop of each subslot, the variable i for counting the number of terminals processed in the processing loop is initialized to one (step S3404), and then the processing loop of the i-th terminal is started.

In the processing loop of each terminal, the base station 200 calculates the $R_x$ of the i-th terminal according to the processing procedure illustrated in FIG. 18 (step S3405), and checks whether the calculated $R_x$ is the same as the numerical value before calculation (step S3406).

In a case where the calculated $R_x$ is not the same as the numerical value before calculation (No in step S3406), the temporary allocations of the wireless resources of the ($R_x$+1)-th and subsequent subslots of the i-th terminal are canceled (step S3408), the processing returns to step S3404, and the processing loop of the m-th subslot is started again.

Furthermore, in a case where the calculated $R_x$ is the same as the numerical value before the calculation (Yes in step S3406), the base station 200 checks whether the variable i is less than the number I of terminals for which wireless resource allocation is scheduled (that is, whether the processing is yet to be completed for all the target terminals) (step S3407). Then, in a case where the variable i is less than the scheduled number I of terminals for wireless resource allocation (No in step S3407), the base station 200 increments i by one (step S3409), returns to step S3405, and repeatedly performs the processing for each terminal for the next terminal.

In a case where the variable i has reached the scheduled number I of wireless resource allocations (Yes in step S3407), the base station 200 ends the processing loop of each terminal, initializes the variable j for counting resource blocks in the subslot to one (step S3410), and then starts the processing loop for the j-th resource block in the m-th subslot.

Details of the processing loop for the resource block are illustrated in FIG. 35. In the processing loop for the resource block, the base station 200 first checks whether any terminal has performed temporary allocation to the resource block (step S3411). The resource block number of the resource block being processed is j+J×(m−1) (where J is the number of resource blocks in the subslot). In step S3411, it is checked whether there is a terminal that has been temporarily allocated to the calculated resource block number.

In a case where any terminal has performed temporary allocation to the resource block (Yes in step S3411), the base station 200 subsequently checks whether there is only one terminal that has performed temporary allocation (step S3412).

Then, in a case where there is only one terminal that has been temporarily allocated to the resource block (Yes in step S3412), the base station 200 performs main allocation of the resource block to the terminal (step S3413).

On the other hand, in a case where there are two or more terminals that have been temporarily allocated to the resource block (No in step S3412), the base station 200 calculates the $R_x$ of each of these terminals according to the processing procedure illustrated in FIG. 18 (step S3414). Then, the terminal having the maximum $R_x$ is extracted (step S3415).

The base station 200 checks whether there is only one terminal having the maximum $R_x$ (step S3416). Then, when there is only one terminal having the maximum $R_x$ (Yes in step S3416), the base station 200 performs main allocation of the resource block to the terminal (step S3417).

Furthermore, on the other hand, in a case where there are two or more terminals having the maximum $R_x$ (No in step S3416), the base station 200 checks whether the variable m is less than the number N of subslots in the slot (that is, whether the processing is yet to be completed for all the subslots in the slot) (step S3418).

Here, in a case where the variable m has reached the number N of subslots (No in step S3418), the base station 200 randomly selects one terminal from among a plurality of terminals having the maximum $R_x$ and performs main allocation of the resource block to the terminal (step S3419).

On the other hand, in a case where the variable m is less than the number N of subslots (Yes in step S3418), the base station 200 extracts the $N_{STA}$ of each of the temporarily allocated resource block numbers of the next (that is, the (m+1)-th) subslot of each terminal having the maximum $R_x$ (step S3420).

The base station 200 checks whether there is only one terminal with the maximum $N_{STA}$ (step S3421). Then, when there is only one terminal with the maximum $N_{STA}$ (Yes in step S3421), the base station 200 performs main allocation of the resource block to the terminal (step S3422).

Furthermore, in a case where there are two or more terminals with the maximum $N_{STA}$ (No in step S3421), the base station 200 randomly selects one terminal from among these terminals, and performs main allocation of the resource block to the terminal (step S3423).

Next, the base station 200 cancels the temporary allocations of the resource blocks in the m-th subslot of the terminal other than the terminal to which the main allocation has been performed in this subslot in any one of steps S3413, S3417, S3419, S3422, or S3423, and adds only one to each $N_{STA}$ of the temporarily allocated resource blocks of the next (that is, the (m+1)-th) subslot of these terminals (step S3424).

Next, the base station 200 cancels the temporary allocations of the wireless resources of the ($R_x$+1)-th and subsequent subslots of the terminal for which the main allocation of the resource blocks is determined in any one of steps S3413, S3417, S3419, S3422, or S3423 and changes the $R_x$ to m, and sets the temporarily allocated resource block number of the m-th subslot as the mainly allocated resource block number (step S3425).

Then, the base station 200 checks whether the variable j is less than the number J of resource blocks in the subslot (that is, whether the processing is yet to be completed for all the resource blocks in the m-th subslot) (step S3426). Then, in a case where the variable j is less than the number J of resource blocks in the subslot (No in step S3426), the base station 200 increments j by one (step S3428), returns to step S3411, and repeatedly performs similar processing on the next resource block in the m-th subslot.

In a case where the variable j has reached the number J of resource blocks in the subslot (Yes in step S3426), the base station 200 checks whether the variable m is less than the number N of subslots in the slot (that is, whether the processing is yet to be completed for all the subslots in the slot) (step S3427). Then, in a case where the variable m is less than the number N of subslots (No in step S3427), the base station 200 increments m by one (step S3429), returns to step S3404, and repeatedly performs similar processing for the next subslot.

Furthermore, in a case where the variable m has reached the number N of subslots (Yes in step S3427), the base station 200 ends this processing.

A specific example in which the base station 200 allocates the wireless resources for DL transmission to the terminals A to H according to the processing procedure illustrated in FIGS. 34 and 35 will be described with reference to FIGS. 36 to 47. Here, it is assumed that one slot is divided into two first (1st) and second (2nd) subslots in the time axis direction, and each subslot is divided into four resource blocks in the frequency axis direction. In addition, for convenience of description, resource block (RB) numbers of 1 to 8 are allocated to the respective resource blocks in one subslot.

Figures 36, 37:
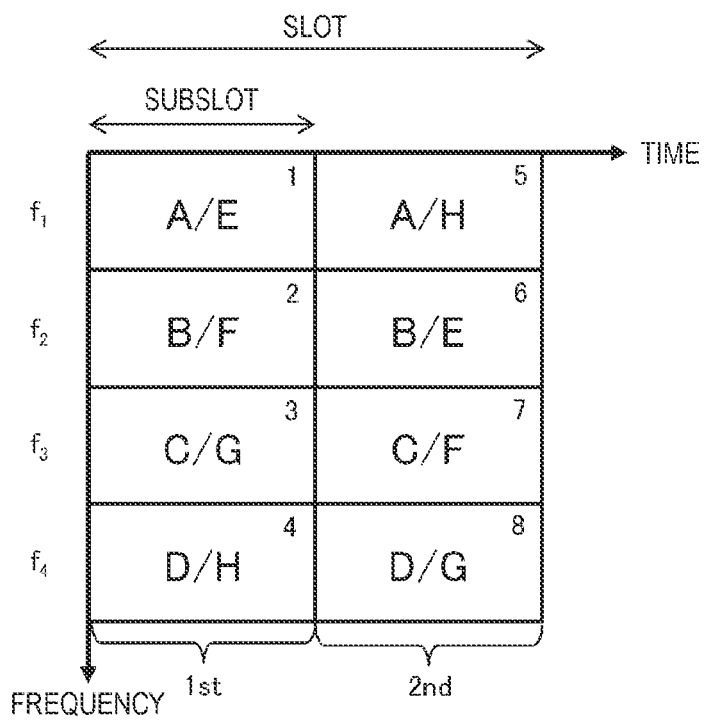
FIG. 36 is a diagram illustrating a specific example (the third embodiment) of allocating the wireless resources to the terminals.
FIG. 37 is a diagram illustrating a specific example (the third embodiment) of allocating the wireless resources to the terminals.

FIG. 36 illustrates temporary allocation results of the resource blocks of the terminals A to H calculated on the basis of the above equations (3) and (4) and results of calculation of the $R_x$ by the base station 200. In FIG. 36, the resource block numbers temporarily allocated to the terminals A to F in each subslot are described. An initial value of the $R_x$ of each of the terminals A to H is N (number of subslots)+1=3. FIG. 36 also illustrates the $N_{STA}$ of each of the resource blocks, all of which have initial values of zero. Furthermore, in FIG. 37, the ID of the temporarily allocated terminal is written in the box of each resource block. In FIG. 37, all the temporarily allocated terminal IDs are written by being separated with slashes in the resource blocks in which the temporary allocations of the plurality of terminals overlap. Since one temporary allocation is performed by each subslot for each of the terminals A to H, if the number of terminals exceeds the number of resource blocks in the subslot, duplication of the temporary allocation always occurs. In the examples illustrated in FIGS. 36 and 37, temporary allocations of a plurality of terminals overlap in all resource blocks at the stage of temporary allocation.

Figures 38, 39:
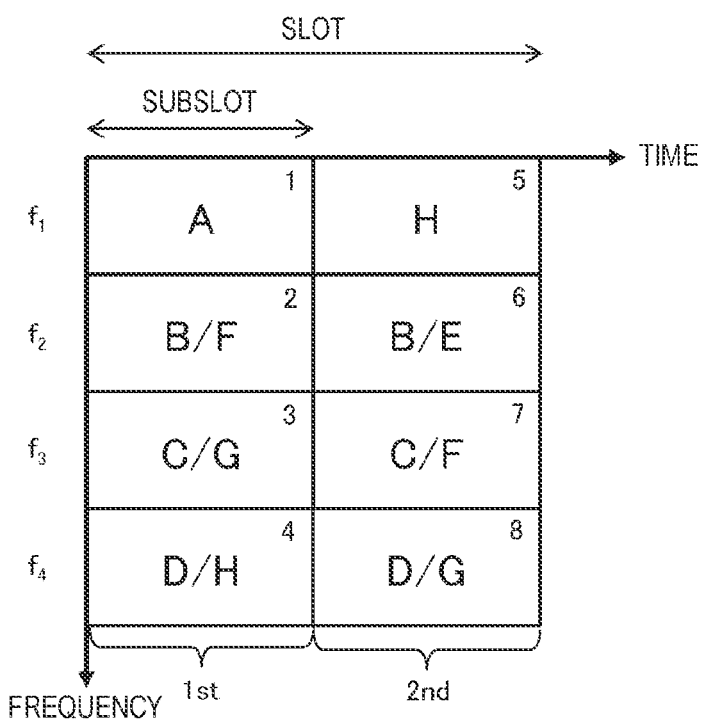
FIG. 38 is a diagram illustrating a specific example (the third embodiment) of allocating the wireless resources to the terminals.
FIG. 39 is a diagram illustrating a specific example (the third embodiment) of allocating the wireless resources to the terminals.

FIGS. 38 and 39 illustrate results of attempts by the base station 200 to perform main allocation to the terminals A to H in the order of the resource block number in the processing loop of each resource block in the subslot in the flowcharts illustrated in FIGS. 34 and 35.

Referring to FIG. 37, the resource block number 1 of the first subslot overlaps in temporary allocations to the terminal A and the terminal E. Furthermore, referring to FIG. 36, both the terminal A and the terminal E have the $R_x$ of three, and thus the $N_{STA}$ of resource blocks in which the terminal A and the terminal E are temporarily allocated in the second subslot are subsequently compared. In the second subslot, the terminal A is temporarily allocated with the resource block number 5 and the terminal E is temporarily allocated with the resource block number 6, but since the $N_{STA}$ of the both is an initial value of zero, the terminal A is randomly selected and is mainly allocated as illustrated in FIG. 39. Consequently, as illustrated in FIG. 38, the $R_x$ of the terminal A is changed to one, and the temporary allocation of the second subslot of the terminal A is canceled (the resource block number temporarily allocated to the terminal A in the second subslot is rewritten to zero). Furthermore, as illustrated in FIG. 38, the temporary allocation of the first subslot to the terminal E is canceled (the resource block number temporarily allocated to the terminal C in the first subslot is set to zero). Moreover, one is added to the $N_{STA}$ of the resource block number 6 to which the terminal E whose main allocation has not been determined is temporarily allocated in the second subslot.

Figures 40, 41:
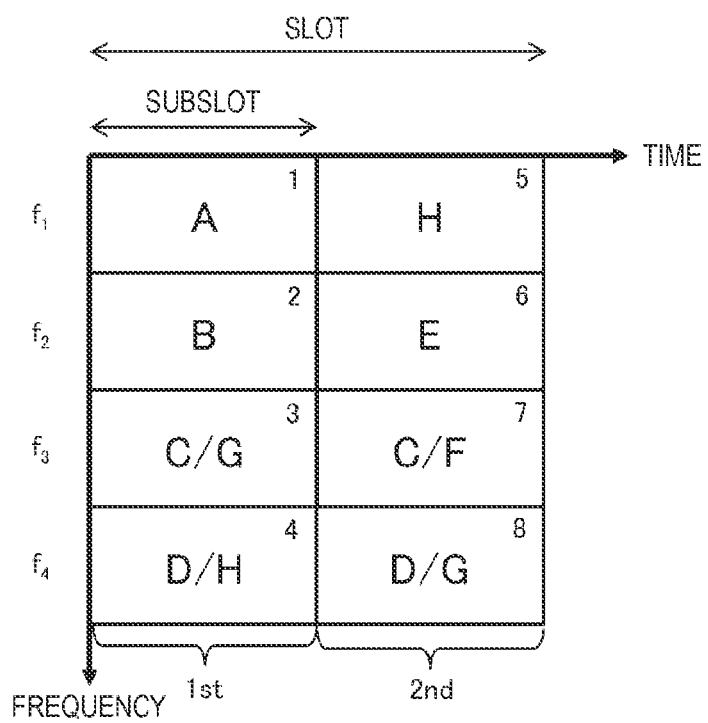
FIG. 40 is a diagram illustrating a specific example (the third embodiment) of allocating the wireless resources to the terminals.
FIG. 41 is a diagram illustrating a specific example (the third embodiment) of allocating the wireless resources to the terminals.

FIGS. 40 and 41 illustrate results of subsequent attempts by the base station 200 to perform main allocation of the resource block number 2.

Referring to FIG. 39, the resource block number 2 overlaps in temporary allocations to the terminal B and the terminal F. Furthermore, referring to FIG. 38, both the terminal B and the terminal F have the $R_x$ of three, and thus comparison of the $N_{STA}$ of resource blocks in which the terminal B and the terminal F are temporarily allocated in the second subslot is subsequently performed. In the second subslot, the $N_{STA}$ of the resource block number 6 temporarily allocated to the terminal B is one, and the $N_{STA}$ of the resource block number 7 temporarily allocated to the terminal F is an initial value of zero. Therefore, as illustrated in FIG. 41, the terminal B with the maximum $N_{STA}$ is selected and main allocation is performed. Consequently, as illustrated in FIG. 40, the $R_x$ of the terminal B is changed to one, and the temporary allocation of the second subslot of the terminal B is canceled (the resource block number temporarily allocated to the terminal B in the second subslot is rewritten to zero). Furthermore, as illustrated in FIG. 40, the temporary allocation of the first subslot to the terminal F is canceled (the resource block number temporarily allocated to the terminal F in the first subslot is set to zero). Moreover, one is added to the $N_{STA}$ of the resource block number 7 to which the terminal F whose main allocation has not been determined is temporarily allocated in the second subslot.

Figures 42, 43:
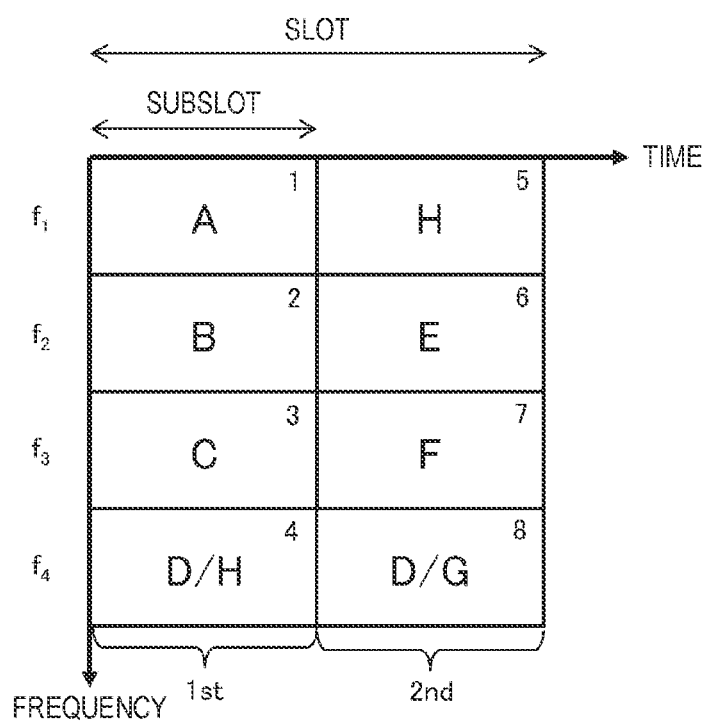
FIG. 42 is a diagram illustrating a specific example (the third embodiment) of allocating the wireless resources to the terminals.
FIG. 43 is a diagram illustrating a specific example (the third embodiment) of allocating the wireless resources to the terminals.

FIGS. 42 and 43 illustrate results of subsequent attempts by the base station 200 to perform main allocation of the resource block number 3.

Referring to FIG. 41, the resource block number 3 overlaps in temporary allocations to the terminal C and the terminal G. Furthermore, referring to FIG. 40, both the terminal C and the terminal G have the $R_x$ of three, and thus comparison of the $N_{STA}$ of resource blocks in which the terminal C and the terminal G are temporarily allocated in the second subslot is subsequently performed. In the second subslot, the $N_{STA}$ of the resource block number 7 temporarily allocated to the terminal C is one, and the $N_{STA}$ of the resource block number 8 temporarily allocated to the terminal G is an initial value of zero. Therefore, as illustrated in FIG. 43, the terminal C with the maximum $N_{STA}$ is selected and the main allocation is performed. Consequently, as illustrated in FIG. 42, the $R_x$ of the terminal C is changed to one, and the temporary allocation of the second subslot of the terminal C is canceled (the resource block number temporarily allocated to the terminal C in the second subslot is rewritten to zero). Furthermore, as illustrated in FIG. 42, the temporary allocation of the first subslot to the terminal G is canceled (the resource block number temporarily allocated to the terminal G in the first subslot is set to zero). Moreover, one is added to the $N_{STA}$ of the resource block number 8 to which the terminal G whose main allocation has not been determined is temporarily allocated in the second subslot.

Figures 44, 45:
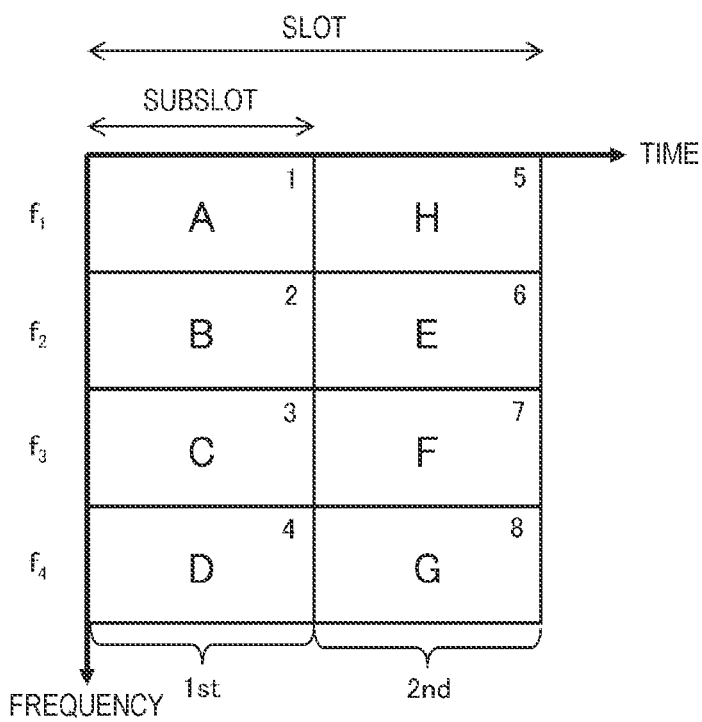
FIG. 44 is a diagram illustrating a specific example (the third embodiment) of allocating the wireless resources to the terminals.
FIG. 45 is a diagram illustrating a specific example (the third embodiment) of allocating the wireless resources to the terminals.

FIGS. 44 and 45 illustrate results of subsequent attempts by the base station 200 to perform main allocation of the resource block number 4.

Referring to FIG. 43, the resource block number 4 overlaps in temporary allocations to the terminal D and the terminal H. Furthermore, referring to FIG. 42, both the terminal D and the terminal H have the $R_x$ of three, and thus comparison of the $N_{STA}$ of resource blocks in which the terminal D and the terminal H are temporarily allocated in the second subslot is subsequently performed. In the second subslot, the $N_{STA}$ of the resource block number 8 temporarily allocated to the terminal D is one, and the $N_{STA}$ of the resource block number 5 temporarily allocated to the terminal H is an initial value of zero. Therefore, as illustrated in FIG. 45, the terminal D with the maximum $N_{STA}$ is selected and main allocation is performed. Consequently, as illustrated in FIG. 44, the $R_x$ of the terminal D is changed to one, and the temporary allocation of the second subslot of the terminal D is canceled (the resource block number temporarily allocated to the terminal D in the second subslot is rewritten to zero). Furthermore, as illustrated in FIG. 44, the temporary allocation of the first subslot to the terminal H is canceled (the resource block number temporarily allocated to the terminal H in the first subslot is set to zero). Moreover, one is added to the $N_{STA}$ of the resource block number 5 to which the terminal H whose main allocation has not been determined is temporarily allocated in the second subslot.

Figures 46, 47:
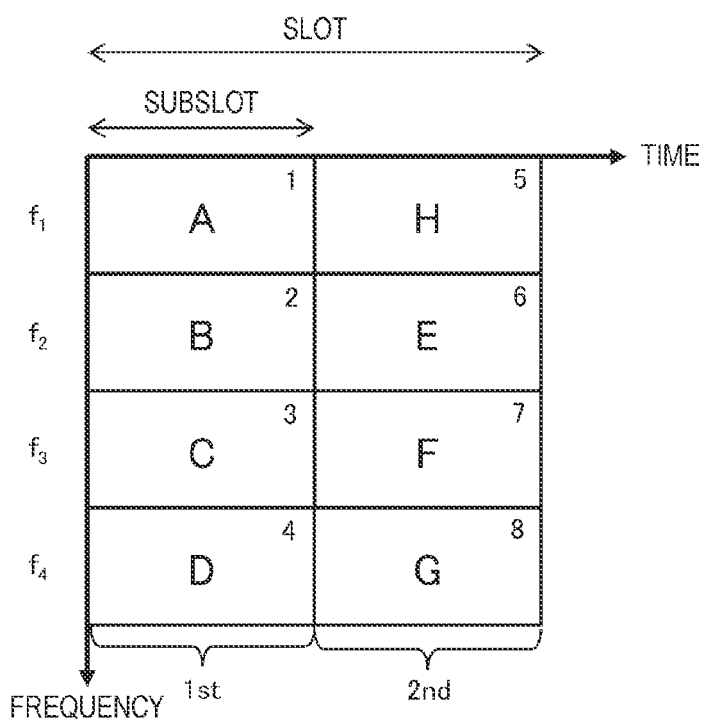
FIG. 46 is a diagram illustrating a specific example (the third embodiment) of allocating the wireless resources to the terminals.
FIG. 47 is a diagram illustrating a specific example (the third embodiment) of allocating the wireless resources to the terminals.

FIGS. 46 and 47 illustrate results of subsequent attempts by the base station 200 to perform main allocation of each resource block of the second subslot.

Referring to FIG. 45, the resource block number 5 is temporarily allocated only to the terminal H, and thus, as illustrated in FIG. 46, main allocation is performed and the $R_x$ of the terminal H is rewritten to two. Furthermore, the resource block number 6 is temporarily allocated only to the terminal E, and thus, as illustrated in FIG. 46, the main allocation is performed and the $R_x$ of the terminal E is rewritten to two. Furthermore, the resource block number 7 is temporarily allocated only to the terminal F, and thus, as illustrated in FIG. 46, the main allocation is performed and the $R_x$ of the terminal F is rewritten to two. Furthermore, the resource block number 8 is temporarily allocated only to the terminal G, and thus, as illustrated in FIG. 46, the main allocation is performed and the $R_x$ of the terminal G is rewritten to two.

As can be seen from FIGS. 36 to 47, a plurality of candidates for the wireless resource is calculated in one slot on the basis of the terminal ID and the subslot start time, and the base station can determine one wireless resource to be actually used for DL transmission while adjusting the plurality of candidates for the wireless resource so as not to overlap with other terminals. Furthermore, when temporary allocations of a plurality of terminals overlap, priority can be determined in consideration of the situation of the resource block temporarily allocated to each terminal in the next subslot.

Fourth Embodiment

In the second and third embodiments, the wireless resources for DL transmission of each terminal are determined only on the basis of information retained by the base station 200. In other words, the wireless resources for DL transmission are allocated without considering the request on the terminal side, and thus there is a possibility that the wireless resources that deteriorate communication efficiency of the entire communication system are performed. For example, in a case where the remaining battery level is small and the remaining number of receivable times is small, or in a case where data requiring Ack from the base station is transmitted, requests of the terminal for allocating wireless resources for DL transmission increase.

Accordingly, in the fourth embodiment, the request information regarding the priority of DL transmission is added to the UL frame regularly transmitted by the terminal, and the base station 200 uses the request information as a new index for determining the wireless resource for DL transmission.

Figure 48:
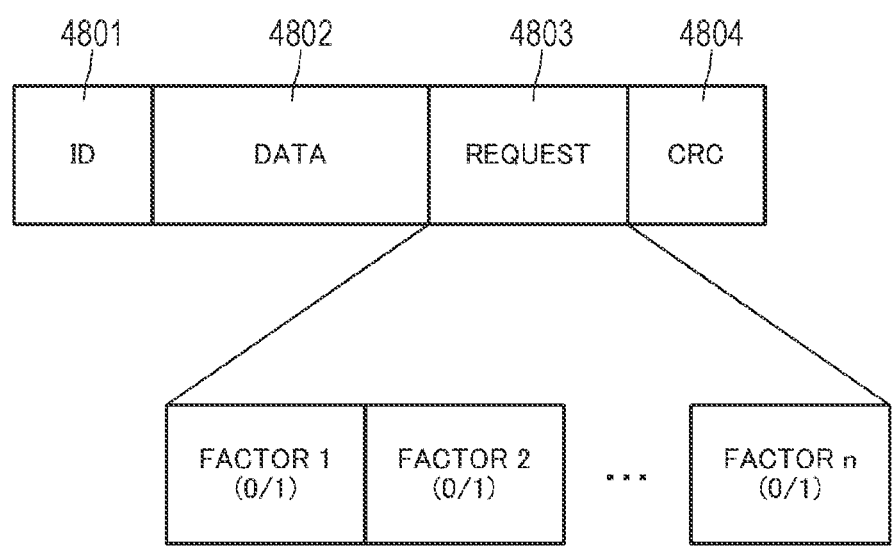
FIG. 48 is a diagram illustrating a configuration example (only a payload portion) of a UL frame including the request information.

FIG. 48 illustrates a configuration example of a payload portion of the UL frame in the fourth embodiment. Respective fields of ID, DATA, and CRC indicated by reference numerals 4801, 4802, and 4804 are similar to those of the frame 400 illustrated in FIG. 4, and thus description thereof will be omitted here.

The REQUEST field indicated by reference numeral 4803 includes information regarding a priority, which is one bit of zero or one. Furthermore, the priority between respective pieces of information is set so as to be in descending order from the highest bit, and in a case where the priority is one, the priority is high. Therefore, the base station 200 preferentially allocates the wireless resources for DL transmission to the terminal having the largest numerical value when a bit string of the REQUEST field 4803 is set as an unsigned binary number. Examples of the information to be used include information regarding latency tolerance and data priority. In a case of the delay tolerance, the terminal sets one thereto in a case where the remaining number of receivable times calculated from the remaining battery level falls below a predetermined threshold. Furthermore, in a case where the data priority is high, such as transmitting data requiring Ack from the base station, or the like, the terminal sets one thereto.

The CRC value calculated for the data stored in the ID field 4801, the DATA field 4802, and the REQUEST field 4803 is stored in the CRC field 4804. Then, FEC or interleave processing is performed on a sequence obtained by concatenating ID, DATA, REQUEST, and CRC to generate a payload of a frame. Then, after the SYNC code used for frame detection is concatenated to the head of the payload, an exclusive OR is obtained for each bit by the scramble code to complete the frame.

Figure 49:
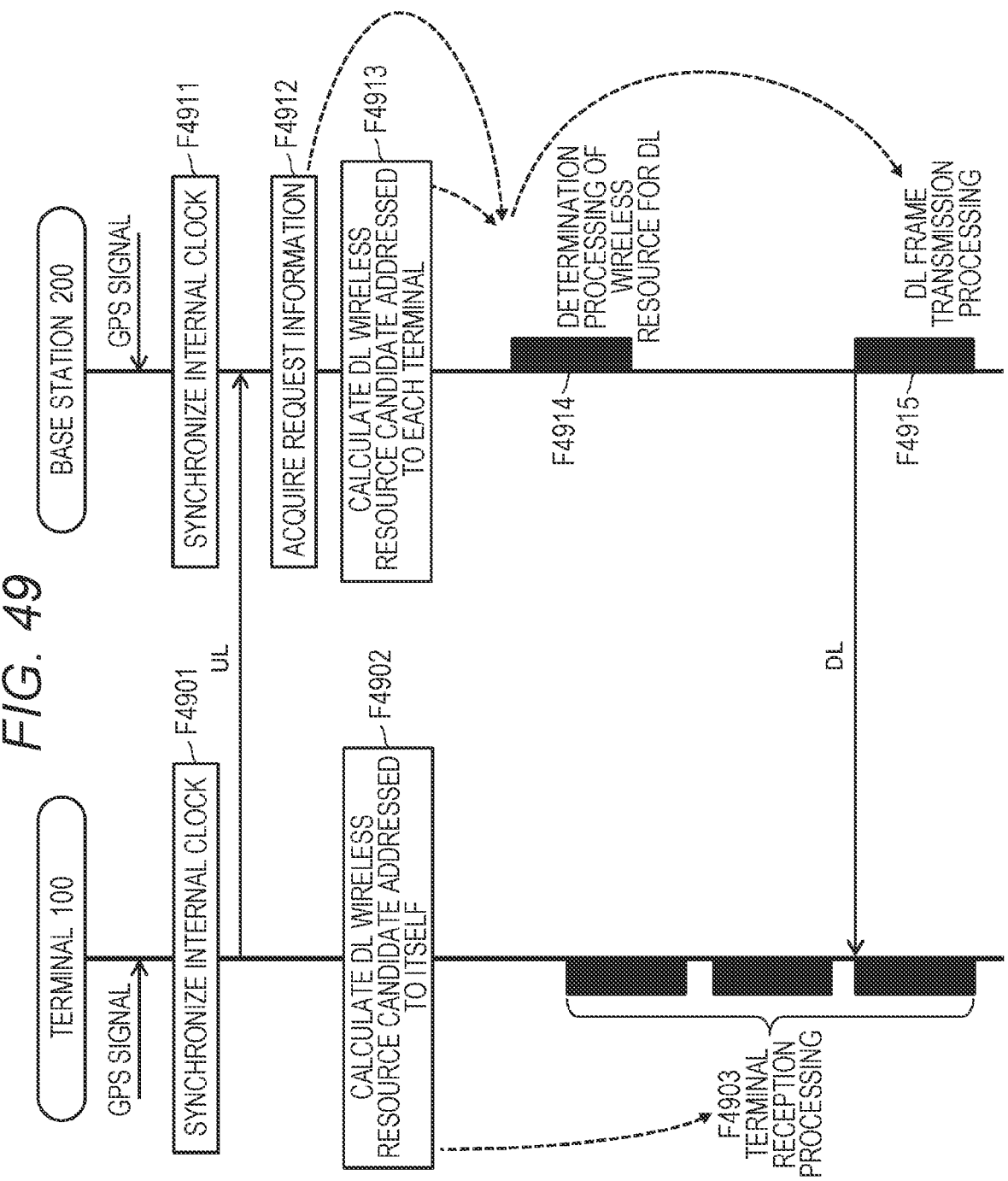
FIG. 49 is a diagram illustrating a processing flow (fourth embodiment) of the entire communication system during DL communication.

FIG. 49 illustrates a processing flow of the entire communication system at the time of DL communication in the fourth embodiment.

First, after receiving the GPS signal, the terminal 100 and the base station 200 synchronize the internal clocks 109 and 209 on the basis of the acquired time information (F4901, F4911). However, it is not always necessary to perform the processing of time synchronization, and the terminal 100 and the base station 200 do not need to perform the processing of time synchronization for a certain period of time once the time synchronization is completed.

Thereafter, when UL communication is performed from the terminal 100 to the base station 200, the base station 200 acquires request information of the terminal 100 from the REQUEST field of the UL frame (F4912).

Next, the terminal 100 calculates a plurality of candidates for the wireless resource for DL transmission in each subslot in one slot from the terminal ID of itself and the start time of the reception subslot (F4902). Similarly, the base station 200 calculates candidates for the wireless resource for DL transmission related to each terminal in each subslot in one slot from the ID of each terminal connected to the own station and the start time of each transmission subslot, and performs temporary allocation (F4913).

Then, the base station 200 determines one wireless resource to be mainly allocated in one slot for each terminal, from the temporarily allocated candidates for the wireless resource for DL transmission while considering the acquired request information (F4914).

Thereafter, the base station 200 generates a frame on the basis of the calculated code and converts the generated frame into a wireless signal. Then, when the time of the wireless resource for DL transmission of the terminal 100 comes, frame transmission is performed at the calculated frequency (F4915).

On the other hand, when the time of the calculated wireless resource for DL transmission comes, the terminal 100 receives a wireless signal of the calculated frequency, and detects and demodulates the frame using the calculated code (F4903). The terminal 100 is unaware of which wireless resource the base station 200 has determined as the mainly allocated resource. Thus, the terminal 100 repeatedly performs the reception processing with each calculated candidate for the wireless resource until the frame from the base station 200 can be correctly demodulated.

Figure 50:
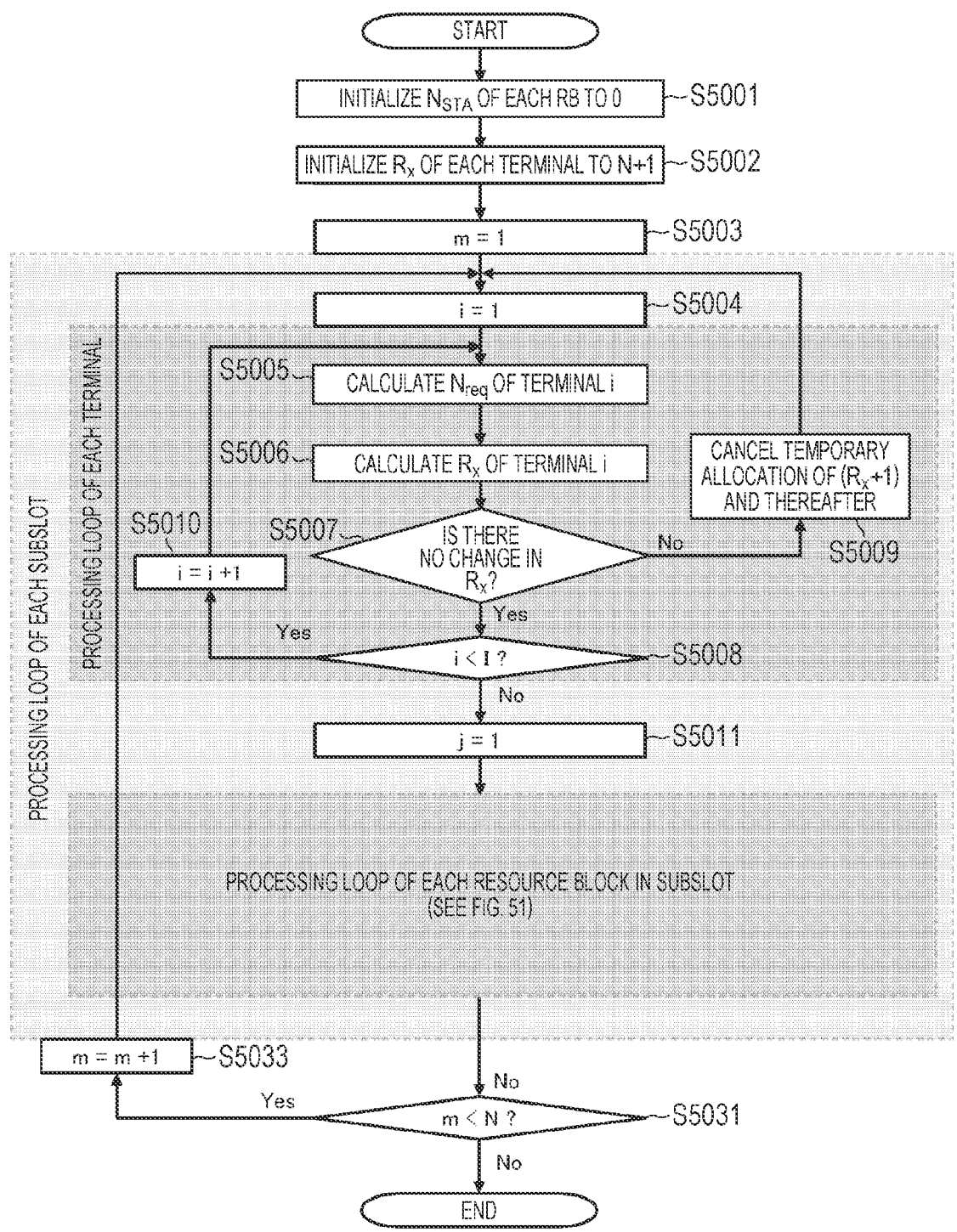
FIG. 50 is a flowchart illustrating processing procedure (the fourth embodiment) in which the base station 200 determines the wireless resources for DL transmission to be mainly allocated for each terminal.
Figure 51:
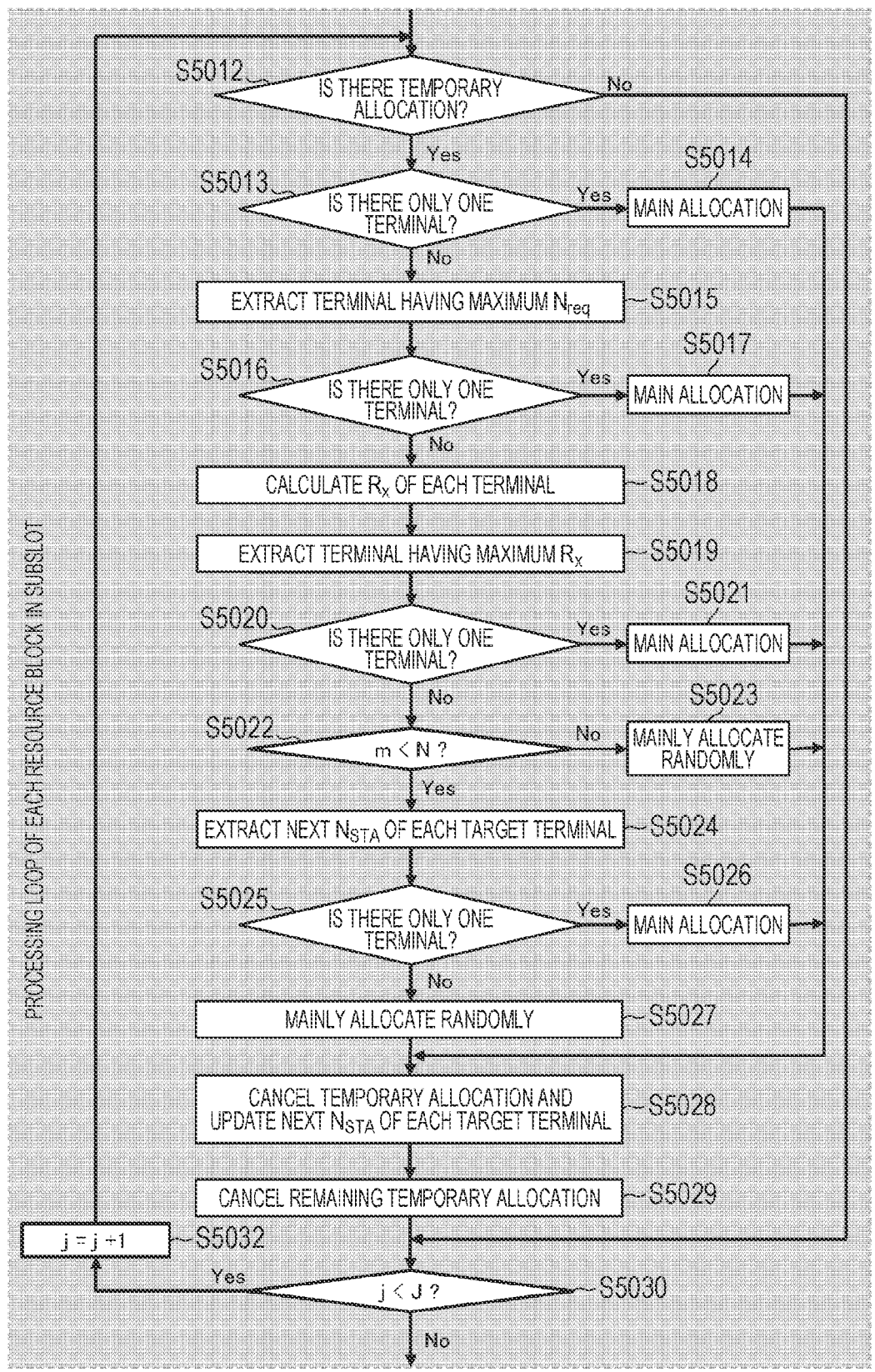
FIG. 51 is a flowchart illustrating processing procedure (the fourth embodiment) in which the base station 200 determines the wireless resources for DL transmission to be mainly allocated for each terminal.

FIGS. 50 and 51 illustrate a processing procedure for the base station 200 to determine the wireless resources for DL transmission to be main allocation for each terminal in the fourth embodiment in the form of a flowchart. The processing procedure illustrated in FIGS. 50 and 51 is performed in step S1604 in the flowchart illustrated in FIG. 16 instead of the processing procedure illustrated in FIG. 17.

Here, as an index for determining the wireless resource for DL transmission, request information acquired from each terminal is added in addition to the minimum exclusive subslot number $R_x$ for each terminal and the $N_{STA}$ that counts the number of terminals for which the mainly allocated resource block has been determined in the previous subslot for each resource block. Specifically, $N_{req}$ is a numerical value obtained by converting the bit string of the REQUEST field included in the UL frame from the terminal as an unsigned binary number into a decimal number, and the terminal having the largest $N_{req}$ is preferentially selected.

First, the base station 200 initializes the $N_{STA}$ of each resource block to zero (step S5001) and initializes the $R_x$ of each terminal to N+1 (step S5002). Then, the base station 200 initializes a variable m for counting the number of subslots being processed (or the subslot number) to one (step S5003), and then starts the processing loop of the m-th subslot.

In the processing loop of each subslot, the variable i for counting the number of terminals processed in the processing loop is initialized to one (step S5004), and then the processing loop of the i-th terminal is started.

In the processing loop of each terminal, the base station 200 calculates the numerical value $N_{req}$ obtained by converting the bit string of the REQUEST field included in the UL frame from the i-th terminal as an unsigned binary number into a decimal number (step S5005). Next, the base station 200 calculates the $R_x$ of the i-th terminal according to the processing procedure illustrated in FIG. 18 (step S5006), and checks whether the calculated $R_x$ is the same as the numerical value before calculation (step S5007).

In a case where the calculated $R_x$ is not the same as the numerical value before calculation (No in step S5007), the temporary allocations of the wireless resources of the ($R_x$+1)-th and subsequent subslots of the i-th terminal are canceled (step S5009), the processing returns to step S5005, and the processing loop of the m-th subslot is started again.

Furthermore, in a case where the calculated $R_x$ is the same as the numerical value before the calculation (Yes in step S5007), the base station 200 checks whether the variable i is less than the number I of terminals for which wireless resource allocation is scheduled (that is, whether the processing is yet to be completed for all the target terminals) (step S5008). Then, in a case where the variable i is less than the scheduled number I of terminals for wireless resource allocation (No in step S5008), the base station 200 increments i by one (step S5010), returns to step S5005, and repeatedly performs the processing for each terminal for the next terminal.

In a case where the variable i has reached the scheduled number I of wireless resource allocations (Yes in step S5008), the base station 200 ends the processing loop of each terminal, initializes the variable j for counting resource blocks in the subslot to one (step S5011), and then starts the processing loop for the j-th resource block in the m-th subslot.

Details of the processing loop for the resource block are illustrated in FIG. 51. In the processing loop for the resource block, the base station 200 first checks whether any terminal has performed temporary allocation to the resource block (step S5012). The resource block number of the resource block being processed is j+J×(m−1) (where J is the number of resource blocks in the subslot). In step S5012, it is checked whether there is a terminal that has been temporarily allocated to the calculated resource block number.

In a case where any terminal has performed temporary allocation to the resource block (Yes in step S5012), the base station 200 subsequently checks whether there is only one terminal that has performed temporary allocation (step S5013).

Then, in a case where there is only one terminal that has been temporarily allocated to the resource block (Yes in step S5013), the base station 200 performs main allocation of the resource block to the terminal (step S5014).

On the other hand, in a case where there are two or more terminals that have been temporarily allocated to the resource block (No in step S5013), the base station 200 extracts a terminal having the maximum $N_{req}$ (step S5015).

The base station 200 checks whether there is only one terminal having the maximum $N_{req}$ (step S5016). Then, in a case where there is only one terminal having the maximum $N_{req}$ (Yes in step S5016), the base station 200 performs main allocation of the resource block to the terminal (step S5017).

In a case where there are two or more terminals having the maximum $N_{req}$ (No in step S5016), the base station 200 calculates the $R_x$ of each of these terminals according to the processing procedure illustrated in FIG. 18 (step S5018). Then, the terminal having the maximum $R_x$ is extracted (step S5019).

The base station 200 checks whether there is only one terminal having the maximum $R_x$ (step S5020). Then, when there is only one terminal having the maximum $R_x$ (Yes in step S5020), the base station 200 performs main allocation of the resource block to the terminal (step S5021).

Furthermore, in a case where there are two or more terminals having the maximum $R_x$ (No in step S5020), the base station 200 checks whether the variable m is less than the number N of subslots in the slot (that is, whether the processing is yet to be completed for all the subslots in the slot) (step S5022).

Here, in a case where the variable m has reached the number N of subslots (No in step S5022), the base station 200 randomly selects one terminal from among a plurality of terminals having the maximum $R_x$ and performs main allocation of the resource block to the terminal (step S5023).

On the other hand, in a case where the variable m is less than the number N of subslots (Yes in step S5022), the base station 200 extracts each $N_{STA}$ of the temporarily allocated resource block number of the next (that is, the (m+1)-th) subslot of each terminal having the maximum $R_x$ (step S5024).

The base station 200 checks whether there is only one terminal with the maximum $N_{STA}$ (step S5025). Then, when there is only one terminal with the maximum $N_{STA}$ (Yes in step S5025), the base station 200 performs main allocation of the resource block to the terminal (step S5026).

Furthermore, in a case where there are two or more terminals with the maximum number of $N_{STA}$ (No in step S5025), the base station 200 randomly selects one terminal from these terminals, and performs main allocation of the resource block to the terminal (step S5027).

Next, the base station 200 cancels the temporary allocations of the resource blocks in the m-th subslot of the terminal other than the terminal to which main allocation has been performed in any one of steps S5014, S5017, S5021, S5023, S5026, or S5027, and adds 1 to each $N_{STA}$ of the temporarily allocated resource block of the next (that is, the (m+1)-th) subslot of these terminals (step S5028).

Next, the base station 200 cancels the temporary allocations of the wireless resources of the $(R_x+1)$-th and subsequent subslots of the terminal for which the main allocation of resource blocks is determined in any one of steps S5014, S5017, S5021, S5023, S5026, or S5027 and changes the $R_x$ to m, and sets the temporarily allocated resource block number of the m-th subslot as the mainly allocated resource block number (step S5029).

Then, the base station 200 checks whether the variable j is less than the number J of resource blocks in the subslot (that is, whether the processing is yet to be completed for all the resource blocks in the m-th subslot) (step S5030). Then, in a case where the variable j is less than the number J of resource blocks in the subslot (No in step S5030), the base station 200 increments j by one (step S5032), returns to step S5012, and repeatedly performs similar processing on the next resource block in the m-th subslot.

In a case where the variable j has reached the number J of resource blocks in the subslot (Yes in step S5030), the base station 200 checks whether the variable m is less than the number N of subslots in the slot (that is, whether the processing is yet to be completed for all the subslots in the slot) (step S5031). Then, in a case where the variable m is less than the number N of subslots (No in step S5031), the base station 200 increments m by one (step S5033), returns to step S5004, and repeatedly performs similar processing for the next subslot.

Furthermore, in a case where the variable m has reached the number N of subslots (Yes in step S5031), the base station 200 ends this processing.

Note that, in the flowcharts illustrated in FIGS. 50 and 51, the $N_{req}$ is used as the index with the highest priority, but the determination processing of the wireless resource for DL transmission may be performed with the $N_{req}$ being lower than the other indexes $R_x$ and $N_{STA}$.

A specific example in which the base station 200 allocates the wireless resources for DL transmission to the terminals A to F according to the processing procedure illustrated in FIGS. 50 and 51 will be described with reference to FIGS. 52 to 63. Here, it is assumed that one slot is divided into three subslots of first (1st), second (2nd), and third (3rd) in the time axis direction, and each subslot is divided into three resource blocks in the frequency axis direction. Furthermore, for convenience of description, resource block (RB) numbers of 1 to 9 are allocated to the respective resource blocks in one subslot.

Figures 52, 53:
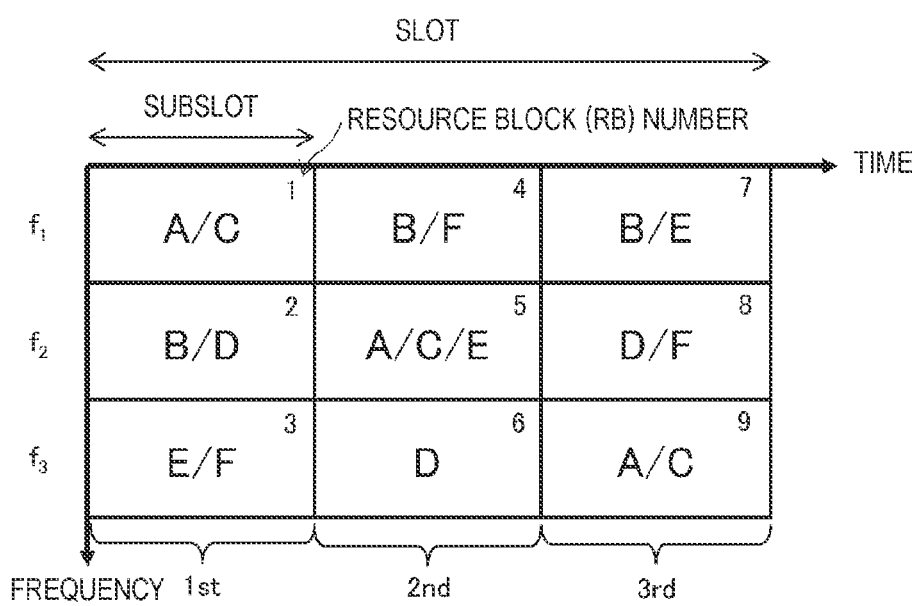
FIG. 52 is a diagram illustrating a specific example (the fourth embodiment) of allocating the wireless resources to the terminals.
FIG. 53 is a diagram illustrating a specific example (the fourth embodiment) of allocating the wireless resources to the terminals.

FIG. 52 illustrates temporary allocation results of the resource blocks of the terminals A to F calculated on the basis of the above equations (3) and (4) and results of initializing the $N_{STA}$ of the resource blocks by the base station 200. In FIG. 52, the resource block numbers temporarily allocated to the terminals A to F in each subslot are described. Furthermore, in FIG. 53, the ID of the temporarily allocated terminal is written in the box of each resource block. In FIG. 53, all the temporarily allocated terminal IDs are written by being separated with slashes in the resource blocks in which the temporary allocations of the plurality of terminals overlap. Since one temporary allocation is performed by each subslot for each of the terminals A to F, if the number of terminals exceeds the number of resource blocks in the subslot, duplication of temporary allocation always occurs. In the examples illustrated in FIGS. 52 and 53, in the stage of the temporary allocation, temporary allocations of the plurality of terminals overlap in the resource block other than the resource block number 6.

Figures 54, 55:
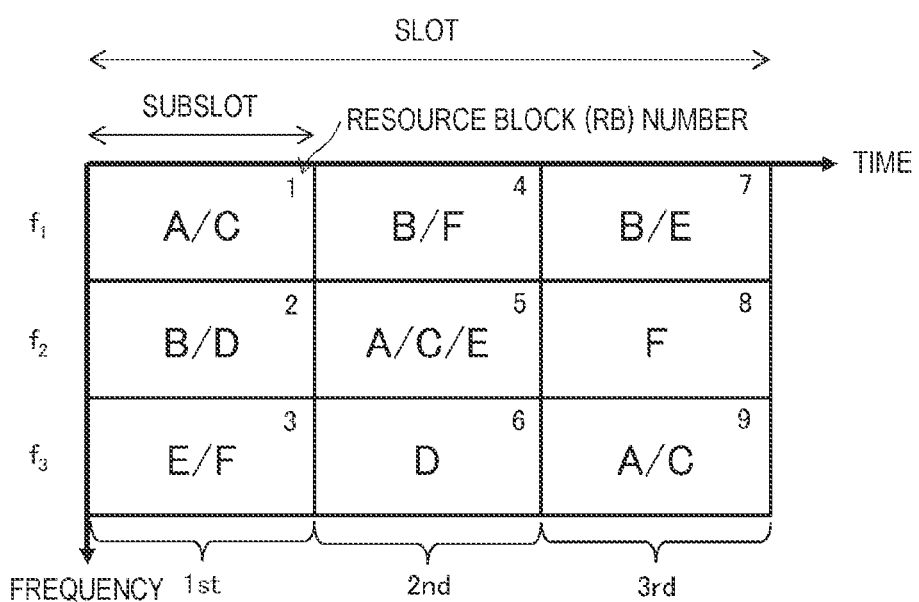
FIG. 54 is a diagram illustrating a specific example (the fourth embodiment) of allocating the wireless resources to the terminals.
FIG. 55 is a diagram illustrating a specific example (the fourth embodiment) of allocating the wireless resources to the terminals.

FIGS. 54 and 55 illustrate results of calculation of the $R_x$ of the terminals A to F by the base station 200 according to the processing procedure illustrated in FIG. 18 and results of calculation of the $N_{req}$ of the terminals in the processing loop of each terminal illustrated in FIG. 50.

An initial value of the $R_x$ of each of the terminals A to F is N (number of subslots)+1=4. Here, in the examples illustrated in FIGS. 52 and 53, the resource block number 6 in the second subslot is exclusive for the terminal D. Therefore, as illustrated in FIG. 54, the $R_x=2$ in the terminal D. Furthermore, the temporary allocations of the third and subsequent subslots of the terminal D are canceled (the resource block number temporarily allocated to the terminal D in the third subslot is rewritten to zero). Consequently, as illustrated in FIG. 55, in the third subslot, the resource block number 8 can be exclusive for the terminal F. Therefore, as illustrated in FIG. 54, the $R_x=3$ in the terminal F.

Figures 56, 57:
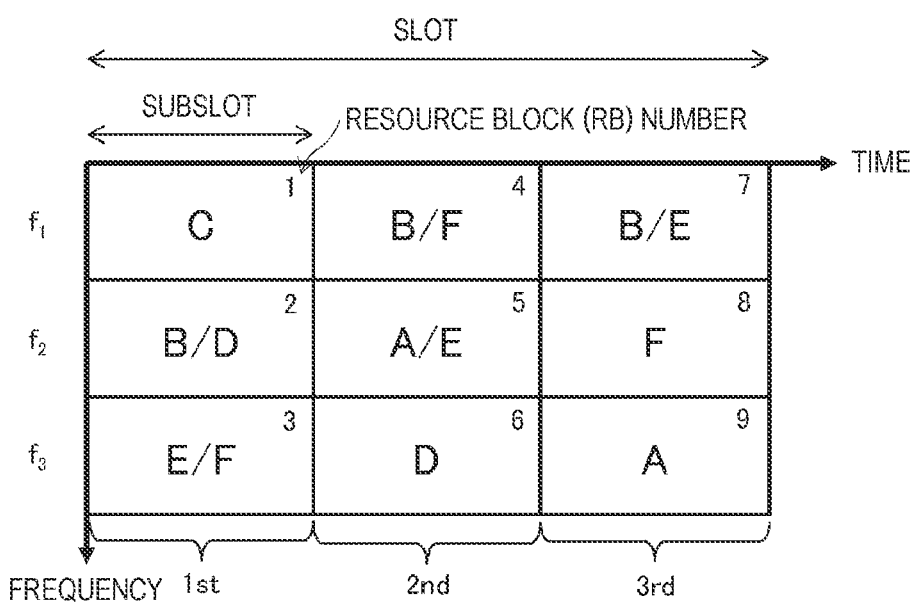
FIG. 56 is a diagram illustrating a specific example (the fourth embodiment) of allocating the wireless resources to the terminals.
FIG. 57 is a diagram illustrating a specific example (the fourth embodiment) of allocating the wireless resources to the terminals.

FIGS. 56 and 57 illustrate results of attempts by the base station 200 to perform main allocation to the terminals A to F in the order of the resource block number in the processing loop of each resource block in the subslot illustrated in FIG. 51.

Referring to FIG. 55, in the resource block number 1 of the first subslot, temporary allocations to the terminal A and the terminal C overlap. Accordingly, referring to FIG. 54, the terminal C is larger when referring to the $N_{req}$ of each of the terminal A and the terminal C, and thus the base station 200 selects the terminal C and performs main allocation of the resource block as illustrated in FIG. 57. Consequently, as illustrated in FIG. 56, the $R_x$ of the terminal C is changed to one, and all the temporary allocations of the second and subsequent subslots of the terminal C are canceled (the resource block number temporarily allocated to the terminal C in the second and subsequent subslots is rewritten to zero). Furthermore, as illustrated in FIG. 56, the base station 200 cancels the temporary allocation of the first subslot to the terminal A (the resource block number temporarily allocated to the terminal A in the first subslot is set to zero). Moreover, as illustrated in FIG. 56, the base station 200 adds one to the $N_{STA}$ of the resource block number 5 to which the terminal A whose main allocation has not been determined is temporarily allocated in the second subslot.

Figures 58, 59:
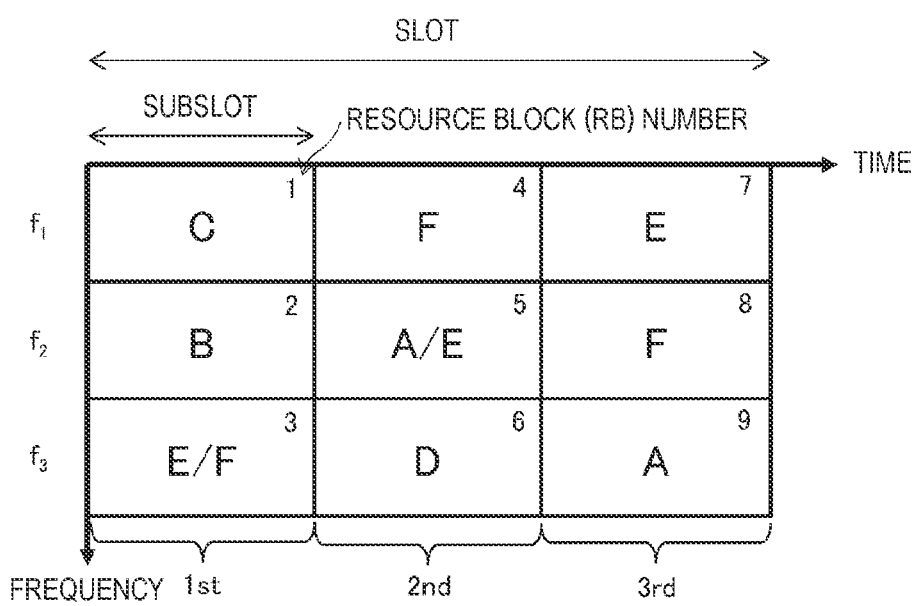
FIG. 58 is a diagram illustrating a specific example (the fourth embodiment) of allocating the wireless resources to the terminals.
FIG. 59 is a diagram illustrating a specific example (the fourth embodiment) of allocating the wireless resources to the terminals.

FIGS. 58 and 59 illustrate results of subsequent attempts by the base station 200 to perform main allocation of the resource block number 2.

Referring to FIG. 57, the resource block number 2 overlaps in temporary allocations to the terminal B and the terminal D. Accordingly, referring to FIG. 56, the terminal B is larger when referring to the $N_{req}$ of each of the terminal B and the terminal D, and thus the base station 200 selects the terminal B and performs main allocation of the resource block as illustrated in FIG. 59. Consequently, as illustrated in FIG. 58, the base station 200 changes $R_x$ of the terminal B to one, and cancels all the temporary allocations of the second and subsequent subslots of the terminal B (the resource block number temporarily allocated to the terminal B in the second and subsequent subslots is rewritten to zero). Furthermore, as illustrated in FIG. 58, the base station 200 cancels the temporary allocation of the first subslot to the terminal D (the resource block number temporarily allocated to the terminal D in the first subslot is set to zero). Moreover, as illustrated in FIG. 58, the base station 200 adds one to the $N_{STA}$ of the resource block number 6 to which the terminal D whose main allocation has not been determined is temporarily allocated in the second subslot.

Figures 60, 61:
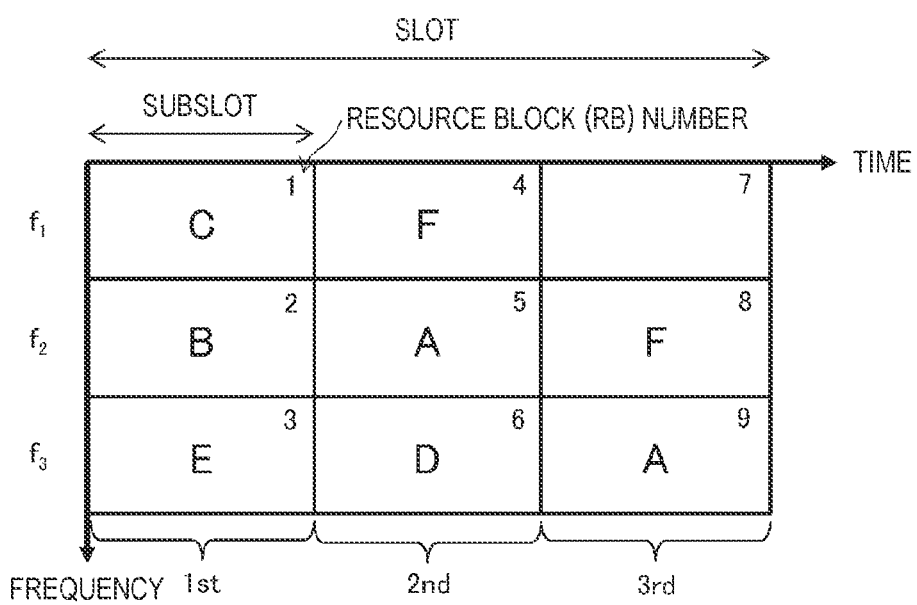
FIG. 60 is a diagram illustrating a specific example (the fourth embodiment) of allocating the wireless resources to the terminals.
FIG. 61 is a diagram illustrating a specific example (the fourth embodiment) of allocating the wireless resources to the terminals.

FIGS. 60 and 61 illustrate results of subsequent attempts by the base station 200 to perform main allocation of the resource block number 3.

Referring to FIG. 59, the resource block number 3 overlaps in temporary allocations to the terminal E and the terminal F. Thus, referring to FIG. 58, the $N_{req}$ of each of the terminal E and the terminal F has the same value, and thus the base station 200 further compares the $R_x$ with each other. Since the $R_x$ of the terminal E is four and the $R_x$ of the terminal F is three, and the $R_x$ of the terminal E is maximum, the base station 200 selects the terminal E and performs main allocation of the resource block as illustrated in FIG. 61. Consequently, as illustrated in FIG. 60, the base station 200 changes the $R_x$ of the terminal E to one, and cancels all the temporary allocations of the second and subsequent subslots of the terminal E (the resource block number temporarily allocated to the terminal E in the second and subsequent subslots is rewritten to zero). Furthermore, as illustrated in FIG. 60, the base station 200 cancels the temporary allocation of the first subslot to the terminal F (the resource block number temporarily allocated to the terminal F in the first subslot is set to zero). Moreover, as illustrated in FIG. 60, the base station 200 adds one to the $N_{STA}$ of the resource block number 4 to which the terminal F whose main allocation has not been determined is temporarily allocated in the second subslot. Furthermore, the base station 200 recalculates the $R_x$ of the terminal F and changes the $R_x$ to two.

Figures 62, 63:
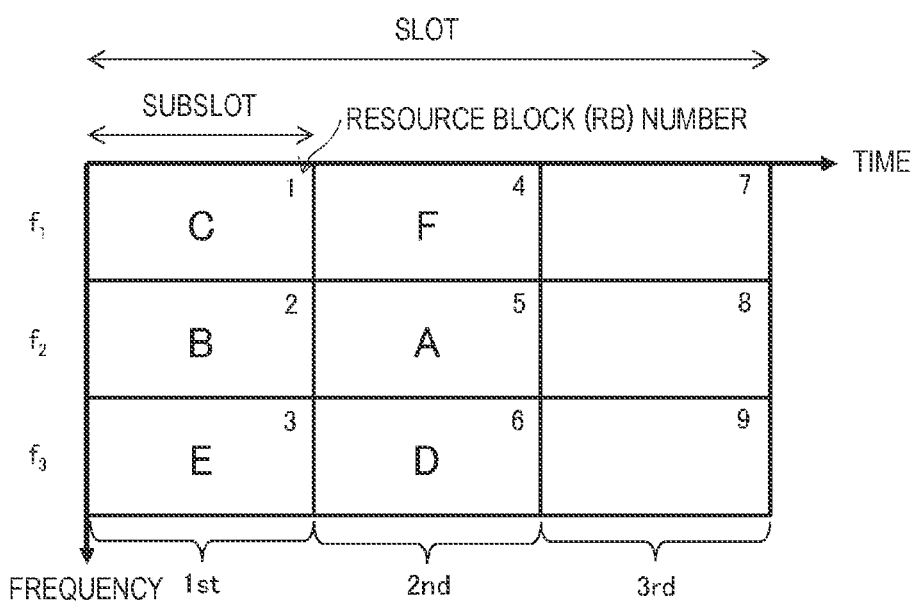
FIG. 62 is a diagram illustrating a specific example (the fourth embodiment) of allocating the wireless resources to the terminals.
FIG. 63 is a diagram illustrating a specific example (the fourth embodiment) of allocating the wireless resources to the terminals.

FIGS. 62 and 63 illustrate results of subsequent attempts by the base station 200 to perform main allocation of each resource block of the second subslot.

Referring to FIG. 61, the resource block number 4 is temporarily allocated only to the terminal F, and thus the base station 200 performs main allocation of the resource block. Further, the base station 200 rewrites the $R_x$ of the terminal F to two as illustrated in FIG. 62, and cancels all the temporary allocations of the third and subsequent subslots of the terminal F as illustrated in FIGS. 62 and 63 (the resource block number temporarily allocated to the terminal F in the third and subsequent subslots is rewritten to zero). Furthermore, the resource block number 5 is temporarily allocated only to the terminal A, and thus the base station 200 performs main allocation of the resource block. Further, the base station 200 rewrites the $R_x$ of the terminal A to two as illustrated in FIG. 62, and cancels all the temporary allocations of the third and subsequent subslots of the terminal A as illustrated in FIGS. 62 and 63 (the resource block number temporarily allocated to the terminal A in the third and subsequent subslots is rewritten to zero). Furthermore, since the resource block number 6 is temporarily allocated only to the terminal D as illustrated in FIG. 60, the base station 200 performs main allocation of the resource block as illustrated in FIG. 62.

As can also be seen from FIGS. 52 to 63, after calculating a plurality of candidates for the wireless resource for each terminal in one slot, the base station 200 can determine the wireless resources so that DL transmission can be performed on all terminals in the slot by adjusting the candidates for the wireless resource so as not to overlap each other on the basis of the request information from each terminal. Furthermore, by determining the wireless resources for DL transmission so as to suppress the number of times that the terminal enters the reception state, reduction of redundant power consumption can be expected.

While the three embodiments related to the technology disclosed herein have been described, effects brought by the technology disclosed herein will now be described.

According to the technology disclosed herein, it is possible to calculate the wireless resource for DL transmission in advance without signaling the control information between the base station and the terminal, and it is possible to achieve DL transmission with suppressed power consumption of the terminal.

Furthermore, according to the technology disclosed herein, the parameter (initial value to the pseudo random number generator) changes in each transmission, and the wireless resource for DL transmission can be flexibly allocated. Consequently, the possibility that the wireless resources used between the terminals overlap and the influence of interference from other systems in a specific terminal can be reduced.

Furthermore, according to the technology disclosed herein, after calculating a plurality of candidates for the wireless resource for DL transmission for each terminal in the slot, the base station can perform adjustment so that the candidates for the wireless resource do not overlap between the terminals. Furthermore, the base station can allocate wireless resources from a plurality of candidates to each terminal while considering various information such as request information from the terminal.

INDUSTRIAL APPLICABILITY

The technology disclosed herein has been described in detail with reference to the specific embodiments. However, it is obvious that those skilled in the art can modify or substitute the embodiment without departing from the gist of the technology disclosed herein.

The technology disclosed herein can be applied to, for example, the IoT domain to flexibly allocate wireless resources of downlink communication without signaling between the terminal and the base station, and it is possible to reduce the possibility that the wireless resources used between the terminals overlap, and the influence of interference from other systems in a specific terminal. Of course, the technology disclosed herein can be similarly applied to various types of wireless systems including a terminal and a base station.

In short, the technology disclosed herein has been described by way of example, and the contents of the description herein should not be interpreted restrictively. In order to determine the gist of the technology disclosed herein, the claims should be considered.

Note that the technology disclosed herein may have the following configurations.
  (1) A communication device including a communication unit that transmits and receives a wireless signal, and a wireless resource determination unit that determines a wireless resource to be used for transmission and reception,
    in which the wireless resource determination unit determines, in a communication system including a base station and a terminal, a wireless resource to be used for downlink communication on the basis of a common rule between the base station and the terminal.
  (2) The communication device according to (1) above, in which
    the wireless resource determination unit determines the wireless resource to be used for downlink communication from a random number sequence generated by a pseudo random number generator shared between the base station and the terminal by using information of the terminal as a downlink destination and time information as initial values.
  (3) The communication device according to (2) above, in which
    the wireless resource determination unit determines the wireless resource to be used for downlink communication, one by each terminal, in a slot having a predetermined time length.
  (4) The communication device according to (3) above, in which
    the wireless resource determination unit uses a start time of a slot as the time information as an initial value, and determines the wireless resource to be used for downlink communication, one by each terminal, in the slot as a transmission cycle.
  (5) The communication device according to (4) above, in which
    the wireless resource determination unit determines a plurality of candidates for the wireless resource to be used for downlink communication in the slot for each terminal, and then selects the plurality of candidates for each terminal one by one in such a manner that wireless resources do not overlap between the terminals.
  (6) The communication device according to (3) above, in which
    the wireless resource determination unit uses a start time of subslots obtained by dividing the slot into a plurality as the time information as an initial value, determines, one by each terminal, a candidate for the wireless resource to be used for downlink communication in each of the subslots, and then selects a plurality of candidates for each terminal one by one in such a manner that wireless resources do not overlap between the terminals.
  (7) The communication device according to (6) above, in which
    the wireless resource determination unit allocates a wireless resource for downlink transmission of each terminal in consideration of a minimum number of subslots ($R_x$) until a candidate for a wireless resource for downlink transmission that is capable of being exclusive for each terminal is found in a case where a candidate for a wireless resource allocated in a certain subslot overlaps between terminals.
  (8) The communication device according to (7) above, in which
    the wireless resource determination unit allocates the wireless resource for downlink transmission of each terminal in a case where a candidate for a wireless resource allocated in a certain subslot overlaps between terminals, in further consideration of a number ($N_{STA}$) of terminals for which a candidate for a wireless resource of each terminal in a next subslot overlaps.
  (9) The communication device according to (8) above, in which
    the wireless resource determination unit allocates the wireless resource for downlink transmission of each terminal in consideration of request information from each terminal in a case where a candidate for a wireless resource allocated in a certain subslot overlaps between terminals.

(10) The communication device according to any one of (1) to (9) above, in which
the communication device operates as the base station, and transmits a downlink frame by using the wireless resource determined by the wireless resource determination unit.

(11) The communication device according to (1) above, in which
the communication device operates as the terminal, and waits to receive a downlink frame in each of a plurality of candidates for the wireless resource determined in a slot by the wireless resource determination unit.

(12) A communication method including:
determining, in a communication system including a base station and a terminal, a wireless resource to be used for downlink communication on the basis of a common rule between the base station and the terminal; and
performing processing related to downlink communication using the determined wireless resource.

REFERENCE SIGNS LIST

100 Terminal
101 Wireless transmission unit
102 Wireless reception unit
103 Frame generation unit
104 Wireless control unit
105 Wireless resource calculation unit
106 Frame detection unit
107 Frame demodulation unit
108 Terminal parameter retention unit
109 Internal clock
110 GPS reception unit
111 Sensor
200 Base station
201 Wireless transmission unit
202 Wireless reception unit
203 Frame generation unit
204 Wireless control unit
205 Wireless resource calculation unit
206 Frame detection unit
207 Frame demodulation unit
208 Terminal parameter retention unit
209 Internal clock
210 GPS reception unit
211 Wireless resource determination unit
300 GPS satellite

The invention claimed is:

1. A communication device, comprising:
a GPS receiver configured to receive a GPS signal from a satellite; and
circuitry configured to:
determine a random number sequence based on
information of a first terminal of a plurality of terminals, and
time information indicating a start time of a slot, wherein the slot has a specific time length;
determine, based on the received GPS signal and the random number sequence, a common rule between a base station and the plurality of terminals; and
determine, based on the determined common rule between the base station and the plurality of terminals, a wireless resource for downlink communication for each terminal of the plurality of terminals, wherein the wireless resource is in the slot.

2. The communication device according to claim 1, wherein
the circuitry is further configured to determine, based on the start time of the slot, the wireless resource for the downlink communication for the each terminal of the plurality of terminals, and
the wireless resource is in the slot as a transmission cycle.

3. The communication device according to claim 2, wherein the circuitry is further configured to:
determine, in the slot, a plurality of candidates for the wireless resource for the downlink communication; and
select the plurality of candidates for the plurality of terminals such that the wireless resource of the first terminal does not overlap with the wireless resource of a second terminal of the plurality of terminals.

4. The communication device according to claim 1, wherein the circuitry is further configured to:
divide the slot into a plurality of subslots;
determine, in the plurality of subslots, based on a start time of the plurality of subslots, a plurality of candidates for the wireless resource; and
select the plurality of candidates for the plurality of terminals such that the wireless resource of the first terminal does not overlap with the wireless resource of a second terminal of the plurality of terminals.

5. The communication device according to claim 4, wherein the circuitry is further configured to:
determine, in a case where wireless resources of a set of terminals of the plurality of terminals overlap in a subslot of the plurality of subslots, a minimum number of subslots (Rx) until a specific candidate of the plurality of candidates is exclusive for the each terminal of the plurality of terminals; and
allocate, based on the minimum number of subslots (Rx), the wireless resource for downlink transmission of the each terminal of the plurality of terminals.

6. The communication device according to claim 5, wherein the circuitry is further configured to:
determine, in the case where the wireless resources of the set of terminals overlap in the subslot, a number ($N_{STA}$) of terminals of the plurality of terminals for which a candidate of the plurality of candidates for the wireless resource overlaps in adjacent subslots of the plurality of subslots; and
allocate, based on the determined number ($N_{STA}$) of terminals, the wireless resource for the downlink transmission of the each terminal of the plurality of terminals.

7. The communication device according to claim 6, wherein the circuitry is further configured to allocate, based on request information from the each terminal of the plurality of terminals, the wireless resource for the downlink transmission of the each terminal of the plurality of terminals.

8. The communication device according to claim 1, wherein the communication device is configured to:
operate as the base station, and
transmit a downlink frame based on the determined wireless resource.

9. The communication device according to claim 1, wherein
the circuitry is further configured to determine a plurality of candidates for the wireless resource,
the plurality of candidates is in the slot, and the communication device is configured to:
  operate as the first terminal; and
  receive a downlink frame in each candidate of the plurality of candidates for the wireless resource.

10. A communication method, comprising:
receiving a GPS signal from a satellite;
determining a random number sequence based on
  information of a terminal of a plurality of terminals, and
  time information indicating a start time of a slot, wherein the slot has a specific time length;
determining, based on the received GPS signal and the random number sequence, a common rule between a base station and the plurality of terminals;
determining, based on the determined common rule between the base station and the plurality of terminals, a wireless resource for downlink communication for each terminal of the plurality of terminals,
  wherein the wireless resource is in the slot; and
performing, based on the determined wireless resource, a process corresponding to the downlink communication.

\* \* \* \* \*